United States Patent
Mildh et al.

(10) Patent No.: US 12,477,376 B2
(45) Date of Patent: Nov. 18, 2025

(54) FIRST NODE, SECOND NODE AND METHODS PERFORMED THEREBY FOR HANDLING TRANSMISSIONS IN A COMMUNICATIONS NETWORK

(71) Applicant: Telefonaktiebolaget LM Ericsson (publ), Stockholm (SE)

(72) Inventors: Gunnar Mildh, Sollentuna (SE); Oumer Teyeb, Montréal (CA); Filip Barac, Huddinge (SE); Ajmal Muhammad, Sollentuna (SE); Per-Erik Eriksson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 398 days.

(21) Appl. No.: 17/918,453

(22) PCT Filed: Apr. 16, 2021

(86) PCT No.: PCT/SE2021/050351
§ 371 (c)(1),
(2) Date: Oct. 12, 2022

(87) PCT Pub. No.: WO2021/211048
PCT Pub. Date: Oct. 21, 2021

(65) Prior Publication Data
US 2023/0247697 A1    Aug. 3, 2023

Related U.S. Application Data

(60) Provisional application No. 63/011,778, filed on Apr. 17, 2020, provisional application No. 63/011,789, (Continued)

(51) Int. Cl.
*H04W 28/02* (2009.01)
*H04W 76/12* (2018.01)
*H04W 76/15* (2018.01)

(52) U.S. Cl.
CPC ... *H04W 28/0231* (2013.01); *H04W 28/0236* (2013.01); *H04W 76/12* (2018.02); *H04W 76/15* (2018.02)

(58) Field of Classification Search
CPC ......... H04W 28/0231; H04W 28/0236; H04W 76/12; H04W 76/15; H04W 84/047
See application file for complete search history.

(56) References Cited

U.S. PATENT DOCUMENTS

2017/0279723 A1 * 9/2017 Vedam ................. H04L 43/062
2017/0366618 A1 * 12/2017 Vrzic .................... H04L 67/148
(Continued)

FOREIGN PATENT DOCUMENTS

EP     3367625 A1 *  8/2018  ............ H04L 69/16
EP     3512140 A1    7/2019
(Continued)

OTHER PUBLICATIONS

3GPP TS 38.340 V16.2.0; 3rd Generation Partnership Project; Technical Specification Group Radio Access Network; NR; Backhaul Adaption Protocol (BAP) specification (Release 16); Sep. 2020; consisting of 23 pages.
(Continued)

Primary Examiner — Sudesh M. Patidar
(74) Attorney, Agent, or Firm — Weisberg I.P. Law, P.A.

(57) ABSTRACT

A method performed by a first node, for handling transmission of one or more packets and/or one or more messages from a sending to a receiving node. The first node operates in a communications network having at least one intermediate node between the sending and the receiving node. The first node sends a first indication to a second node explicitly indicating whether or not at least one of: i) the one or more packets are, or are to be, duplicated over a General Packet Radio Service Tunneling Protocol (GTP) layer, ii) duplica-
(Continued)

tion of the packets over the GTP layer is enabled, supported and/or active, iii) one or more messages are, or are to be, duplicated over a Stream Control Transmission Protocol (SCTP) layer between the first node and one or more next hop nodes, and iv) duplication of the messages over the SCTP layer is enabled, supported and/or active.

16 Claims, 28 Drawing Sheets

Related U.S. Application Data filed on Apr. 17, 2020, provisional application No. 63/011,801, filed on Apr. 17, 2020.

(56) References Cited

U.S. PATENT DOCUMENTS

| | | | | |
|---|---|---|---|---|
| 2018/0367288 | A1* | 12/2018 | Vrzic | H04W 76/12 |
| 2019/0082363 | A1* | 3/2019 | Park | H04W 76/18 |
| 2019/0215726 | A1* | 7/2019 | Park | H04W 16/18 |
| 2019/0349139 | A1* | 11/2019 | Park | H04L 1/189 |
| 2020/0084663 | A1 | 3/2020 | Park et al. | |
| 2021/0022040 | A1 | 1/2021 | Zhu et al. | |
| 2022/0015172 | A1* | 1/2022 | Xu | H04L 5/0053 |

FOREIGN PATENT DOCUMENTS

| | | | | |
|---|---|---|---|---|
| EP | 3764736 B1 * | 12/2022 | ........... | H04L 1/1806 |
| WO | 2019192535 A1 | 10/2019 | | |
| WO | WO-2020060141 A1 * | 3/2020 | | |

OTHER PUBLICATIONS

3GPP Ts 38.300 V16.3.0; 3rd Generation Partnership Project; Technical Specification Group Radio Access Network; NR; NR and NG-RAN Overall Description; Stage 2 (Release 16); Sep. 2020; consisting of 148 pages.
3GPP TS 37.340 V16.3.0; 3rd Generation Partnership Project; Technical Specification Group Radio Access Network; Evolved Universal Terrestrial Radio Access (E-UTRA) and NR; Multi-connectivity; Stage 2 (Release 16); Sep. 2020; consisting of 83 pages.
3GPP TS 38.473 V16.3.1; 3rd Generation Partnership Project; Technical Specification Group Radio Access Network; NG-RAN; F1 application protocol (F1AP) (Release 16); Oct. 2020; consisting of 455 pages.
3GPP TS 36.323 V16.2.0; 3rd Generation Partnership Project; Technical Specification Group Radio Access Network; Evolved Universal Terrestrial Radio Access (E-UTRA); Packet Data Convergence Protocol (PDCP) specification (Release 16); Sep. 2020; consisting of 56 pages.
International Search Report and Written Opinion dated Jul. 15, 2021 for International Application No. PCT/SE2020/050351 filed Apr. 16, 2021; consisting of 10 pages.
3GPP TR 38.874 V16.0.0; 3rd Generation Partnership Project; Technical Specification Group Radio Access Network; NR; Study on Integrated Access and Backhaul; (Release 16); Dec. 2018; consisting of 111 pages.
3GPP TS 36.300 V16.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16); Dec. 2019; consisting of 366 pages.
3GPP TSG RAN Meeting #82 RP-182882 (Revision of RP-182810); Title: New WID: Integrated Access and Backhaul for NR; Source: Qualcomm; Document for: Approval; Agenda Item: 9.1.2; Date and Location: Dec. 10-13, 2018, Sorrento, Italy; consisting of 8 pages.
3GPP TSG-RAN WG3 Meeting #107bis-e R3-202308; Title: (TP for NR-IAB BL CR for TS 38.473): Backhaul RLC Channel Mapping Configuration for IAB-nodes; Agenda Item: 13.2.1.2; Source: Ericsson; Document for: Agreement; Date and Location: Apr. 20-30, 2020, Online; consisting of 39 pages.

\* cited by examiner c)

a)

b)

a)

b)

FIRST NODE, SECOND NODE AND METHODS PERFORMED THEREBY FOR HANDLING TRANSMISSIONS IN A COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2021/050351, filed Apr. 16, 2021 entitled "FIRST NODE, SECOND NODE AND METHODS PERFORMED THEREBY FOR HANDLING TRANSMISSIONS IN A COMMUNICATIONS NETWORK," which claims priority to U.S. Provisional Application No. 63/011,788, filed Apr. 17, 2020; U.S. Provisional Application No. 63/011,789, filed Apr. 17, 2020; and U.S. Provisional Application No. 63/011,801, filed Apr. 17, 2020, the entireties of all of which are incorporated herein by reference.

TECHNICAL FIELD

The present disclosure relates generally to a first node and methods performed thereby for handling transmission of one or more packets and/or one or more messages from a sending node to a receiving node. The present disclosure also relates generally to a second node and methods performed thereby for handling transmission of the one or more packets and/or one or more messages from the sending node to the receiving node.

BACKGROUND

Nodes within a communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Nodes may also be network nodes, such as radio network nodes, e.g., Transmission Points (TP). The communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The so-called 5th Generation (5G) system, from a radio perspective started to be standardized in 3GPP, and the so-called New Radio or Next Radio (NR) is the name for the radio interface. NR architecture is being discussed in 3GPP. In the current concept, gNB denotes NR BS, where one NR BS may correspond to one or more transmission/reception points. The expression Uplink (UL) may be used for the transmission path in the opposite direction i.e., from the wireless device to the base station.

Carrier Aggregation and Dual Connectivity in LTE and NR
General

There may be different ways to deploy a 5G network with or without interworking with LTE, also referred to as Evolved Universal Terrestrial Radio Access (E-UTRA), and evolved packet core (EPC), as depicted in FIG. 1. These different ways are depicted schematically in FIG. 1 as different Options, wherein Option 1 corresponds to standalone LTE connected to EPC, Option 2 corresponds to Standalone NR connected to 5G Core Network (5GCN), or NR-NR dual connectivity (NR-NR DC), Option 3 corresponds to LTE-NR DC connected to EPC (EN-DC), Option 4 corresponds to NR-LTE DC, connected to 5GCN (NE-DC), Option 5 corresponds to LTE connected to 5GCN (eLTE or LTE-5GG5G Core), and Option 7 corresponds to LTE-NR DC, connected to 5GCN (NGEN-DC). In principle, NR and LTE may be deployed without any interworking, denoted by NR stand-alone (SA) operation, that is, an eNB may be connected to an EPC and a gNB in NR may be connected to a 5GCN, with no interconnection between the two, as depicted, respectively, in Option 1 and Option 2 in the figure. On the other hand, the first supported version of NR is the so-called Evolved Universal Terrestrial Radio Access Network (E-UTRAN)-NR Dual Connectivity (EN-DC), illustrated by Option 3. In such a deployment, dual connectivity between NR and LTE may be applied with LTE as the master and NR as the secondary node. The RAN node (gNB) supporting NR, may not have a control plane connection to the EPC core network, instead it may rely on the LTE as master node (MeNB). This is also referred to as "Non-standalone NR". It may be noted that in this case, the functionality of an NR cell may be limited and may be used for connected mode UEs as a booster and/or as a diversity leg, but an RRC_IDLE UE cannot camp on these NR cells.

With introduction of 5G core (5GC), other options may be also valid. As mentioned above, Option 2 supports a standalone NR deployment where a gNB may be connected to a 5GC. Similarly, LTE may also be connected to a 5GC using Option 5, also known as enhanced LTE (eLTE), E-UTRA/5GC, or LTE/5GC, and the node may be referred to as an ng-eNB. In these cases, both NR and LTE may be seen as part of the NG-RAN, and both the ng-eNB and the gNB may be referred to as NG-RAN nodes. It is worth noting that, Option 4 and option 7 are other variants of dual connectivity between LTE and NR which will be standardized as part of NG-RAN connected to 5GC, denoted by Multi-Radio Dual Connectivity (MR-DC). Option 6 and 8, where gNB may be connected to an EPC, with and without interconnectivity to LTE, may also be possible, although they seem to be less practical and hence they will not be pursued further in 3GPP.

As migration for these options may differ from different operators, it is possible to have deployments with multiple options in parallel in the same network, e.g., there may be a eNB base station supporting option 3, 5 and 7 in the same network, as an NR base station supporting 2 and 4.

Dual Connectivity in LTE/NR

E-UTRAN may support Dual Connectivity (DC) operation, whereby a multiple Rx/Tx UE in RRC_CONNECTED may be configured to utilize radio resources provided by two distinct schedulers, located in two eNBs connected via a non-ideal backhaul over the X2 interface, see 3GPP 36.300. eNBs involved in DC for a certain UE may assume two different roles: an eNB may either act as a Master node (MN) or as a Secondary node (SN). In DC, a UE may be connected to one MN and one SN.

In LTE DC, the radio protocol architecture that a particular bearer may use may depend on how the bearer is setup. Three bearer types may exist: Master Cell Group (MCG) bearer, Secondary Cell Group (SCG) bearer and split bearers. Radio Resource Control (RRC) may be located in the MN and Signaling Radio Bearers (SRBs) may always be configured as MCG bearer type, and therefore only use the radio resources of the MN. FIG. 2 is a schematic diagram illustrating an LTE DC User Plane (UP) depicting an MN 11, an SN 12 and an X2 interface 13. In LTE DC, the radio protocol architecture that a particular bearer may use may depend on how the bearer may be setup. Three bearer types may exist: Master Cell Group (MCG) bearer 14, Secondary Cell Group (SCG) bearer 15 and split bearers 16. RRC may be located in the MN, and Signaling Radio Bearers (SRBs) may be always configured as a MCG bearer type, and therefore only use the radio resources of the MN. FIG. 1 depicts how each of the MCG bearer 14 and SCG bearer 15 has a respective Packet Data Convergence Protocol (PDCP) entity 17 and Radio Link Controller (RLC) entity 18, each connected to a respective Medium Access Control (MAC) 19 entity in each of the MN and SN. The split bearer 16 has a PDCP entity in the MN 11, and is connected to each of the MAC entities 19 in the MN 11 and the SN 12, via, respectively, an RLC entity located in each of the MN 11 and the SN 12.

It may be noted that in DC, it may also be possible to support Carrier Aggregation (CA) in each cell group, namely, MCG and SCG. That is, the MCG may comprise more than one cell working in CA, and the SCG may also comprise more than one cell working in CA. The primary cell in the MCG may be known as the PCell, while the primary cell of the SCG may be known as the PSCell.

LTE-New Radio (NR) DC, also referred to as LTE-NR tight interworking, EN-DC in case the UE is connected to EPC or NGEN-DC, in case the UE is connected to 5GC, has been standardized in 3GPP rel-15. The major changes from LTE DC may be understood to be: a) the introduction of a split bearer from the SN, known as SCG split bearer, b) the introduction of a split bearer for RRC, split SRB1, split SRB2, and c) the introduction of a direct RRC from the SN, also referred to as SCG SRB or SRB3.

FIG. 3 and FIG. 4 show, respectively, the UP and Control Plane (CP) architectures for LTE-NR tight interworking.

FIG. 3 is a schematic diagram illustrating the UP architectures for LTE-NR tight interworking in the MN 21 and the SN 22. An SCG split bearer 23 is present in the SN 22, in addition to the split bearer in the MN 21, which is referred to as an MCG split bearer 24.

FIG. 4 is a schematic diagram illustrating the Control Plane (CP) architecture for LTE-NR tight interworking. An MN 31 operating on LTE, an SN 32 operating on NR, and a UE 33 supporting operation on LTE and NR are illustrated in the Figure, each with its respective protocol stack: RRC 34, PDCP 35, RLC 36, MAC 37 and the Physical layer (PHY) 38. Different signalling radio bearers may be used for carrying RRC messages. SRB0 39, SRB1 40 and SRB2 41, refer to the signalling radio bearers that may be used for carrying RRC messages. An RRC configuration may be sent directly by a configuring node via a direct SRB 42. RRC configurations may be encapsulated in another node's RRC message via Embedded RRC 43.

In EN-DC, the SN may sometimes be referred to as Secondary gNB (SgNB), where the gNB is an NR base station, and the MN as MeNB, in case the LTE is the master node and NR is the secondary node. In the other case, where an NR gNB is the master and an LTE is the secondary node, the corresponding terms may be SeNB and MgNB. If both nodes are NR, the terms MgNB and SgNB may be used.

Split RRC messages may be mainly used for creating diversity, and the sender may decide to either choose one of the links for scheduling the RRC messages, or it may duplicate the message over both links. In the downlink, the path switching between the MCG or SCG legs or duplication on both may be left to network implementation. On the other hand, for the UL, the network may configure the UE to use the MCG, SCG or both legs. The terms "leg" and "path" may be used interchangeably throughout this document.

Bearer Configurations

The UP and CP protocol stacks in NR are shown in FIG. 5 and FIG. 6, respectively.

When reconfiguring the UE 51, the network, e.g., via a gNB 52, may transmit an RRCReconfiguration message containing a RadioBearerConfig and a CellGroupConfig information element. The RadioBearerConfig may configure the Packet Data Convergence Protocol (PDCP) 53 and Service Data Adaptation Protocol (SDAP) 54 protocol layer for all data radio bearers (DRBs) and the PDCP protocol layer for all signaling radio bearers (SRBs). The CellGroupConfig may configure the Radio Link Control (RLC) 55, Medium Access Control (MAC) 56, and Physical Layer (PHY) 57 layer for all radio bearers (RBs).

FIG. 6 further depicts the RRC layer 58 at each of the UE 51 and the gNB 52, as well as the NAS layer 59 terminating at each of the UE 51 and an Access and Mobility Management Function (AMF) 60 node in the 5G core network.

In case of NR-DC, the RRCReconfiguration message may contain one or more RadioBearerConfig and one or more CellGroupConfig, namely radioBearerConfig and radioBearerConfig2 and masterCellGroup and secondaryCellGroup respectively.

Each RadioBearerConfig may contain a list of DRBs and/or SRBs which may be terminated in the respective node, as well as a configuration for the security algorithms to be used.

The CellGroupConfig, on the other hand, may contain configurations for one or more cells associated to the respective node, MN or SN. One of the cells may be denoted as a special cell, Primary Cell (PCell) for the MCG or Primary Secondary Cell (PSCell) for the SCG, which may be the primary cell used for communication. The other cells may be secondary cells (SCells) which may be monitored, in case any of them may be able to provide better radio conditions than the SpCell. The CellGroupConfig may also contain a list of RLC bearers which may be associated to a specific radio bearer with the parameter servedRadioBearer.

As may be seen in FIG. 7, DRBs may be terminated in either the Master node (MN) 70 or the Secondary node (SN) 71 and be transmitted via either the master cell group, via an MCG bearer 72, the secondary cell group, via an SCG bearer 73, or both, via a split bearer 74. Any combination of MN and SN terminated bearers as well as MCG, SCG and split bearers may be configured for a UE. For SRBs, SRB1 and SRB2 may be terminated in the MN and may be either MCG, or split bearers, whereas SRB3 may be terminated in the SN and may only be an SCG bearer. Although the concept shown here shows the system connected to 5GC, the same principles may be understood to apply to EN-DC connected to EPC. The schematic diagram of FIG. 7 further depicts how Quality of Service (QoS) flows 75 arriving at the SDAP layer 76 at each of the MN 71 and the SN 72, and how the each of the MCG bearer 73, SCG bearer 74 and Split bearer 75 cross each of the NR PDCP layer 77, RLC layer 78 and MAC layer 79 at each of the MN 71 and the SN 72, interconnecting between themselves over an Xn connection 80.

When the UE is configured with two RadioBearerConfigs and two CellGroupConfigs, each RLC bearer in either CellGroupConfig may be associated to a radio bearer terminating in either the MN or the SN. In case of split bearers, an RLC bearer in masterCellGroup and an RLC bearer in secondaryCellGroup may be configured with the same RB identity in the servedRadioBearer.

One or more cells may be associated to the MCG or SCG, and the secondary cells (SCells) in each cell group may be used to provide more radio resources to the UE.

Path Selection for Split DRBs

In LTE DC, split DRB operation in the UL may be controlled by two parameters: ul-DataSplitDRB-ViaSCG and ul-DataSplitThreshold, which may be configured for each DRB. The ul-DataSplitDRB-ViaSCG is a Boolean parameter, and if it is set to TRUE, the SCG path may be understood to be the preferred path for UL data transmission, while a value of FALSE may be understood to indicate to the UE that it should send the data via the MCG path. The ul-DataSplitThreshold may be understood to be a buffer size threshold and if the size of the data that is available to be sent at the UE's UL buffer exceeds this value, the UE may be allowed to push data to either the MCG or the SCG legs, whichever leg may provide a grant to it.

The handling of the path selection at the UE may be as captured in the PDCP specifications (TS 36.323) as follows:

For split bearers, when indicating the data available for transmission to a MAC entity for Buffer Status Report (BSR) triggering and Buffer Size calculation, the UE may be required to:

if ul-DataSplitThreshold is configured and the data available for transmission is larger than or equal to ul-DataSplitThreshold:
indicate the data available for transmission to both the MAC entity configured for SCG and the MAC entity configured for MCG;
else:
if ul-DataSplitDRB-ViaSCG is set to TRUE by upper layer:
indicate the data available for transmission to the MAC entity configured for SCG only;
if ul-DataSplitThreshold is configured, indicate the data available for transmission as 0 to the MAC entity configured for MCG;
else:
indicate the data available for transmission to the MAC entity configured for MCG only;
if ul-DataSplitThreshold is configured, indicate the data available for transmission as 0 to the MAC entity configured for SCG.

The same approach as in LTE has also been adopted in NR.

Packet Duplication

Reliability in wireless communication may be typically provided via retransmissions. However, there may be a latency penalty with retransmissions because a retransmission may triggered only be when the first transmission has failed or takes more than the expected time. Thus, for bearers that carry traffic of ultra-reliable low latency (URLLC) services and/or applications, usage of retransmissions may not the be optimal way of assuring reliability. An alternative that has been adopted in 3GPP in rel-15, both in LTE and NR, is Packet duplication, which may be understood to comprise sending the same packets, e.g., PDCP Protocol Data Units (PDUs), twice. That way, no extra latency may need to be used to assure reliability, as both the original and the duplicate packet may be transmitted simultaneously. The overhead in terms of the required capacity for duplication may be minimized by enabling duplication only when the quality of the link associated with that bearer is below a certain level, that is, there may be no need to duplicate packets if the link is in excellent conditions and no packet loss and/or delay is anticipated.

Sending both the duplicate and the original on the same link and carrier may be understood to not be desirable, as the main aim of duplication is to create diversity. There may be two different ways of doing so: Carrier Aggregation (CA) based duplication and Dual Connectivity (DC) base duplication.

CA level duplication may be understood to mean that different carriers may be used to send a duplicate version of the same PDCP PDU. An additional RLC entity and an additional logical channel may be added to the radio bearer to handle the duplicated PDCP PDUs. To ensure the original PDCP PDU and the corresponding duplicate are not be transmitted on the same carrier, logical channel mapping restrictions may be used in MAC, that is, each logical channel of the duplicated bearer may be associated with a given carrier, namely, PCell or SCell.

In DC level duplication, on the other hand, the PDCP PDU may be forwarded to both the MCG and SCG paths that comprise a split bearer. Naturally, DC level duplication may be understood to be applicable only for split DRBs and/or SRBs.

FIG. 8 illustrates several CA and DC duplication alternatives. Panel a) depicts SRB and DRB duplication for EN-DC, panel b) depicts SRB and DRB duplication for NE-DC, and panel c) depicts SRB and DRB duplication for NR-NR DC, according to existing methods. Each of the panels depicts how non-split SRBs/DRBs 81 and split SRBs/DRBs 82 at the MCG 83, and non-split SRBs/DRBs 84 at the SCG 85, cross each of the PDCP layer 86, RLC layer 87, MAC layer 88 and PHY layer 89 at each of the MCG 83 and the SCG 85. Also depicted in each of the panels is how three different PDUs: PDUa 90, PDUb 91, and PDUa 92 may or may not duplicate, as follows.

In EN-DC, CA duplication may be applied in the MN and in the SN, but MCG bearer CA duplication may be configured only in combination with E-UTRAN PDCP and MCG bearer CA duplication may be configured only if DC duplication is not configured for any split bearer.

In NGEN-DC, CA duplication may only be configured for SCG bearer. In NE-DC, CA duplication may only be configured for MCG bearer. In NR-DC, CA duplication may be configured for both MCG and SCG bearers.

PDCP duplication may be configured by RRC, and its initial status, e.g., activated and/or deactivated may also be signaled via RRC. A MAC Control Element (CE) to dynamically control PDCP data duplication, that is, to turn it on or off. A bitmap may be used to indicate per each RB if data duplication is activated or deactivated.

For the CU-DU split architecture where the gNB may be split between a central unit (CU) that terminates the RRC in CP and the PDCP, for both CP and UP, and the distributed unit (DU) that terminates the protocols below the PDCP, that is, RLC, MAC, PHY, enhancements may be made in the F1 protocol, that is, the interface between the CU and DU for the sake of duplication. For CA duplication, separate tunnels may be setup corresponding to the two logical channels associated with the two RLC bearers that may be used for the duplicated bearer. During bearer setup and/or modification, an indication may be included to indicate whether CA/DC duplication is configured for that bearer and the initial state of the duplication, that is, activated or inactivated. The DU may be understood to be the entity that may send the MAC Control Element (CE) for activating and/or deactivating duplication based on these indications that it may be getting from the CU.

Integrated Access Backhaul (IAB) networks
Protocol and Architectural Aspects

3GPP is currently standardizing integrated access and wireless access backhaul in NR (IAB) in Rel-16 (RP-RP-182882).

The usage of short range mmWave spectrum in NR may be understood to create a need for densified deployment with multi-hop backhauling. However, optical fiber to every base station will be too costly and sometimes not even possible, e.g., at historical sites. The main IAB principle may be understood to be the use of wireless links for the backhaul, instead of fiber, to enable flexible and very dense deployment of cells without the need for densifying the transport network. Use case scenarios for IAB may include coverage extension, deployment of massive number of small cells and Fixed Wireless Access (FWA), e.g., to residential and/or office buildings. The larger bandwidth available for NR in mmWave spectrum may be understood to provide opportunity for self-backhauling, without limiting the spectrum to be used for the access links. On top of that, the inherent multi-beam and Multiple input multiple output (MIMO) support in NR may reduce cross-link interference between backhaul and access links allowing higher densification.

During the study item phase of the IAB work, a summary of the study item may be found in the technical report TR 38.874, it has been agreed to adopt a solution that leverages the Central Unit (CU)/Distributed Unit (DU) split architecture of NR, where the IAB node may be hosting a DU part that may be controlled by a central unit. The IAB nodes may also have a Mobile Termination (MT) part that they may use to communicate with their parent nodes.

The specifications for IAB strive to reuse existing functions and interfaces defined in NR. In particular, MT, gNB-DU, gNB-CU, User Plane Function (UPF), AMF and Session Management Function (SMF), as well as the corresponding interfaces NR Uu, between MT and gNB, F1, NG, X2 and N4 may be used as baseline for the IAB architectures. Modifications or enhancements to these functions and interfaces for the support of IAB will be explained in the context of the architecture discussion. Additional functionality such as multi-hop forwarding is included in the architecture discussion as it may be necessary for the understanding of IAB operation.

The Mobile-Termination (MT) function may be defined as a component of the IAB node. In the context of this study, MT may be referred to as a function residing on an IAB-node that may terminate the radio interface layers of the backhaul Uu interface toward the IAB-donor or other IAB-nodes.

FIG. 9 shows a high-level architectural view of an IAB network. Particularly, FIG. 9 shows a reference diagram for IAB in standalone mode, which contains one IAB-donor 93 and multiple IAB-nodes 94. The IAB-donor 93 may be treated as a single logical node that may comprise a set of functions, such as gNB-DU 95, gNB-CU-CP 96, gNB-CU-UP 97 and potentially other functions 98. In a deployment, the IAB-donor 93 may be split according to these functions, which may all be either collocated or non-collocated as allowed by 3GPP NG-RAN architecture. IAB-related aspects may arise when such split is exercised. Also, some of the functions presently associated with the IAB-donor 93 may eventually be moved outside of the donor in case it becomes evident that they do not perform IAB-specific tasks. The IAB-donor 93 may be connected to a Core Network (CN) 99. A UE 100 may gain access to the network via one of the IAB-nodes 94 to which the IAB-donor 93 may provide a wireless backhaul link.

The baseline user plane and control plane protocol stacks for IAB are shown in FIG. 10 and FIG. 11, respectively, in each of a UE 101, an IAB-donor 102, a first IAB-node (IAB-node 1) 103, and an access IAB-node (IAB-node 2) 104. Each of the IAB-donor 102, the first IAB-node 1803, and the access IAB-node 1804 have a DU 105. Each of the first IAB-node 1803 and the access IAB-node 1804 have also an MT 106. The IAB-donor 102 has a CU-UP 107. The connections are depicted between the different protocols, in the different entities, either via UE's DRB 108, and/or a BH RLC channel 109 in FIG. 10. An IPv6 flow label and DSCP may indicate the BH RLC Channel.

As shown in FIG. 10, the chosen protocol stacks may reuse the current CU-DU split specification in rel-15, where the full user plane F1-U 110 (General Packet Radio Service Tunneling Protocol User Plane (GTP-U) 111/User Datagram Protocol (UDP) 112/Internet Protocol (IP) 113) may be terminated at the IAB node 1804, as a normal DU, and, in FIG. 11, the full control plane F1-C(F1-AP 1101/Stream Control Transmission Protocol (SCTP) 1102/IP 1103) may also be terminated at the IAB node 1804, as a normal DU. In the above cases, Network Domain Security (NDS) may have been employed to protect both UP and CP traffic, IPsec 114, in the case of UP, and Datagram Transport Layer Security (DTLS) 1104 in the case of CP. IPsec 113 may also be used for the CP protection instead of DTLS, in this case no DTLS layer would be used. FIG. 10, further depicts the SDAP 114, and FIG. 10 and FIG. 11 further depict the PDCP 115 and RLC 116, the Adapt 117, RLC 118, RRC 119 protocols at the indicated entities, and their interconnections. The connections are depicted between the different protocols, in the different entities, either via UE's SRB 1105, BH RLC channel 1106, Intra-donor D1-C 1107, and/or MT's SRB 1108 in FIG. 11, as indicated in each of panel a), panel b) and panel c).

At the 3GPP RAN2_105 bis meeting, it was agreed to support the NR-DC framework for handling multi-connectivity to IAB nodes.

As shown in the schematic diagram of FIG. 12, currently in NR, dual connectivity may be supported by setting up multiple UE bearer contexts in the DUs 1201 that serve the UE 1202. These different UE contexts may be identified as part of F1-U, e.g., General Packet Radio Service Tunnelling Protocol (GTP) tunnels 1203, to the DU serving the UE.

The dual connectivity aspects may be transparent to UE application layers, that is, the UE may just send and/or receive data from a DRB which may be configured as an MCG, SCG or split DRB. In case of the split DRB, the splitting point may be below PDCP 1204, and relying on various NR PDCP functions to handle re-ordering, re-transmission and duplication removal. Also depicted in FIG. 12 are the CU-UP 1205 and the CU-CP 1206, as well as their respective connections to the DUs 1201, an AMF/SMF 1207 node, a UPF 1208 via an NG-U tunnel 1209, and themselves, via an E1 interface 1210.

As agreed in 3GPP it may be possible to reuse the NR-DC framework for setting up multi-connectivity to IAB nodes.

For NR-DC to be used for IAB nodes, some changes to the user plane aspects may however be required. The reasons for this may be that: a) the IAB nodes may not terminate PDCP for F1-U traffic, b) similarly, the parent nodes to the IAB may not terminate F1-U for other IAB nodes, the forwarding may instead be handled by the Backhaul Adaptation Protocol (BAP) layer; c) the agreed architecture based on full F1-U support to the IAB node may not assume that there is any CU-UP function for traffic going to the IAB node, instead the DU may handle IP routing; and d) similarly, the IP connectivity for non-IAB NR DC may terminate in the UPF, which may not be in line with the agreed architecture for IAB network.

The user plane solutions for NR DC cannot be used in their current form to support multi-path connectivity to IAB nodes for F1-U traffic for several reasons, including lack of PDCP and CU-UP function for IAB nodes.

However, for the agreed architecture for IAB network, it may be possible to adopt a simplified version of NR DC for enabling multi-path communication, in line with existing architecture assumptions and avoid additional complexities such as tunnelling in tunnelling, assuming the following. First, that no split bearers may be supported. This simplification may make it possible to avoid introduction of CU-UP functionality and re-ordering functionality etc. Second, that each path may need to be associated with a separate BAP routing identifier. This simplification may make it possible to avoid GTP tunnels to the parent nodes, carrying GTP tunnels to IAB node. And third, that each path may need to be associated with its own IP address making the paths visible on the F1 application layer. This simplification may make it possible to set up paths through different Donor DUs.

With the assumptions above, it may be possible to support a redundancy and rudimentary load balancing mechanism on the F1 application layer using features such as: Multipath SCTP and smart load balancing of UE GTP tunnels to different paths.

It may be possible to study more advanced load balancing mechanisms for IAB node in later releases.

For the user plane, it may be possible to support a simplified version of NR-DC for IAB nodes, where each path may be seen as a separate IP connection, which may be used by the application layer (F1-C/F1-U) for redundancy and rudimentary load balancing. This is discussed in 38.874 section 9.7.9.

When using NR-DC to support multi-connectivity for IAB nodes in Rel-16, the following assumptions may be made: i) only MCG, or SCG Backhaul (BH) bearers may be supported, no split BH bearers may be supported; ii) each separate connection to a given IAB node may need to be associated with a separate BAP identifier, e.g., address, path, address+path; and iii) each separate connection may need to be associated with at least 1 separate IP address to support multiple connections to use different Donor DUs and allow selection of which connection to use by the end nodes (IAB node, Donor CU).

Procedure for Setting Up Multi-Connectivity

FIG. 13 shows the starting scenario, that is, prior to setting up DC to IAB Node 1. The IAB node 1 is connected via IAB node 2 and Donor DU 1 towards the Transport Network Layer (TNL). The Donor DU 1 may route any packets destined to the IP address 1 of the IAB node 1 over the wireless backhaul to IAB node 2. The routing may be based on a BAP identifier 1 associated with the IP address 1.

The Donor CU may determine, e.g., based on IAB node 1 RRC level measurements, IAB node capabilities etc. that the IAB node 1 may need to establish dual connectivity to IAB node 3. Existing NR-DC RRC procedure may be used to establish an SCG connection to the IAB node 3. As part of this message the Donor CU may configure: the BAP identifier for the SCG link to the IAB node 3, one or more Backhaul RLC channels between the IAB node 1 and IAB node 3, and a new BAP route for the new connection.

Once the new path is set up on the BAP, the IAB node 1 may be allocated a new IP address 2 for the new connection The result shown in FIG. 14 is that the IAB node 1 is dual-connected, where each path has a separate IP address and may be used for F1-C/U application layer redundancy.

An assumption may be that the Donor CU responsible for setting up DC to the IAB node may configure separate BAP identifiers for each connection, enabling allocation of separate IP addresses for each connection.

In case a child IAB node is connected to a parent IAB node which has support for multiple connections, as shown in FIG. 15 for IAB node 0, it may be possible for this child IAB node to also utilize these multiple connections. For this reason, it may be possible to assign such child IAB node multiple BAP identifiers. When the IAB node receives multiple BAP identifiers, it may request separate IP address for each BAP identifier.

An assumption may be that an IAB child node connected to one or more upstream IAB nodes that use NR-DC, may be allocated multiple BAP identifiers and IP addresses enabling it to utilize the multi-connectivity.

An IAB-node may need to multiplex the UE DRBs to the BH RLC-Channel. The following two options may be considered on bearer mapping in IAB-node.

Option 1. One-to-One Mapping Between UE DRB and BH RLC-Channel

In this option, depicted with one example in FIG. 16, each UE DRB may be mapped onto a separate BH RLC-channel, as depicted with the different patterns for the different channels. Further, each BH RLC-channel may be mapped onto a separate BH RLC-channel on the next hop. The number of established BH RLC-channels may be equal to the number of established UE DRBs.

Identifiers, e.g. for the UE and/or DRB, may be required, e.g., if multiple BH RLC-channels are multiplexed into a single BH logical channel. Which exact identifiers may be needed, and which of these identifier(s) may be placed within the adaptation layer header may depend on the architecture/protocol option.

Option 2. Many-to-One Mapping Between UE DRBs and BH RLC-Channel

For the many-to-one mapping, depicted with one example in FIG. 17, several UE DRBs may be multiplexed onto a single BH RLC-channel based on specific parameters such as bearer QoS profile. Other information such as hop-count may also be configured. The IAB-node may multiplex UE DRBs into a single BH RLC-channel even if they belong to different UEs. Furthermore, a packet from one BH RLC-channel may be mapped onto a different BH RLC-channel on the next hop. All traffic mapped to a single BH RLC-channel may receive the same QoS treatment on the air interface.

Since the BH RLC-channel may multiplex data from/to multiple bearers, and possibly even different UEs, each data block transmitted in the BH RLC-channel may need to contain an identifier of the UE, DRB, and/or IAB-node it may be associated with. Which exact identifiers may be needed, and which of these identifier(s) may be placed within the adaptation layer header may depend on the architecture/protocol option.

It has been agreed to support both N:1 and 1:1 mapping in rel-16.

For 1:1 bearer mapping, it has been agreed to use the IPv6 Flow Label field, where the donor DU may be configured to mapping IP packets that are marked with a given flow label to a particular Logical Channel IDentifier (LCID) on the first backhaul link between the donor DU and the first downstream IAB node. For the case of N:1 mapping, the working assumption may be the Differentiated Service Code Point (DSCP) field in the IP header may be used for the mapping purpose, in order to support also IPv4 networks. However, there is a discussion whether to have a unified behavior, where the IPv6 Flow Label may be used for N:1 mapping as well. It is also being considered to use the combination of the flow label and the DSCP field to use for 1:1 mapping.

Current Assumption on BAP Routing Functionality

Since BAP is a newly defined layer for IAB networks, 3GPP has made only the following agreements related to the BAP layer functionality: a) RAN2 confirms that routing and bearer mapping, e.g. mapping of BH RLC channels, may be BAP layer functions; b) RAN2 assumes that the TX part of the BAP layer may perform routing and "bearer mapping", and the RX part of the BAP layer may perform "bearer de-mapping"; c) RAN2 assumes that Service Data Units (SDUs) may be forwarded from the RX part of the BAP layer to the TX part of the BAP layer, for the next hop, for packets that are relayed by the IAB node; and d) it is For Further Study (FFS) how to model BAP layer protocol entities, e.g. whether separate for DU and MT or not, and how these may be configured, that is, via F1-AP or Radio Resource Control (RRC).

Furthermore, for the BAP routing, 3GPP made the following agreements:

The BAP routing Identifier (ID), carried in the BAP header, may consist of BAP address and BAP path ID. Encoding of the path ID in the header is FFS;

Each BAP address may define a unique destination, unique for IAB network of one donor-IAB, either an IAB access node, or the IAB donor;

Each BAP address may have one or multiple entries in the routing table to enable local route selection. Multiple entries may be for load balancing, re-routing at Radio Link Failure (RLF). For load balancing still FFS what may be decided locally and/or decided by the Donor;

Each BAP routing ID may have only one entry in the routing table;

The routing table may hold other information, e.g. priority level for entries with same BAP address, to support local selection. Configuration of this information may be optional.

Load balancing by routing by donor-IAB CU may be possible.

Local selection of path/route may be done at link failure, other cases FFS.

Existing methods for handling packets in a multi-hop integrated access and backhaul (IAB) deployment, based on the foregoing description, may lead to waste of radio resources, increased latency, waste of processing resources, and waste of energy resources.

SUMMARY

As part of the development of embodiments herein, one or more challenges with the existing technology will first be identified and discussed.

Duplication of packets in multi-hop networks according to existing methods, may lead to waste of radio resources, increased latency, waste of processing resources, and waste of energy resources. As a non-limiting example of a multi-hop network, IAB networks may be used herein.

In 3GPP, it has been discussed that IAB nodes may establish multiple connections to their parent node, either another IAB node or the donor DU. The setup of these multiple connections may be realized using the DC concept or by having multiple MTs at the IAB node. The backhaul links that may be connecting an IAB node with its parent(s) may be serving the end users' traffic and the PDCP of these bearers may be understood to be terminated at the UEs, not the IAB nodes. As such, even though an IAB node may have more than one link to its parents, the packets arriving at it cannot directly benefit from split bearer and duplication features of DC, as that may be understood to require PDCP termination at the IAB node for the sake of the end user traffic.

When supporting multi-connected IAB nodes, it may be desirable to support packet duplication over BH RLC channels for services requiring highly reliable low-latency delivery. However, no solutions have been introduced for supporting this so far.

It is an object of embodiments herein to improve the handling of handling transmission of one or more packets and/or one or more messages from a sending node to a receiving node in a communications network. It is a particular object of embodiments herein to improve the handling transmission of one or more packets and/or one or more messages from a sending node to a receiving node in a communications network comprising at least one intermediate node.

According to a first aspect of embodiments herein, the object is achieved by a method, performed by a first node. The method is for handling transmission of one or more packets and/or one or more messages from a sending node to a receiving node. The first node operates in a communications network. The communications network comprises at least one intermediate node between the sending node and the receiving node. The first node sends a first indication to a second node comprised in the communications network. The first indication explicitly indicates whether or not at least one of: i) the one or more packets are, or are to be, duplicated over a GTP layer, ii) duplication of the one or more packets over the GTP layer, is enabled, supported and/or active, iii) one or more messages are, or are to be, duplicated over a SCTP layer between the first node and one or more next hop nodes and iv) duplication of the one or more messages over the SCTP layer between the first node and the one or more next hop nodes is enabled, supported and/or active.

According to a second aspect of embodiments herein, the object is achieved by a method, performed by a second node. The method is for handling transmission of the one or more packets and/or the one or more messages from the sending node to the receiving node. The second node operates in the communications network. The communications network comprises at least one intermediate node between the sending node and the receiving node. The second node receives the first indication from the first node comprised in the communications network. The first indication explicitly indicates whether or not at least one of: i) the one or more packets are, or are to be, duplicated over the GTP layer, ii) duplication of the one or more packets over the GTP layer, is enabled, supported and/or active, iii) one or more messages are, or are to be, duplicated over the SCTP layer between the first node and the second node, and iv) duplication of the one or more messages over the SCTP layer between the first node and the second node is enabled, supported and/or active.

According to a third aspect of embodiments herein, the object is achieved by the first node. The first node is for handling transmission of the one or more packets and/or the one or more messages from the sending node to the receiving node. The first node is configured to operate in the communications network. The communications network is configured to comprise at least one intermediate node between the sending node and the receiving node. The first node is further configured to send the first indication to the second node configured to be comprised in the communications network. The first indication is configured to explicitly indicate whether or not at least one of: i) the one or more packets are, or are to be, duplicated over a GTP layer, ii) duplication of the one or more packets over the GTP layer, is enabled, supported and/or active, iii) one or more messages are, or are to be, duplicated over a SCTP layer configured to be between the first node and the one or more next hop nodes, and iv) duplication of the one or more messages over the SCTP layer between the first node and the one or more next hop nodes is enabled, supported and/or active.

According to a fourth aspect of embodiments herein, the object is achieved by the second node. The second node is for handling transmission of the one or more packets and/or the one or more messages from the sending node to the receiving node. The second node is configured to operate in the communications network. The communications network is configured to comprise at least one intermediate node between the sending node and the receiving node. The second node is further configured to receive the first indication from the first node configured to be comprised in the communications network. The first indication is configured to explicitly indicate whether or not at least one of: i) the one or more packets are, or are to be, duplicated over a GTP layer, ii) duplication of the one or more packets over the GTP layer, is enabled, supported and/or active, iii) one or more messages are, or are to be, duplicated over a SCTP layer configured to be between the first node and the second node, and iv) duplication of the one or more messages over the SCTP layer between the first node and the second node is enabled, supported and/or active.

By sending the first indication, the first node may enable that either the second node performs GTP duplication and/or that GTP duplication is enabled in transmissions between the first node and the second node. The first node may hereby enable to increase the reliability of delivery of the one or more packets and/or the one or more messages. This is because if one of the GTP links experiences a link problem or congestion and/or delays, the one or more packets and/or the one or more messages may be transported over another GTP link. This may be understood to also decrease the latency. Since the GTP layer may be present at the CU and at the access node, as another advantage, the first node may enable that the duplication be performed anywhere along the connection, preferably at the point where a path may split, which may be understood to avoid unnecessary duplication, e.g., along the same path. As a further advantage, by enabling duplication at the intermediate nodes or at the access IAB node, embodiments herein may be understood to also enable that UEs that may not be capable of packet duplication, in the UL or/and DL, may still benefit from it.

BRIEF DESCRIPTION OF THE DRAWINGS

Examples of embodiments herein are described in more detail with reference to the accompanying drawings, and according to the following description.

DETAILED DESCRIPTION

Certain aspects of the present disclosure and their embodiments may provide solutions to these challenges or other challenges. There are, proposed herein, various embodiments which address one or more of the issues disclosed herein.

As a brief overview, embodiments herein may be understood to relate to enhancements to improve data reliability for multi-connected IAB nodes, e.g., relays, by using GTP-based duplication.

As a simplified overview, embodiments herein may provide mechanisms for packet duplication in the backhaul links of an IAB network either in the source node, e.g., Donor CU-UP or access IAB node, or in intermediate nodes, e.g., intermediate IAB nodes or Donor DU. Embodiments herein may also provide mechanisms for removing duplicates either in the end node, e.g., Donor CU-UP or access IAB node, or in the UE.

Embodiments herein may utilize GTP level duplication, that is, packet duplication and duplicate removal performed at the GTP level, as compared to PDCP level duplication that is currently available in 3GPP rel-15.

In general, embodiments herein may therefore be understood to be related to 5G NR, IAB, multipath connectivity, F1.C, mapping, and/or IAB-donor-CU.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
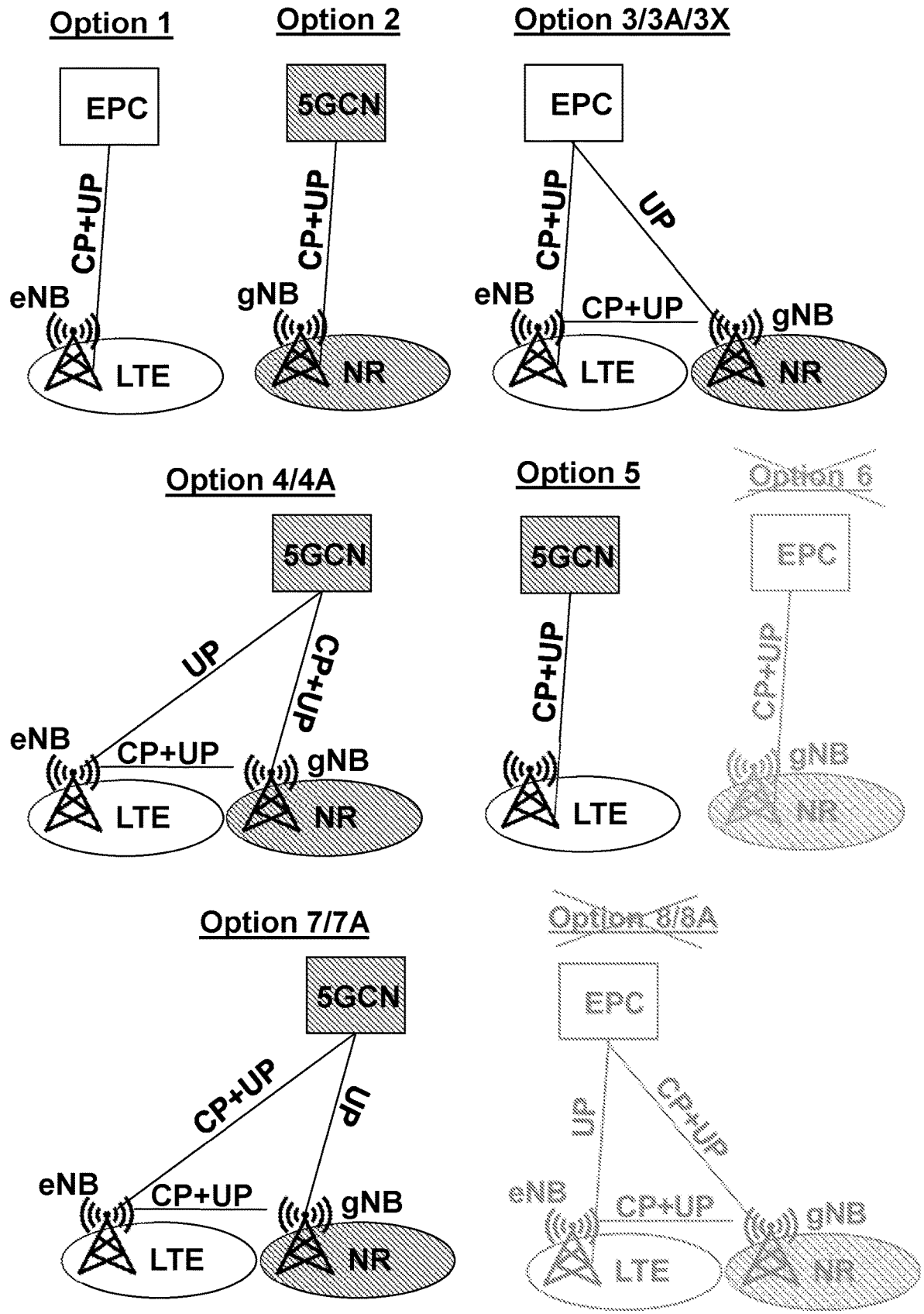
FIG. 1 is a schematic diagram illustrating examples of LTE and NR interworking options, according to existing methods.
Figure 2:
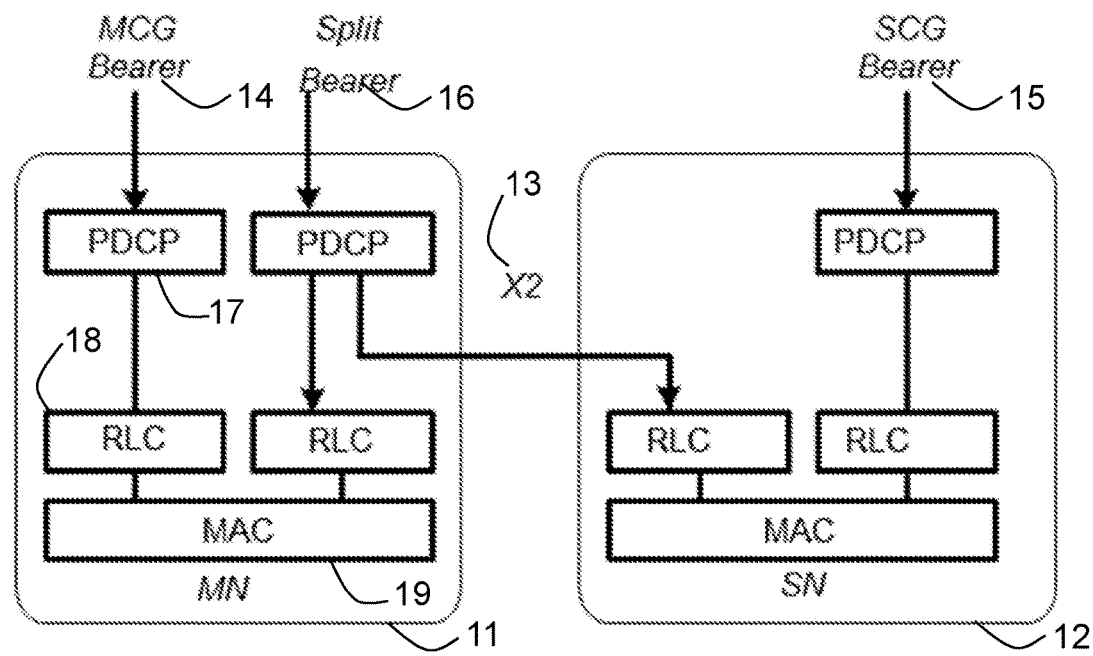
FIG. 2 is a schematic diagram illustrating an example of a LTE DC User Plane (UP), according to existing methods.
Figure 3:
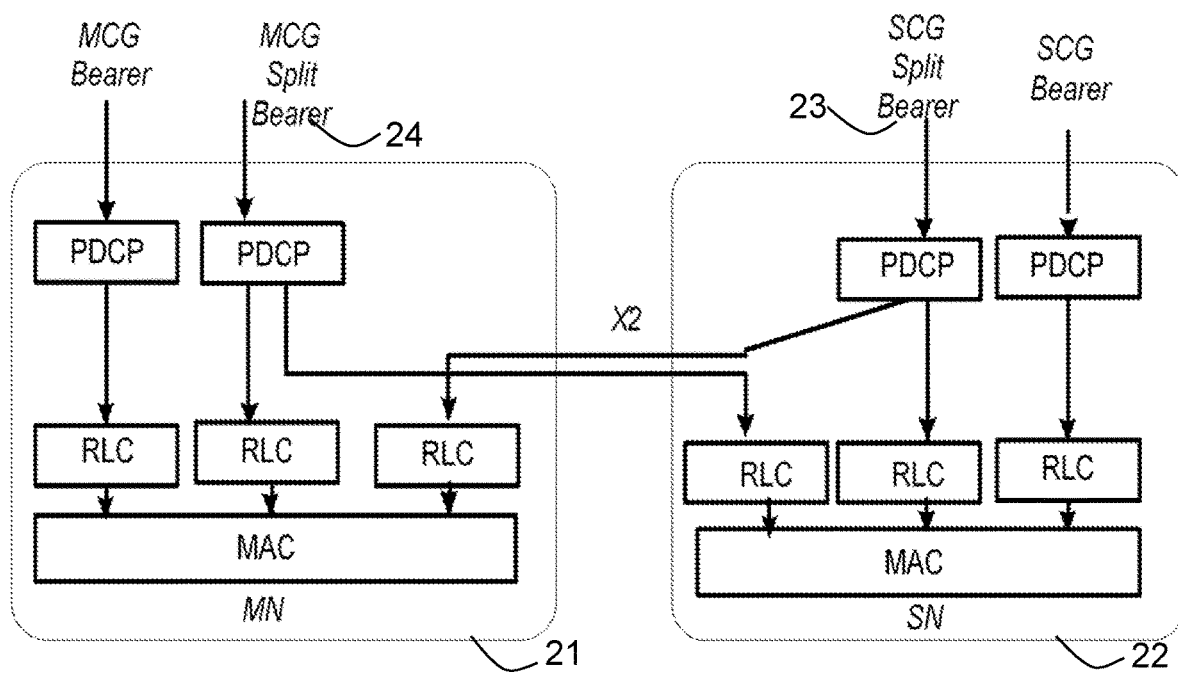
FIG. 3 is a schematic diagram illustrating an example of LTE-NR tight interworking (UP), according to existing methods.
Figure 4:
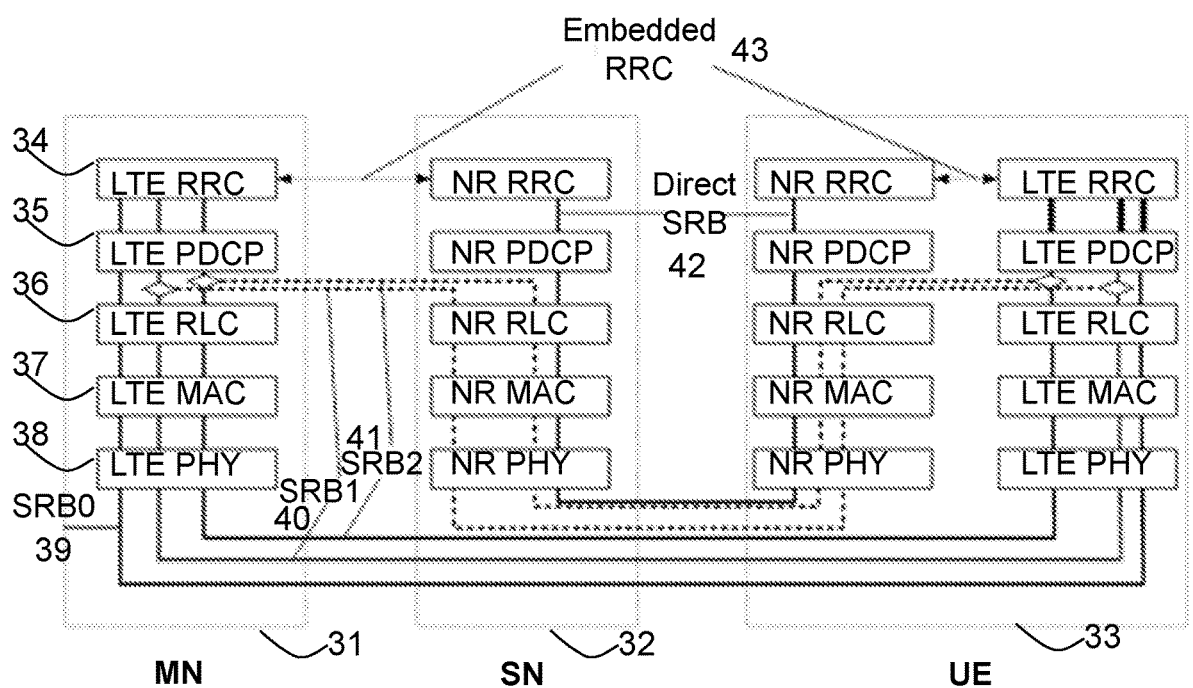
FIG. 4 is a schematic diagram illustrating an example of LTE-NR tight interworking (CP), according to existing methods.
Figure 5:
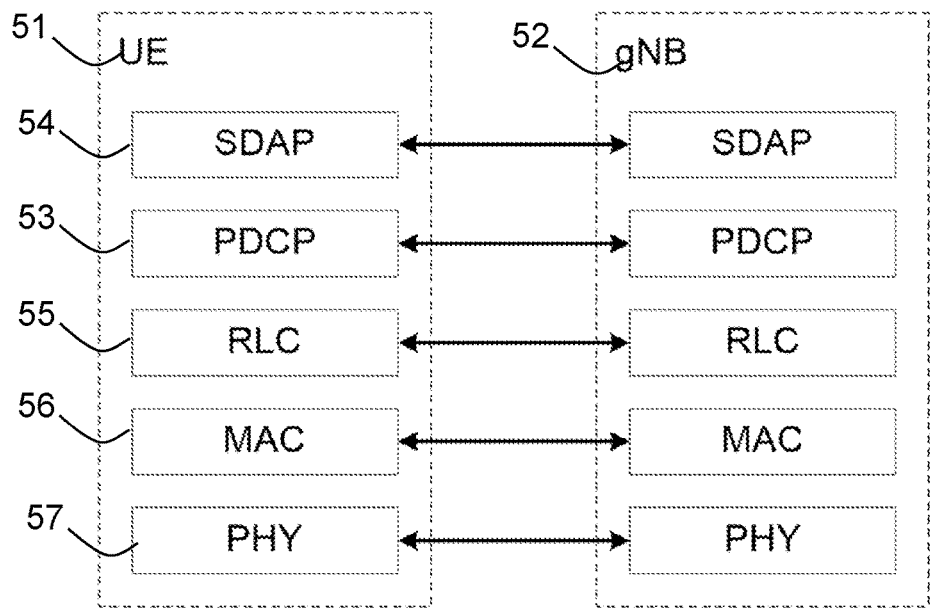
FIG. 5 is a schematic diagram illustrating an example of a User Plane Protocol Stack, according to existing methods.
Figure 6:
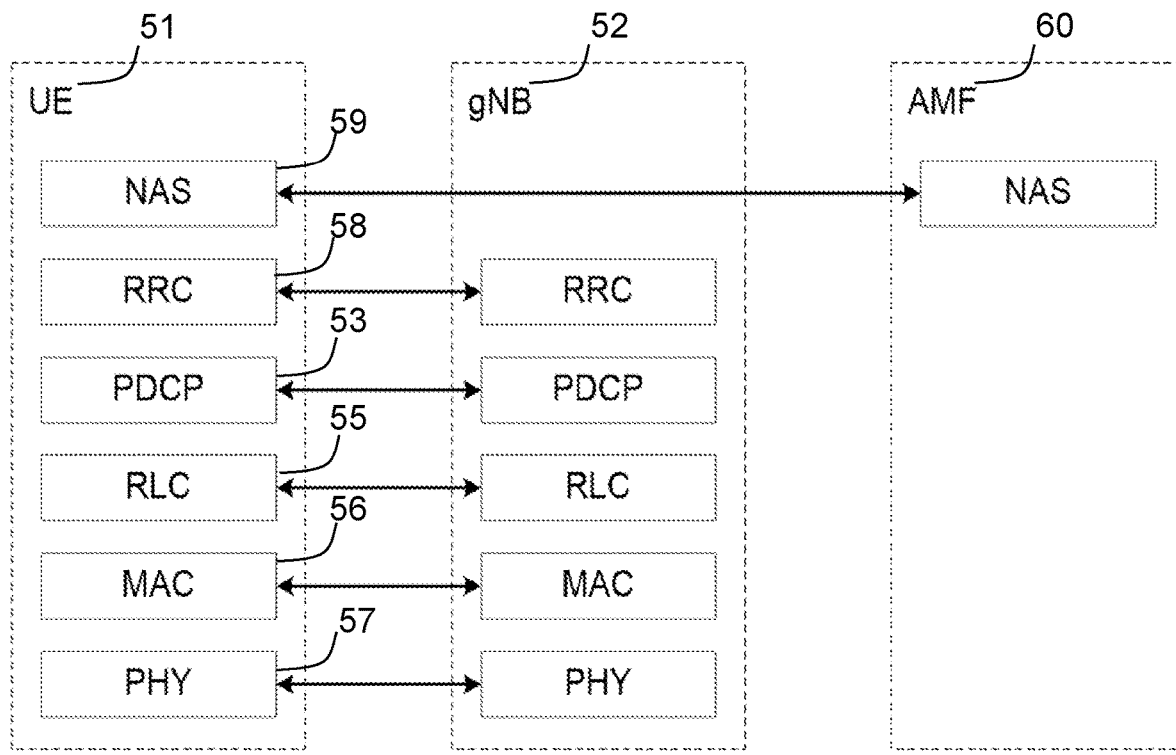
FIG. 6 is a schematic diagram illustrating an example of a Control Plane Protocol Stack, according to existing methods.
Figure 7:
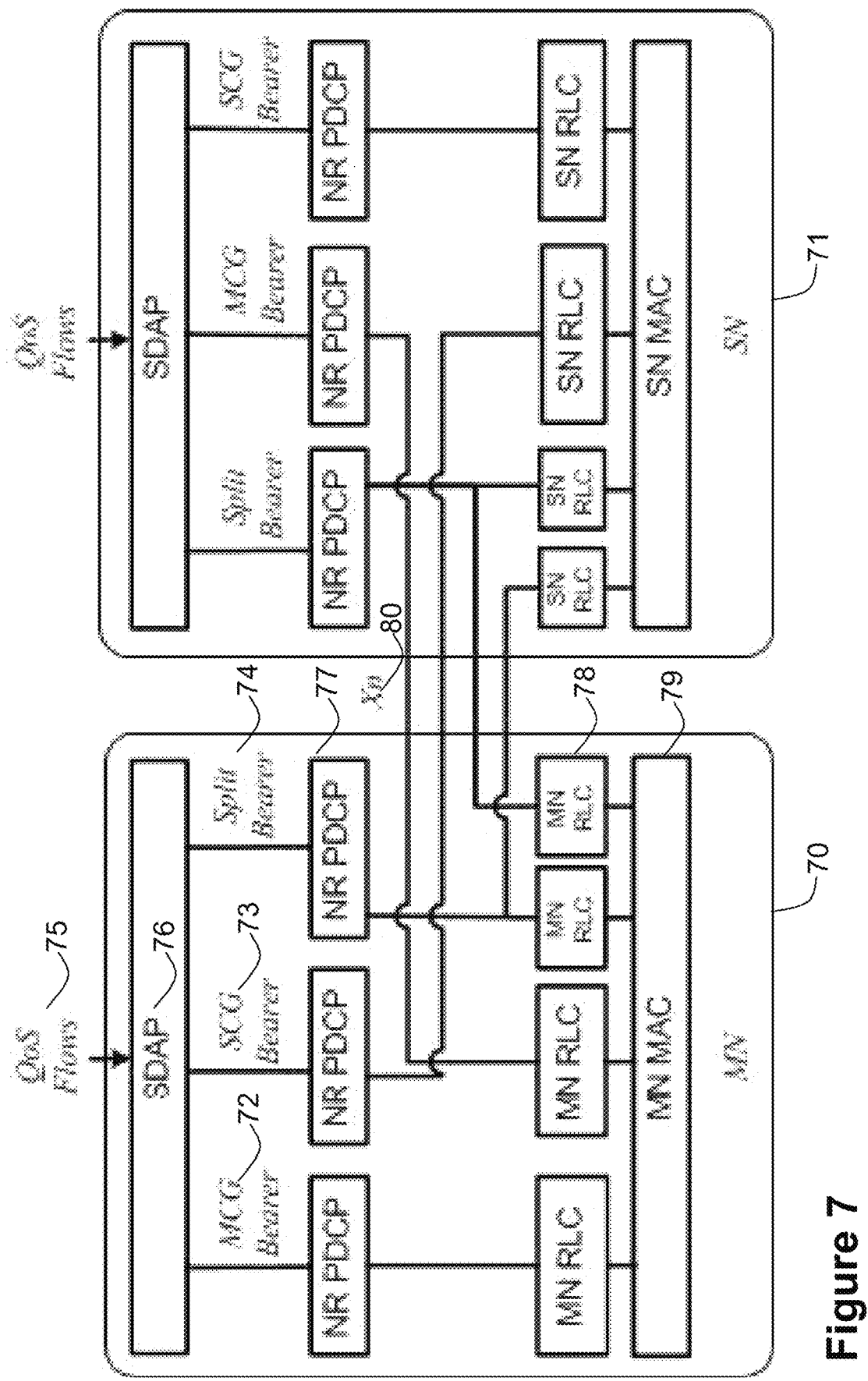
FIG. 7 is a schematic diagram illustrating an example of a network side protocol termination options for MCG, SCG and split bearers in MR-DC with 5GC, NGEN-DC, NE-DC and NR-DC, according to existing methods.
Figure 8:
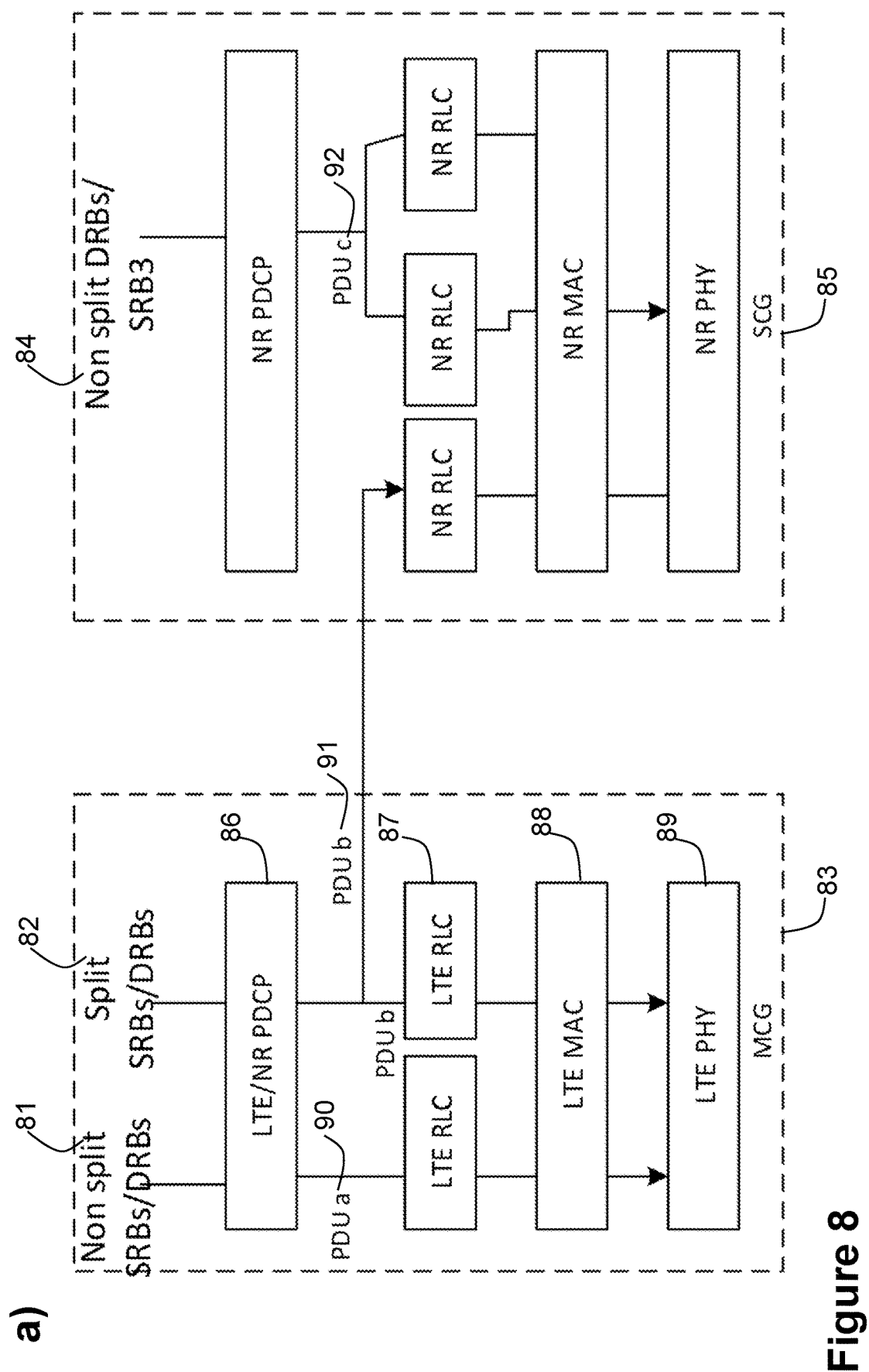
FIG. 8 is a schematic diagram illustrating an example of CA level and DC level packet duplication of SRBs and DRBs alternatives a) SRB and DRB duplication for EN-DC, b) SRB and DRB duplication for NE-DC, and c) SRB and DRB duplication for NR-NR DC, according to existing methods.
Figure 8:
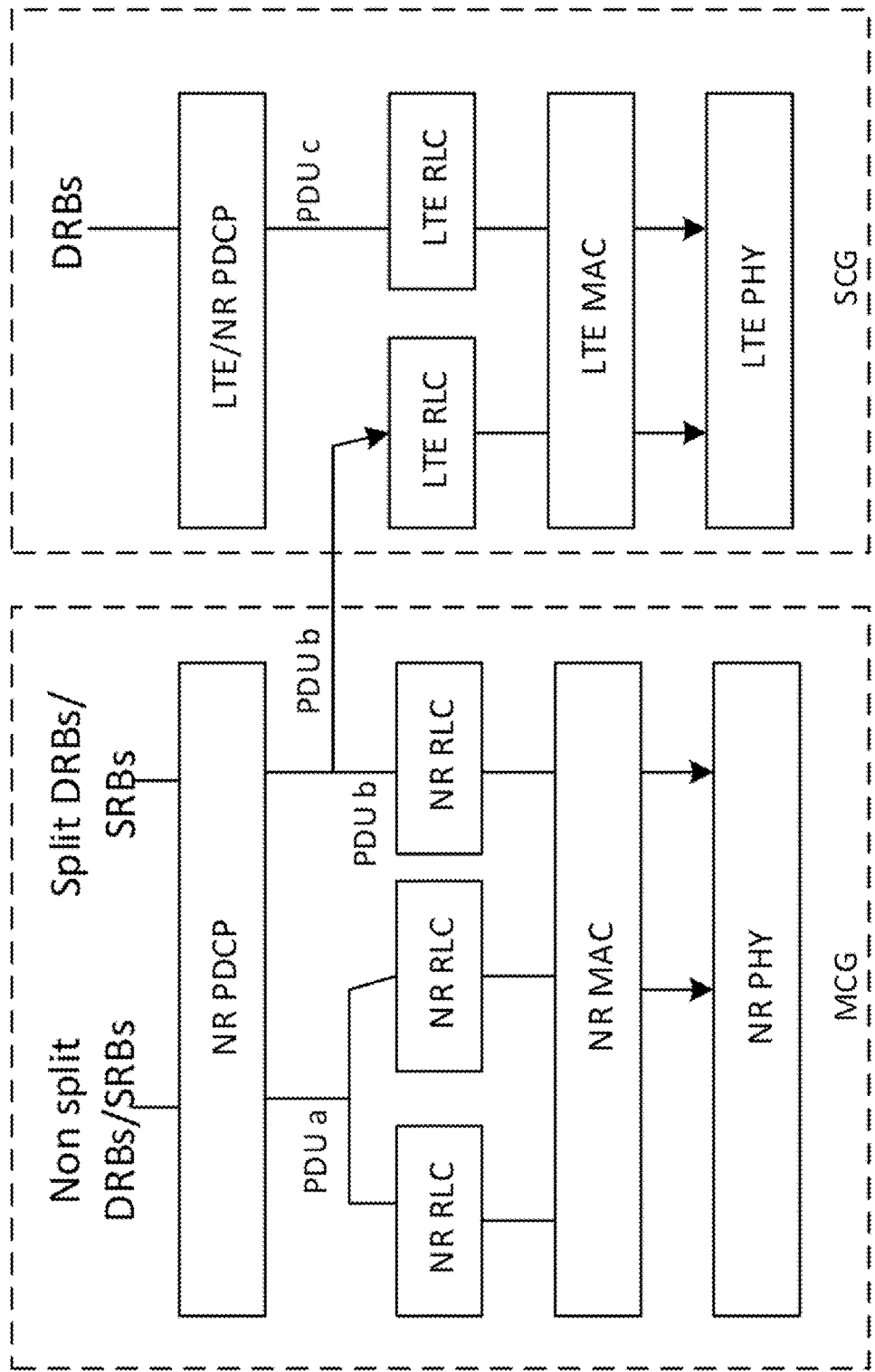
Figure 8:
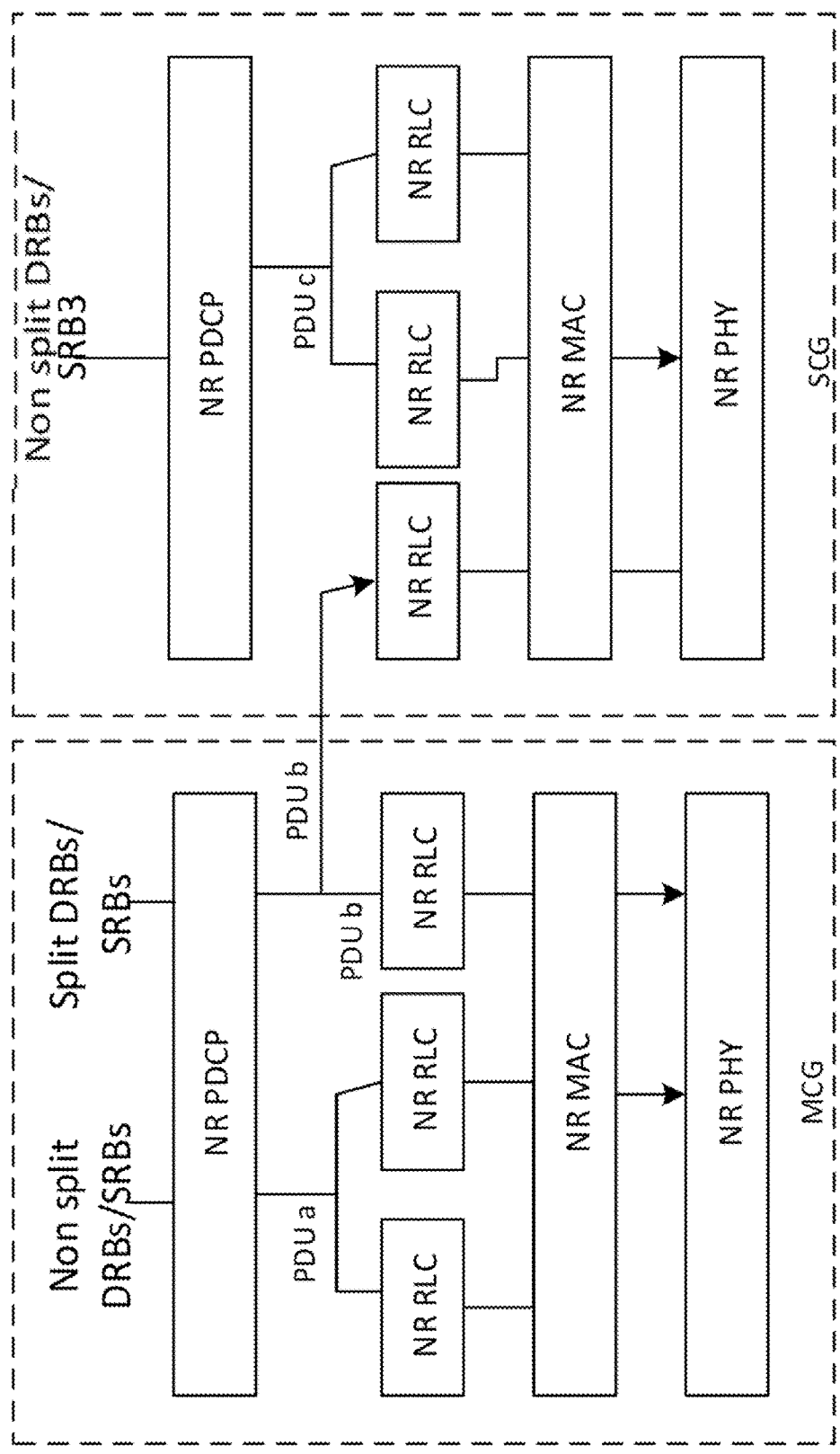
Figure 9:
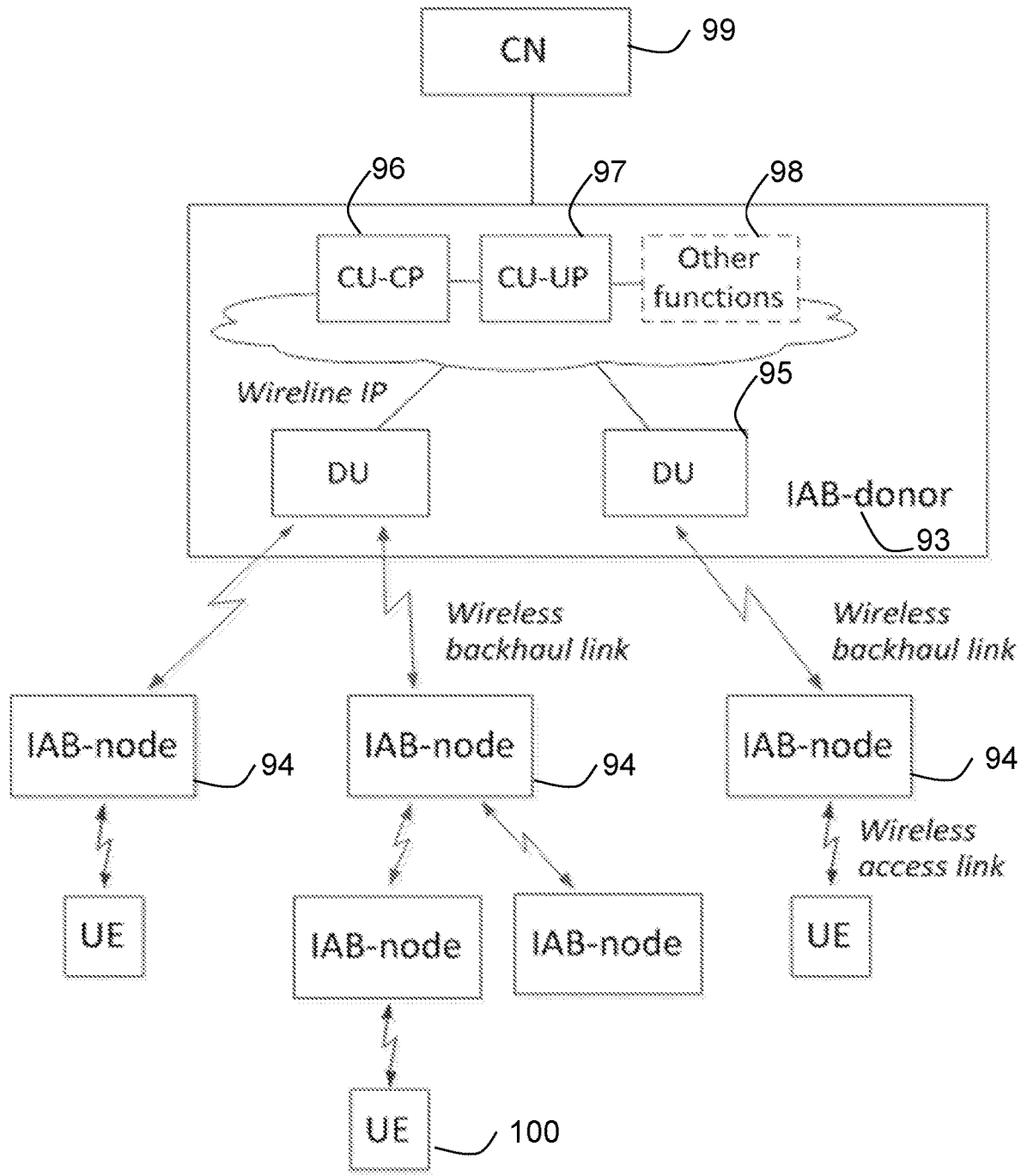
FIG. 9 is a schematic diagram illustrating an example of a reference diagram for IAB-architectures, TR 38.874, 16.0.0, according to existing methods.
Figure 10:
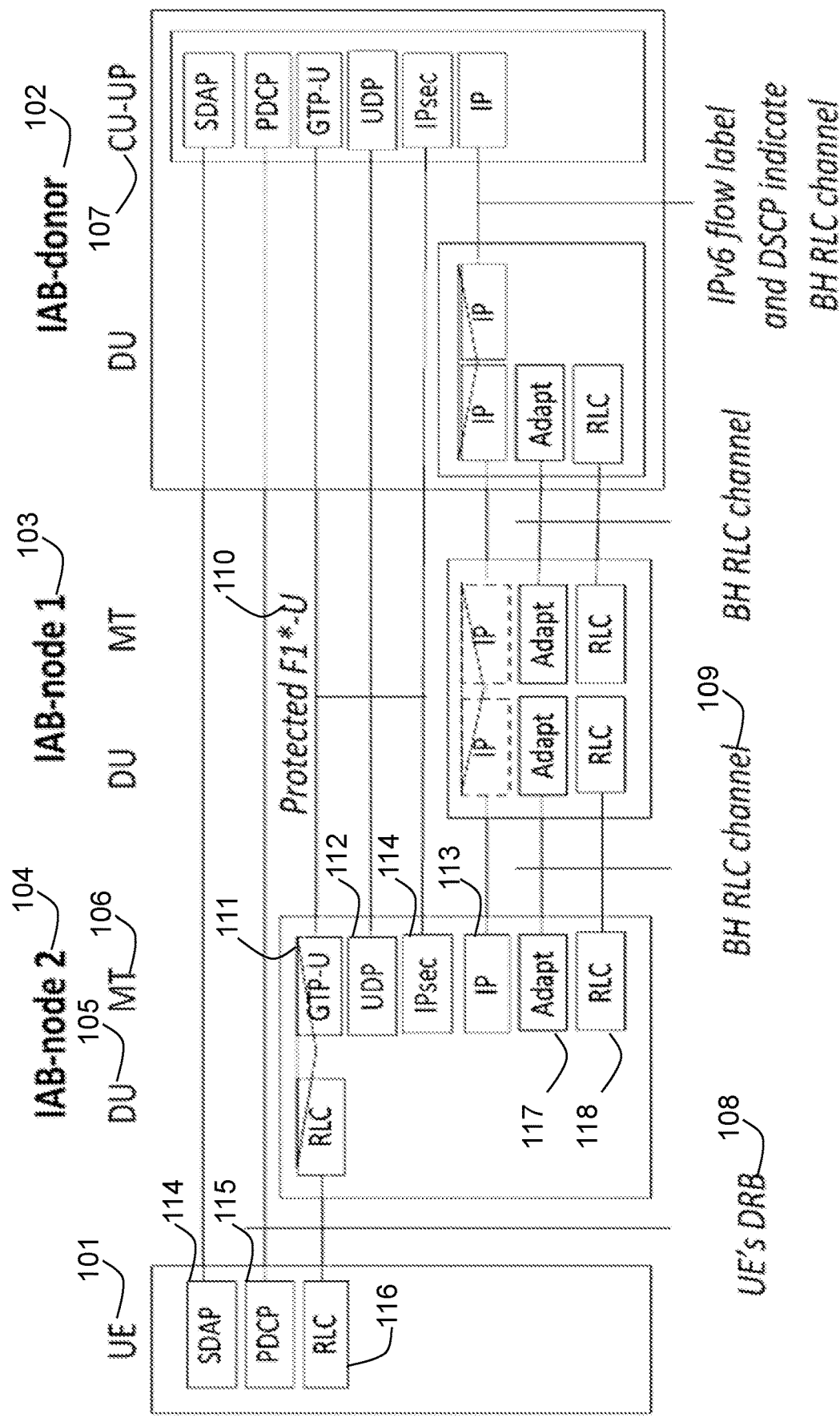
FIG. 10 is a schematic diagram illustrating an example of a baseline User Plane (UP) Protocol stack for IAB in rel-16, according to existing methods.
Figure 11:
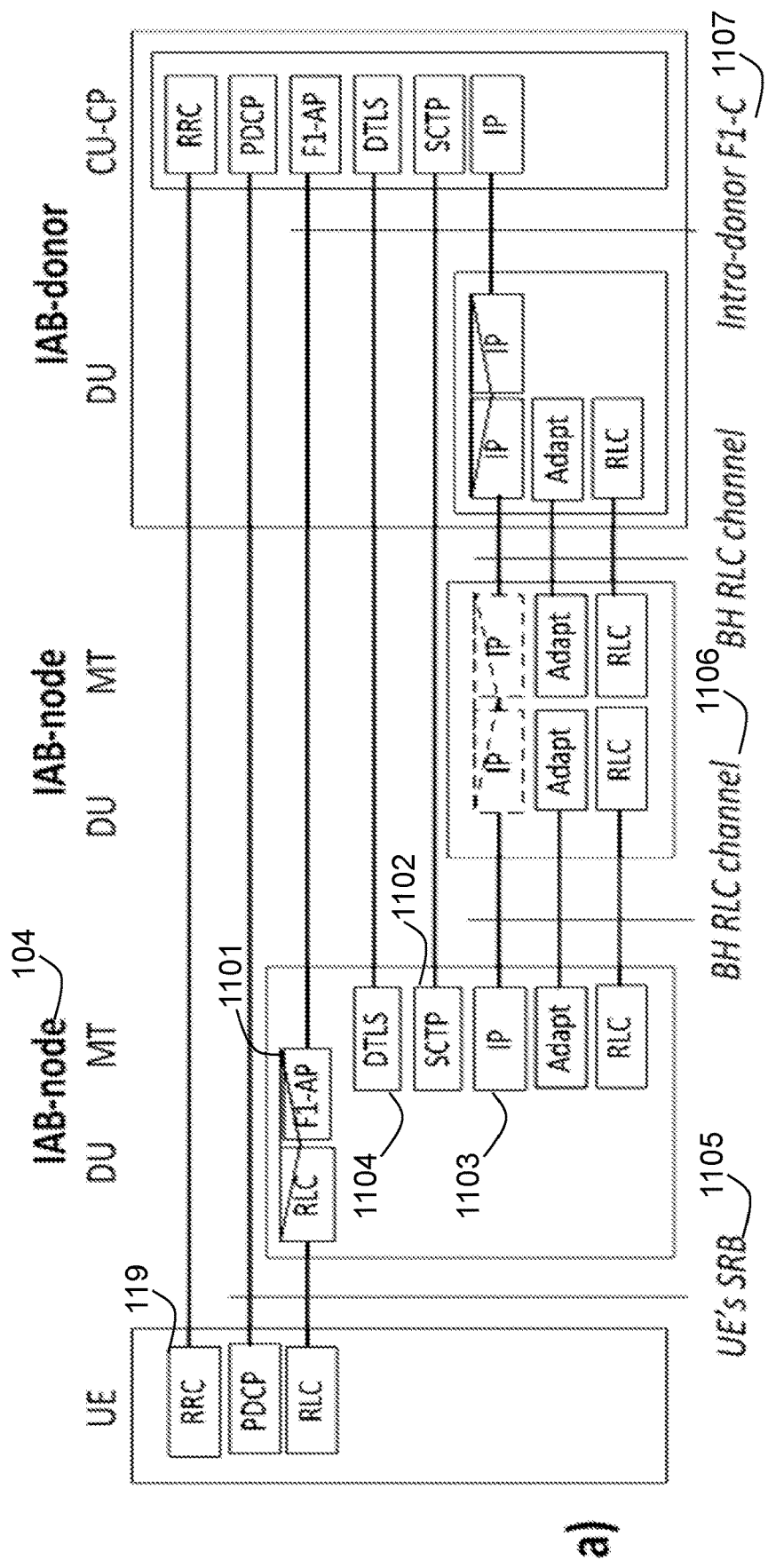
FIG. 11 is a schematic diagram illustrating an example of a baseline control plane (CP) Protocol stack for IAB in rel-16, according to existing methods.
Figure 11:
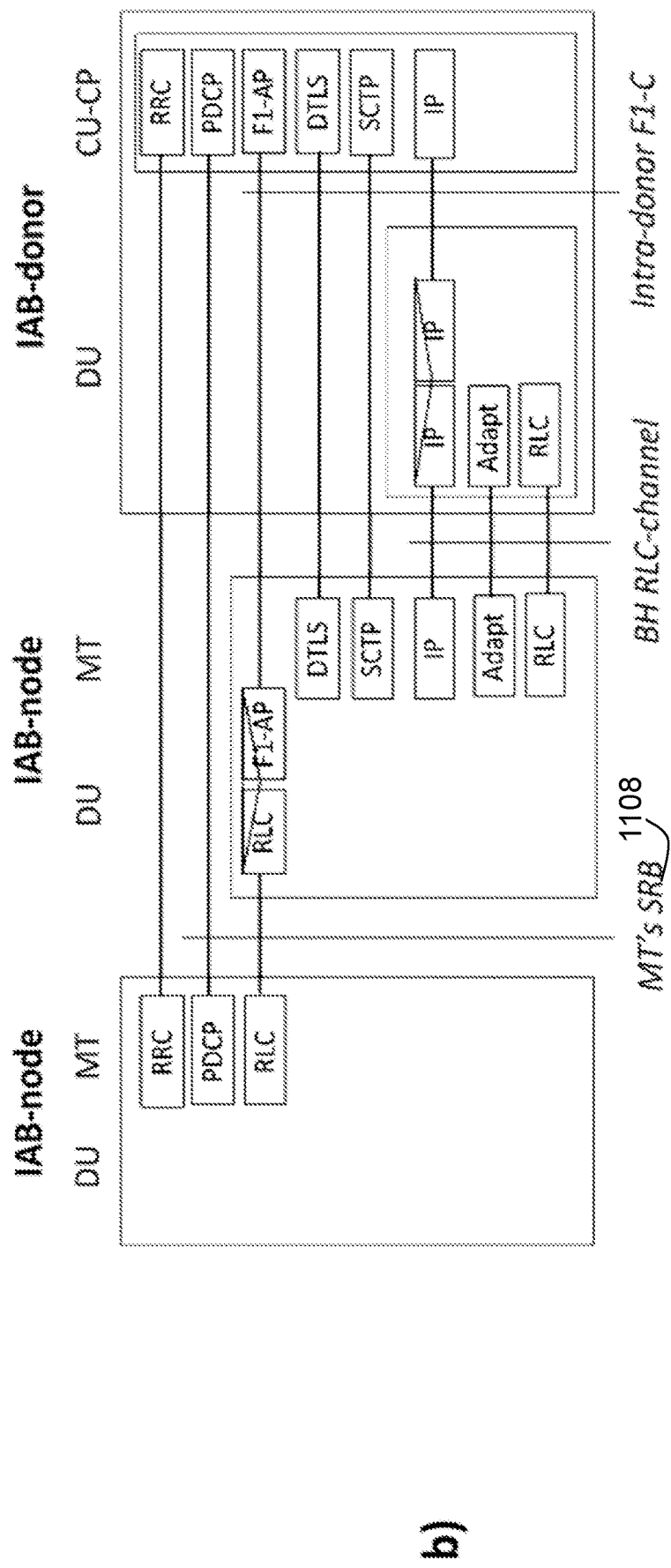
Figure 11:
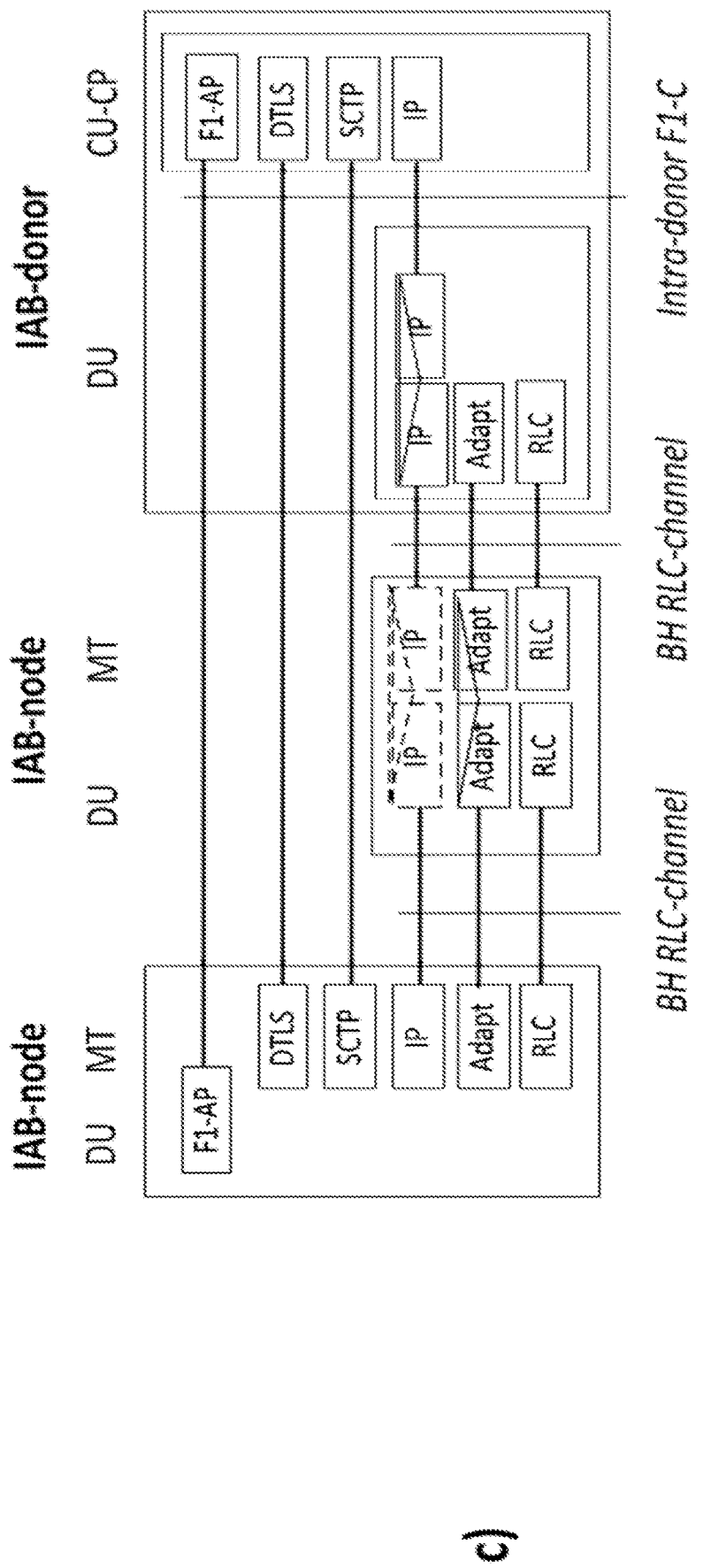
Figure 12:
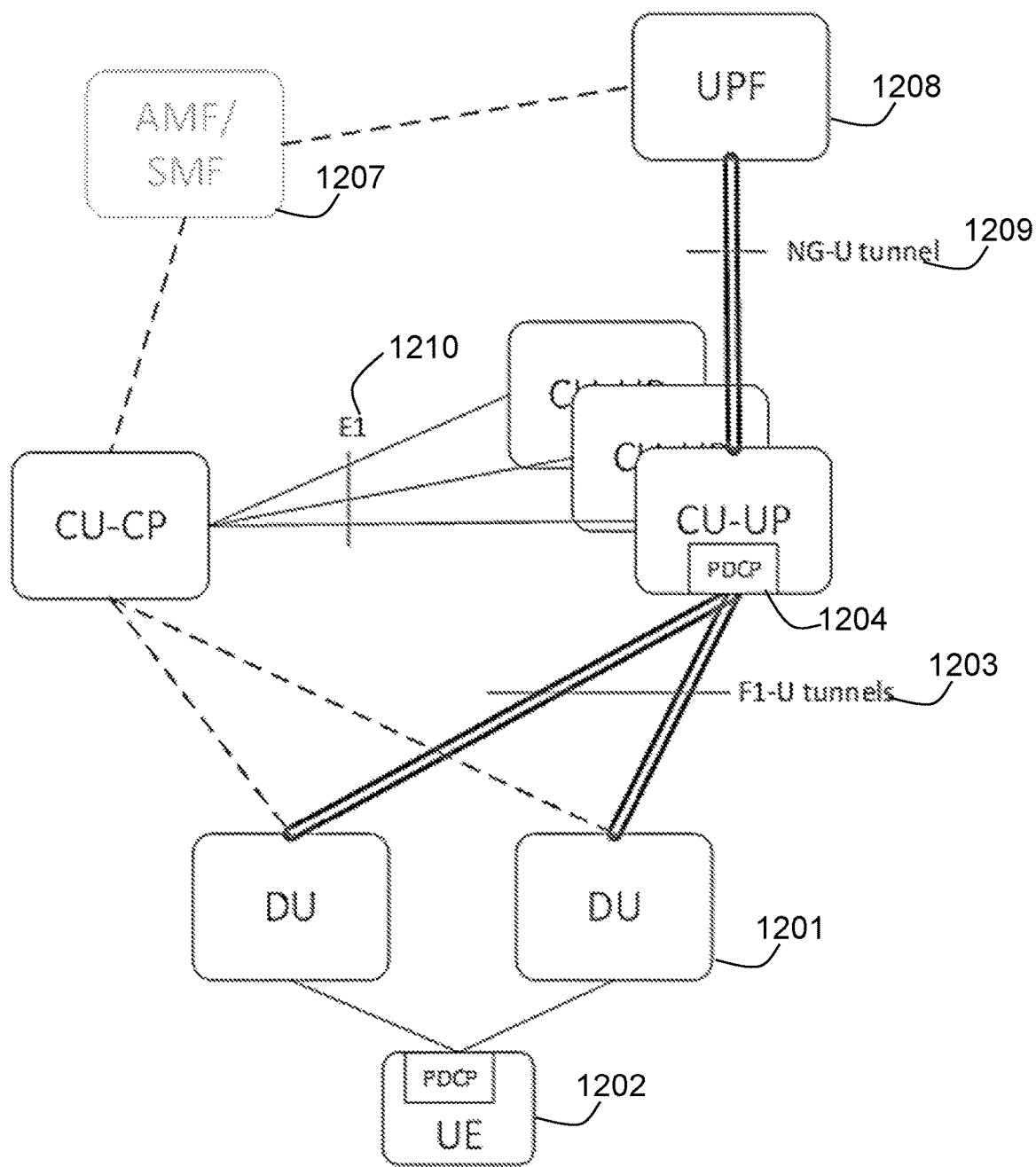
FIG. 12 is a schematic diagram illustrating an example of support for NR DC to UEs, according to existing methods.
Figure 13:
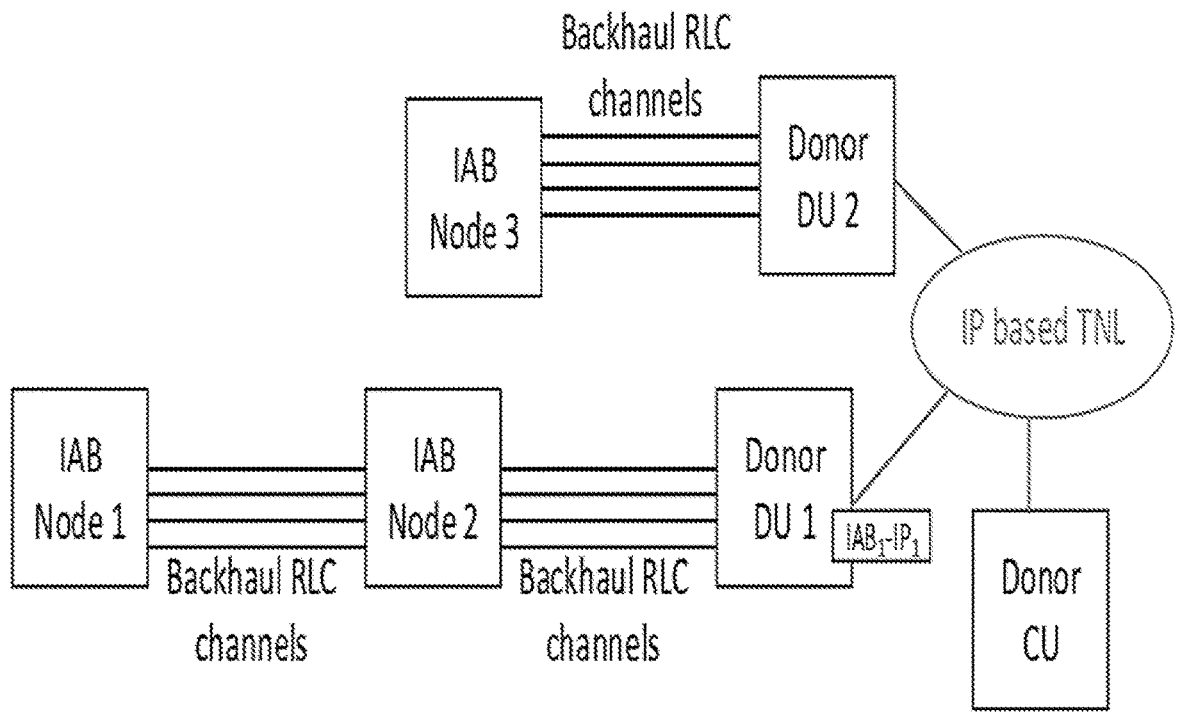
FIG. 13 is a schematic diagram illustrating an example of an IAB network, prior to setting up dual connectivity, according to existing methods.
Figure 14:
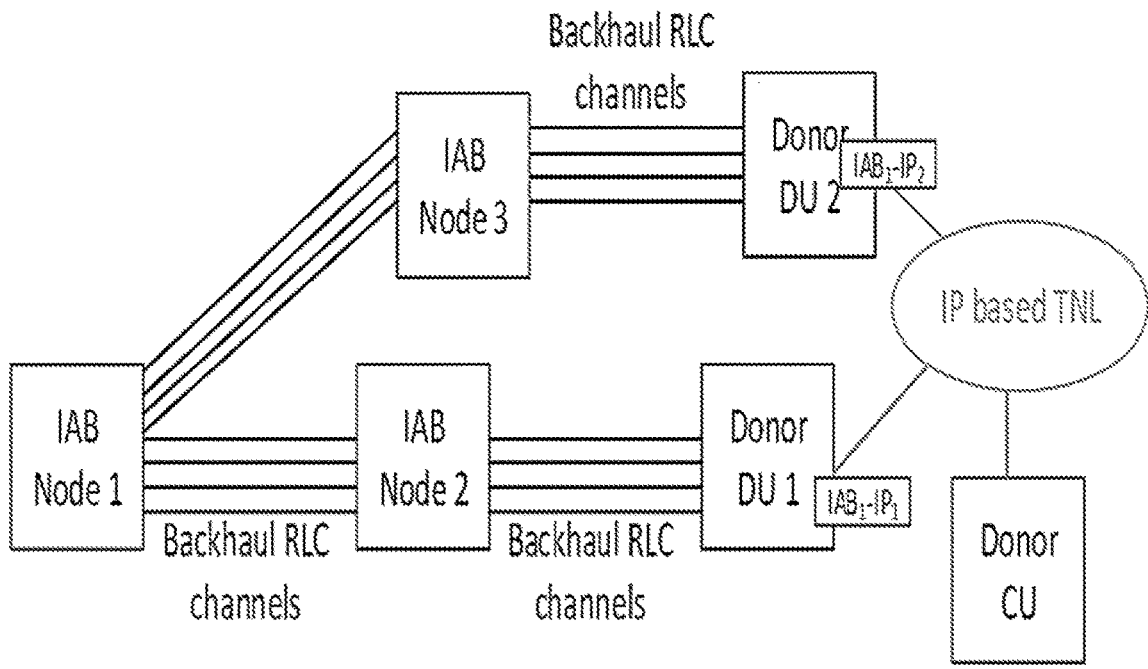
FIG. 14 is a schematic diagram illustrating an example of a Dual Connectivity setup for IAB Node 1, according to existing methods.
Figure 15:
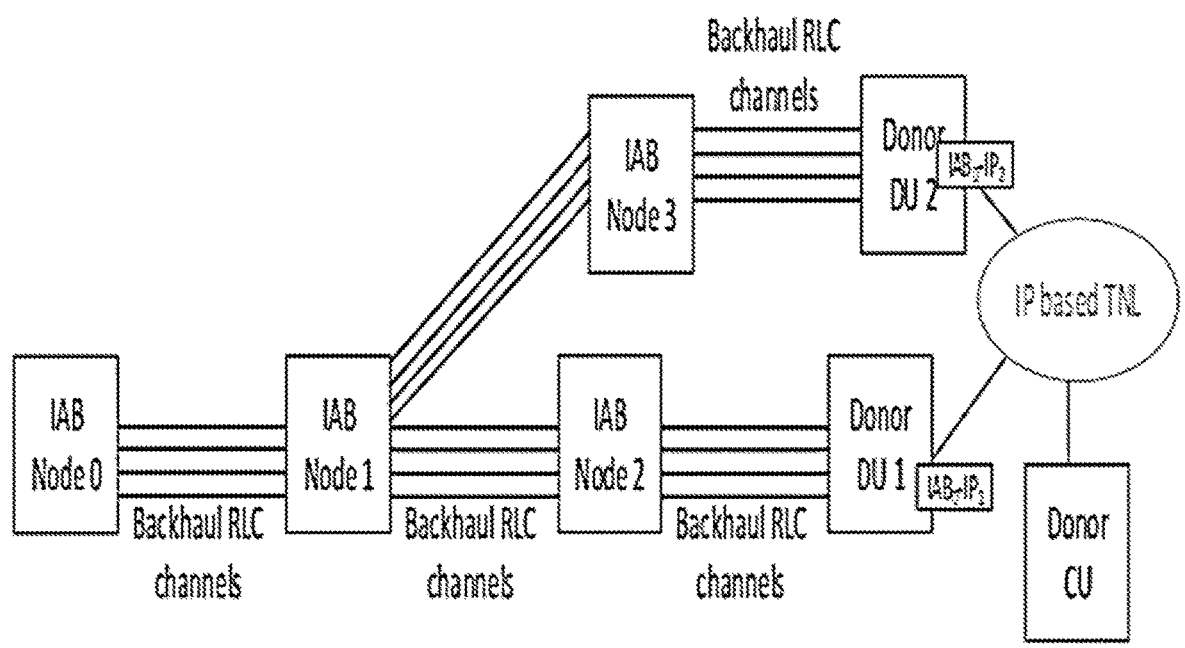
FIG. 15 is a schematic diagram illustrating an example of child IAB-node connected to a parent node supporting multi-connection, according to existing methods.
Figure 16:
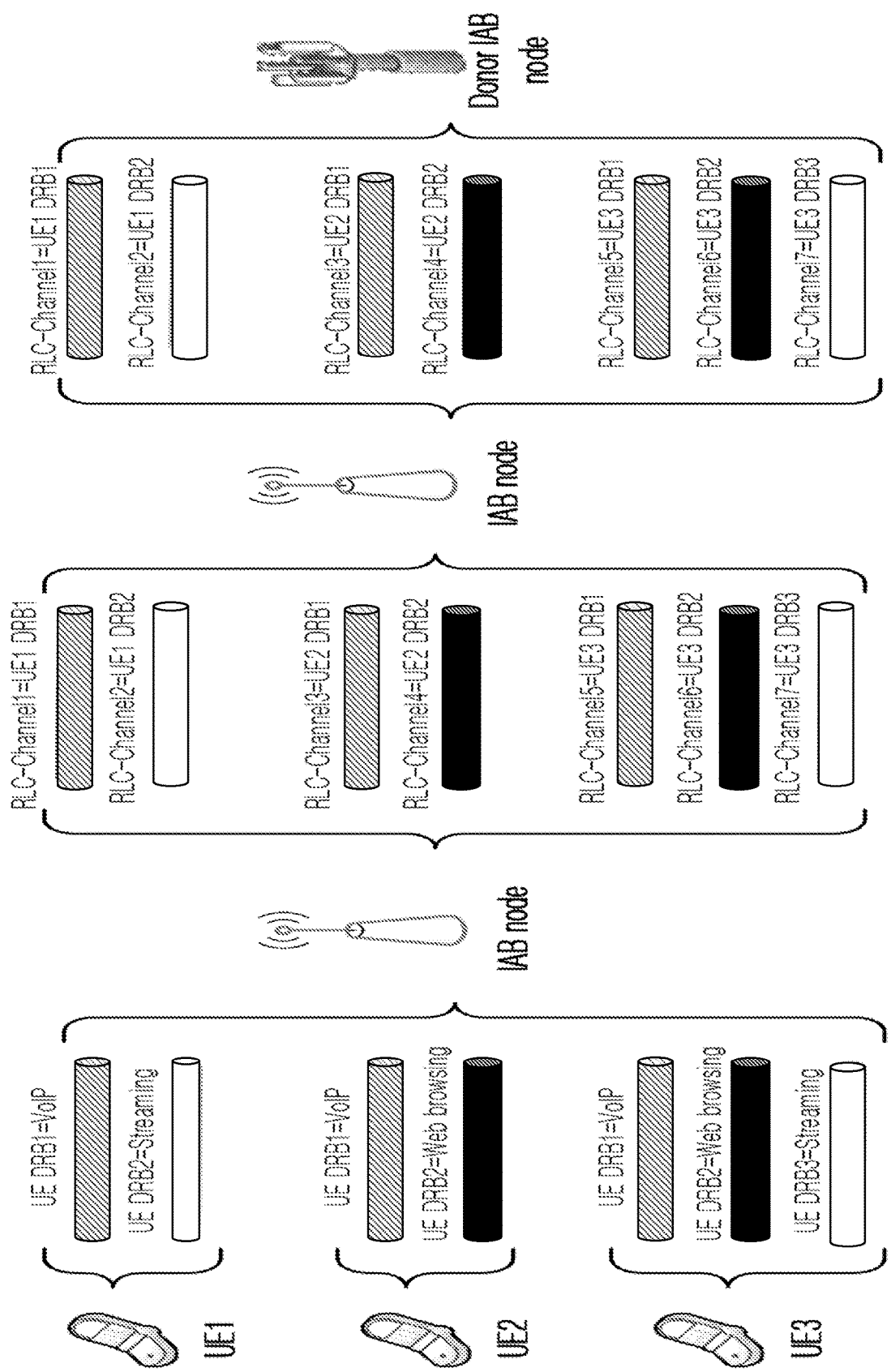
FIG. 16 is a schematic diagram illustrating an example of one-to-one mapping between UE DRB and BH RLC-Channel, according to existing methods.
Figure 17:
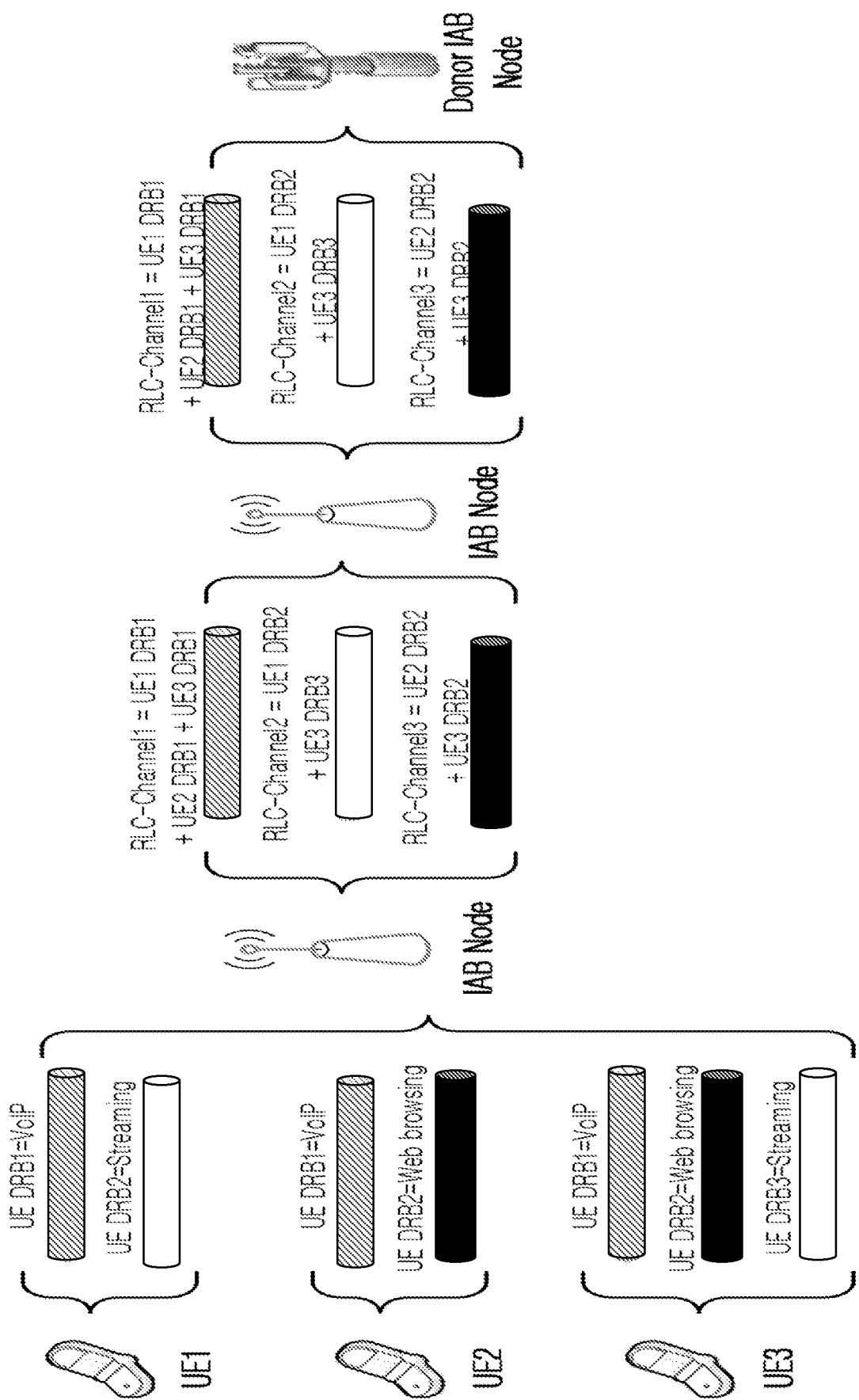
FIG. 17 is a schematic diagram illustrating an example of many-to-one mapping between UE DRBs and BH RLC-channel, according to existing methods.
Figure 18:
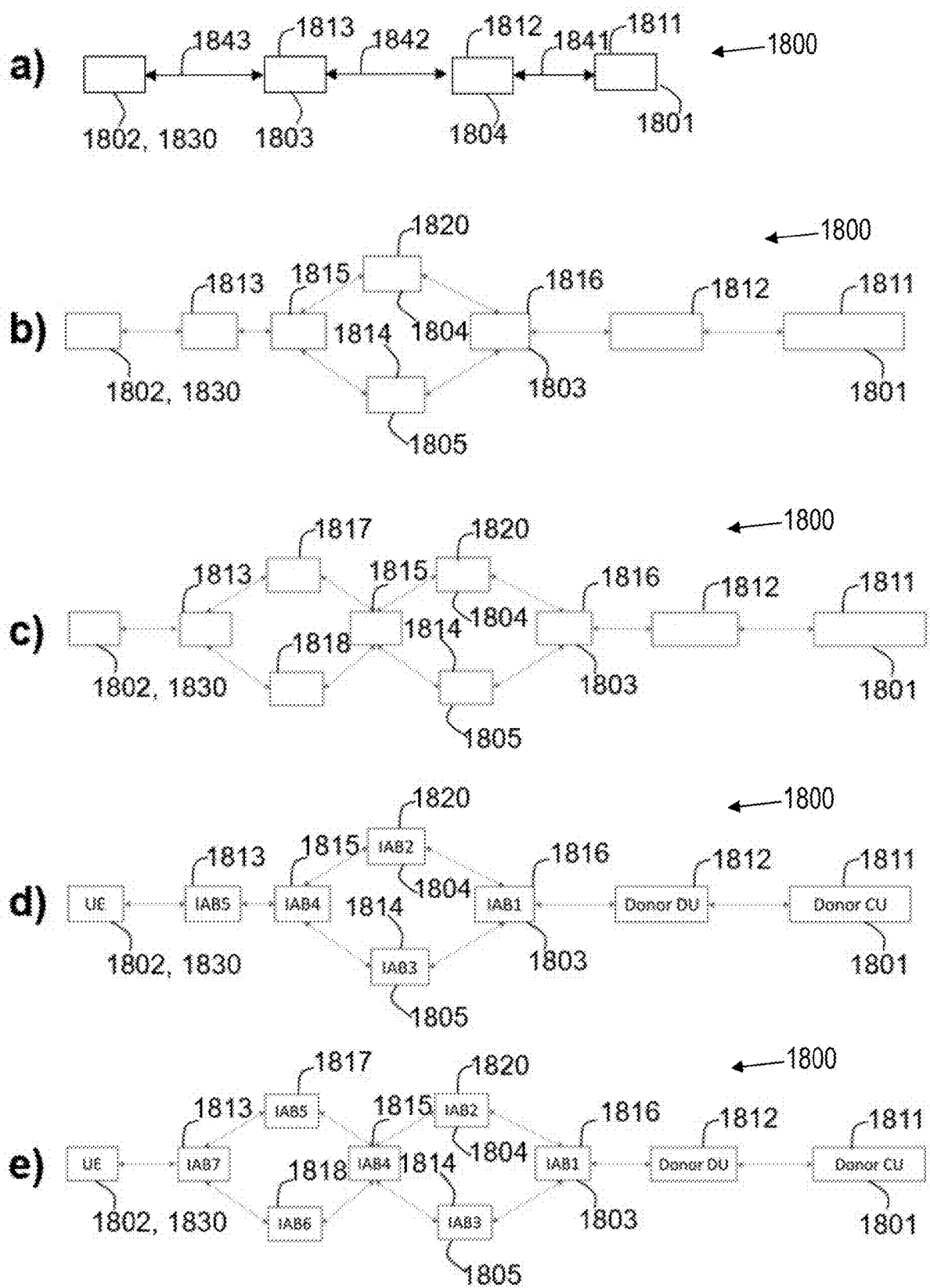
FIG. 18 is a schematic diagram illustrating a communications network, according to embodiments herein.
Figure 18:
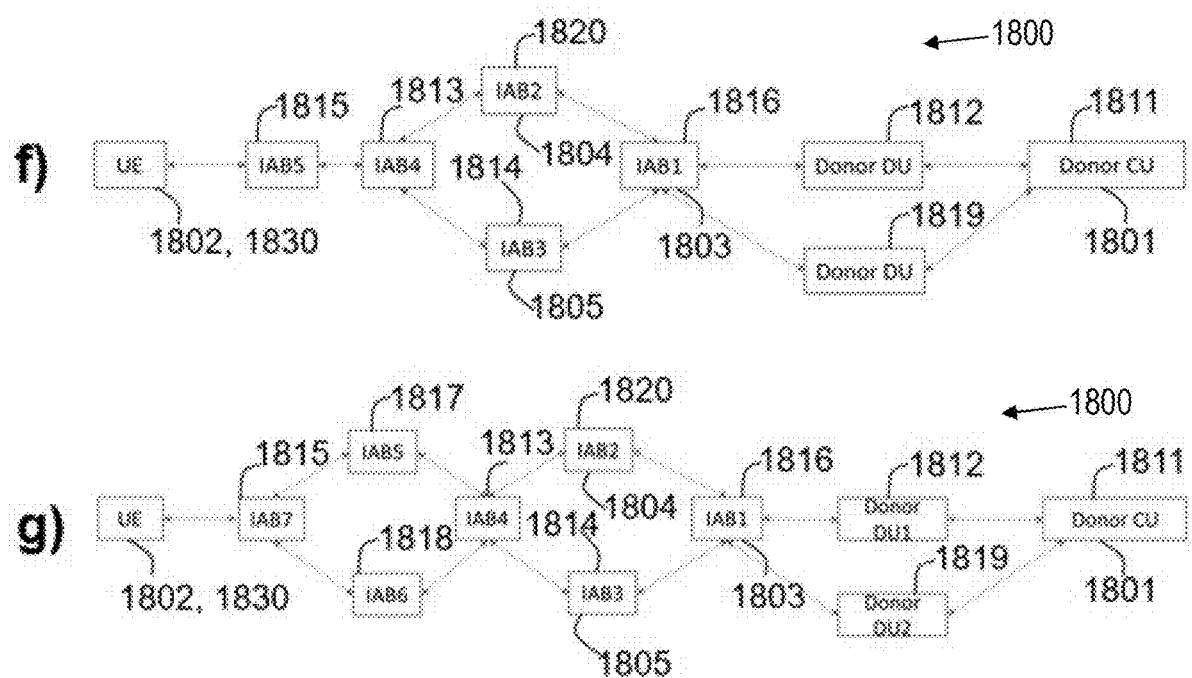

FIG. 18 depicts seven non-limiting examples of a communications network 1800, which may be a wireless communications network, sometimes also referred to as a wireless communications system, cellular radio system, or cellular network, in which embodiments herein may be implemented. The communications network 1800 may typically be a 5G system, 5G network, NR-U or Next Gen System or network, Long-Term Evolution (LTE) system, or a combination of both. The communications network 1800 may alternatively be a younger system than a 5G system. The communications network 1800 may support technologies such as, particularly, LTE-Advanced/LTE-Advanced Pro, e.g., LTE Frequency Division Duplex (FDD), LTE Time Division Duplex (TDD), LTE Half-Duplex Frequency Division Duplex (HD-FDD), LTE operating in an unlicensed band. The communications network 1800 may support yet other technologies such as, for example, License-Assisted Access (LAA), Narrow Band Internet of Things (NB-IoT), Machine Type Communication (MTC), MulteFire, Wideband Code Division Multiplexing Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (WiMax). In particular embodiments, such as those depicted in panels d), e), f) and g), the communications network 1800 may be an Integrated Access and Backhaul (IAB) network. Thus, although terminology from 5G/NR and LTE may be used in this disclosure to exemplify embodiments herein, this should not be seen as limiting the scope of the embodiments herein to only the aforementioned systems.

The communications network 1800 comprises a plurality of nodes, whereof a sending node 1801, a receiving node 1802, and at least one intermediate node 1803 between the sending node 1801 and the receiving node 1802 are depicted in the non-limiting examples of FIG. 18. The sending node 1801 may be understood as a node in the communications network 1800 that may send or may need to send, or send at a future time point, one or more packets, and/or one or more messages to or towards the receiving node 1802. The sending may be performed in the UL or in the DL. In some embodiments, at least one of the sending node 1801 and the receiving node 1802 may be a device, e.g., a wireless device, such as the wireless device 1830 described below. In some embodiments, at least one of the sending node 1801 and the receiving node 1802, may be a network node. In particular, the one of the sending node 1801 and the receiving node 1802 that may be a network node may be a donor node within the communications network 1800. The donor node may be understood to be, e.g., a node having a connection, e.g., a wired backhaul connection, to a core network node of the communications network 1800, which is not depicted in FIG. 18 to simplify the Figure. In some particular embodiments, at least one of the sending node 1801 and the receiving node 1802 may be a CU of a donor node, e.g., an IAB-Donor CU. In other particular embodiments, at least one of the sending node 1801 and the receiving node 1802 may be a DU or the donor node, e.g., an IAB-Donor DU. The communications network 1800 may also comprise one or more next hop. The one or more next hope may be understood to be one hop away from a given node, which may be provided as a reference.

The communications network 1800 comprises other nodes, whereof a first node 1811, a second node 1812 and a third node 1813 are depicted in the non-limiting examples of FIG. 18. In some of the examples, since the communications network 1800 may have different deployments in different examples, as illustrated in a non-limiting manner in panels a)-g), the communications network 1800 may also comprise one or more of: a fourth node 1814, a fifth node 1815, a sixth node 1816, a seventh node 1817, an eighth node 1818, a ninth node 1819 and/or a tenth node 1820. An access node, e.g., an Access IAB-DU, and a donor may be able to GTP duplicate, as will be described later. 'Intermediate' and 'access' may be understood as a role that a node, e.g., an IAB node, may play with respect to UEs, e.g., the wireless device 1830. One node, e.g., IAB node, may be the access node to its connected UEs, e.g., the wireless device 1830 but may be an intermediate node to UEs of its child nodes, e.g., IAB nodes. A similar remark may be made with respect to the sending node 1801. the receiving node 1802 and the one or more next hop nodes 1804, 1805. These may be understood as roles that the nodes, or the wireless device 1830 described later, in the communications network 1800 may play. Hence, for example, as illustrated in the non-limiting examples of FIG. 18, some of the nodes and/or the wireless device 1830 may have two different reference numbers. One of the reference numbers may be understood to identify the node or the wireless device 1830, and the other number may be understood to identify the role that particular node or wireless device 1830 may be playing in a particular example, with respect to a route the one or more packets may follow in a particular occasion. Any of the at least one intermediate node 1803 and the one or more next hop may be any of the first node 1811, the second node 1812, the third node 1813, the fourth node 1814, the fifth node 1815, the sixth node 1816, the seventh node 1817, the eighth node 1818, the ninth node 1819 and the tenth node 1820.

Any of the first node 1811, the second node 1812, the third node 1813, the fourth node 1814, the fifth node 1815, the sixth node 1816, the seventh node 1817, the eighth node 1818, the ninth node 1819 and the tenth node 1820 may be a radio network node, such as a radio base station, base station or a transmission point, or any other network node with similar features capable of serving a user equipment, such as a wireless device or a machine type communication device, in the communications network 1800. For example, any of the first node 1811, the second node 1812, the third node 1813, the fourth node 1814, the fifth node 1815, the sixth node 1816, the seventh node 1817, the eighth node 1818, the ninth node 1819 and the tenth node 1820 may be a gNB, an eNB, an eNodeB, or an Home Node B, an Home eNode B. Any of the first node 1811, the second node 1812, the third node 1813, the fourth node 1814, the fifth node 1815, the sixth node 1816, the seventh node 1817, the eighth node 1818 the ninth node 1819 and the tenth node 1820 may be of different classes, such as, e.g., macro base station (BS), home BS or pico BS, based on transmission power and thereby also cell size. In some embodiments, any of the first node 1811, the second node 1812, the third node 1813, the fourth node 1814, the fifth node 1815, the sixth node 1816, the seventh node 1817, the eighth node 1818, the ninth node 1819 and the tenth node 1820 may be implemented as one or more distributed nodes, such as virtual nodes in the cloud, and they may perform their functions entirely on the cloud, or partially, in collaboration with one or more radio network nodes.

As depicted in the non-limiting examples of FIG. 18, the communications network 1800 may comprise a multi-hop deployment, wherein one of the first node 1811, the second node 1812, the third node 1813, the fourth node 1814, the fifth node 1815, the sixth node 1816, the seventh node 1817, the eighth node 1818, the ninth node 1819 and the tenth node 1820 may be a donor node. Any of the first node 1811, the second node 1812, the third node 1813, the fourth node 1814, the fifth node 1815, the sixth node 1816, the seventh node 1817, the eighth node 1818, the ninth node 1819 and the tenth node 1820 not being a donor node, may be a relay node. In some particular embodiments, such as those depicted in panels d), e), f) and g) any of the first node 1811, the second node 1812, the third node 1813, the fourth node 1814, the fifth node 1815, the sixth node 1816, the seventh node 1817, the eighth node 1818, the ninth node 1819 and the tenth node 1820 may be an IAB node, which may, in some embodiments, be a stationary relay/IAB node or a mobile relay/IAB node.

It may be understood that the communications network 1800 may comprise more nodes, and more or other multi-hop arrangements, which are not depicted in FIG. 18 to simplify the Figure.

Any of the first node 1811, the second node 1812, the third node 1813, the fourth node 1814, the fifth node 1815, the sixth node 1816, the seventh node 1817, the eighth node 1818, the ninth node 1819 and the tenth node 1820, with respect to the sending node 1801, the receiving node 1802, the at least one intermediate node 1803 and the one or more next hop may be independent nodes or may be co-localized, or be part of the same network node. The one of the sending node 1801 and the receiving node 1802 being a donor node, may be considered in some examples as the first node 1811.

At least one of the first node 1811, the second node 1812, the third node 1813, the fourth node 1814, the fifth node 1815, the sixth node 1816, the seventh node 1817, the eighth node 1818, the ninth node 1819 and the tenth node 1820 may be a node providing access to the communications network 1800 to one of the sending node 1801 and the receiving node 1802, e.g., to the wireless device 1830. That is, at least one of the first node 1811, the second node 1812, the third node 1813, the fourth node 1814, the fifth node 1815, the sixth node 1816, the seventh node 1817, the eighth node 1818, the ninth node 1819 and the tenth node 1820 may be an access node.

In FIG. 18, for illustrative purposes only and in a non-limiting way, the sending node 1801 is depicted as a donor node, the receiving node 1802 is depicted as a wireless device, e.g., the wireless device 1830, the first node 1811 is depicted as the Donor node, e.g., a CU of a donor node, and the fifth node 1815 is depicted as the access node, and the other nodes are depicted as intermediate nodes in some examples.

The communications network 1800 covers a geographical area which may be divided into cell areas, wherein each cell area may be served by any of the first node 1811, the second node 1812, the third node 1813, the fourth node 1814, the fifth node 1815, the sixth node 1816, the seventh node 1817, the eighth node 1818, the ninth node 1819 and the tenth node 1820 although, any of the first node 1811, the second node 1812, the third node 1813, the fourth node 1814, the fifth node 1815, the sixth node 1816, the seventh node 1817, the eighth node 1818, the ninth node 1819 and the tenth node 1820 may serve one or several cells. In the non-limiting example of FIG. 18, the cells are not depicted to simplify the Figure.

A wireless device 1830, or more, may be located in the wireless communication network 1800. The wireless device 1830, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The wireless device 1830 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 1830 comprised in the communications network 1800 is enabled to communicate wirelessly in the communications network 1800. The communication may be performed e.g., via a RAN, and possibly the one or more core networks, which may be comprised within the communications network 1800.

The first node 1811 may be configured to communicate in the communications network 1800 with the second node 1812 over a first link 1841. The second node 1811 may be configured to communicate in the communications network 1800 with the third node 1813 over a second link 1842. The wireless device 1830 may be configured to communicate in the communications network 1800 with the third node 1813 over a third link 1843.

Each of the first link 1841, the second link 1842, and the third link 1843 may be, e.g., a radio link. Any two given nodes in the communications network 1800 may communicate with each other with a respective link. These links are not numbered in panels b)-g) to avoid overcrowding the Figure and facilitate the readability of the Figure.

A connection between any two given nodes in the communications network may follow one or more paths. For example, a packet or a message may follow different paths in the communications network 1800 between any two given nodes.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", "fifth", . . . , "tenth", etc. herein may be understood to be an arbitrary way to denote different elements or entities and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first node, such as the first node 1811, e.g., a first network node such as an IAB node, and embodiments related to a second node, such as the second node 1812, e.g., a second network node such as another IAB node.

General

Embodiments herein may be understood to be applicable to any kind of IAB deployment, e.g., multiple hops with only on donor DU, multiple hops with different donor DUs, multiple hops with several IAB nodes having multiple connectivity, etc. . . . . Some example IAB deployment scenarios are depicted in FIG. 18d), e), f) and/or g), which correspond, respectively, to Scenario-I (one Donor DU, access IAB node single connected), Scenario-II (one Donor DU, access IAB node multiple connected), Scenario-III (multiple Donor DUs, access IAB node single connected), and Scenario-IV (multiple Donor DUs, access IAB node multiple connected).

The terms "downstream" and "downlink (DL)" are used interchangeably.

The terms "upstream" and "uplink (UL)" are used interchangeably.

The terms "backhaul (BH) RLC channel" and "backhaul (BH) bearers" and "backhaul (BH) logical channel" are used interchangeably.

The term "access IAB node" may refer to the IAB node that may be directly serving the wireless device 1830, e.g., a UE, and "intermediate IAB node" may refer to any IAB node between the donor DU and the access IAB node.

In the description below, "duplication" may be used to refer to sending the original and a copy. However, the methods of embodiments herein may be equally applicable if more than one copy is to be sent, e.g., for services that may require extreme reliability and latency.

Although it is not described for the sake of brevity, there is nothing that prevents packet duplication at the UE bearer level to work in conjunction with duplication at the BH RLC channel level, e.g., packet duplication may be enabled at the wireless device 1830 and also at the BH RLC channel level as per the methods of embodiments herein, resulting in 3 copies of the original packet being transmitted between the CU-UP and access IAB node, and 1 copy of the original packet being transmitted between the UE and access IAB node.

Unless otherwise specified, the term CU may be understood to cover both the control and data plane, i.e. CU-CP and CU-UP.

The descriptions below may assume that an IAB that has multiple connectivity may realize that multiple connectivity via DC or having multiple MTs. However, duplication may be realized over a BH RLC channel, even if there is only one parent node, by using carrier aggregation.

Some embodiments herein may be further described with some non-limiting examples.

In the following description, any reference to a/the/any intermediate IAB-node, or simply "IAB-node", described as e.g., indicating duplication may be understood to equally refer the first node 1811; any reference to a/the/any UE may be understood to equally refer the first wireless device 1830.

Embodiments of a method, performed by the first node 1811, will now be described with reference to the flowchart depicted in FIG. 19. The method may be understood to be for handling transmission of one or more packets and/or one or more messages from the sending node 1801 to the receiving node 1802. The first node 1811 operates in the communications network 1800. The communications network 1800 comprises the at least one intermediate node 1803 between the sending node 1801 and the receiving node 1802. The communications network 1800 may be a multi-hop deployment. In some embodiments, the communications network 1800 may be an Integrated Access and Backhaul (IAB) network.

The method may comprise one or more of the following actions. In some embodiments all the actions may be performed. In other embodiments, one or more actions may be performed. One or more embodiments may be combined, where applicable. All possible combinations are not described to simplify the description. Some actions may be performed in a different order than that shown in FIG. 19. In FIG. 19, actions which may be optional in some examples are depicted with dashed boxes. In some examples, Action 1901 may be performed. In other examples, any of Action 1902 and/or Action 1903 may be also performed.

Action 1901

During the course of communications in the communications network 1800, one or more packets may be transmitted from the sending node 1801 to the receiving node 1802. The first node 1811 may be one of: the sending node 1801, a node providing access to the communications network 1800 to one of the sending node 1801 and the receiving node 1802, a donor Control Unit (CU), a donor Distributed unit (DU) and the at least one intermediate node 1803 between the sending node 1801 and the receiving node 1802. The first node 1811 or the second node 1812 may therefore need to process the one or more packets and/or one or more messages to send them or forward them to or towards the receiving node 1802.

The one or more packets may be, for example, data packets. The one or more packets may be to be transmitted over a DRB. The one or more messages may comprise control information. The one or more messages may to be transmitted over an SRB. The one or more messages may be, for example, F1-AP messages. In particular examples, the first node 1811 may be a donor CU-CP, sending one or more messages, as F1-AP messages, to the second node 1812 as IAB node. It may be noted that the main difference between the F1-AP duplication and data packet duplication may be understood to be that instead of GTP, the SCTP may be used to perform the duplicate detection, as there may be no GTP employed for sending the F1-AP data.

Within this context, and in order to increase the reliability of the transmission of the one or more packets in the communications network 1800, embodiments herein may utilize GTP level duplication. That is, packet duplication and duplicate removal performed at the GTP level, as compared to PDCP level duplication that is currently available in 3GPP rel-15. GTP based duplication in embodiments herein may be performed: using multiple GTP tunnels, using a single GTP tunnel and/or it may be a duplication of F1-AP messages.

In order to enable GTP based duplication and/or to support GTP duplication, the first node 1811 may configure the second node 1812 to perform GTP based duplication. Additionally or alternatively, if for example, the first node 1811 may not have a capability to configure the second node 1812, but may still be able to transmit packets or messages to the second node 1812 which may be GTP duplicated, the first node 1811 may inform the second node 1812, when transmitting one or more packets and/or one or more messages to the second node 1812, that the one or more packets and/or one or more messages are duplicated, to ensure that the duplicates are sent over different paths in order to obtain the benefit of route diversity.

According to the foregoing, in this Action 1901, the first node 1811 may send an indication, e.g., a first indication, to the second node 1812 comprised in the communications network 1800. The second node 1812 may be any of, e.g., one or more next hop in the communications network 1800 towards the receiving node 1802. The first indication explicitly indicates whether or not at least one of: i) the one or more packets are, or are to be, duplicated over a GTP layer, e.g., one or more GTP tunnels between the first node 1811 and the one or more next hop; ii) duplication of the one or more packets over the GTP layer, e.g., the one or more GTP tunnels between the first node 1811 and the one or more next hop, is enabled, supported and/or active, iii) one or more messages are, or are to be, duplicated over a Stream Control Transmission Protocol (SCTP) layer between the first node 1811 and the one or more next hop, and iv) duplication of the one or more messages over the SCTP layer between the first node 1811 and the one or more next hop is enabled, supported and/or active.

The sending in this Action 1901 may be implemented, for example, via the first link 1841.

1) GTP Based Duplication Using Multiple GTP Tunnels

In one group of examples of embodiments herein, multiple GTP tunnels may be set up between the first node 1811, e.g., a donor CU-UP, and the second node 1812, e.g., the access IAB node.

As described earlier, in the Background section entitled "Packet duplication", there may already be a mechanism in rel-15 that may enable CA/DC based packet duplication in a CU-DU split case. In F1, there may already be a mechanism to specify more than one UL and DL TNL information for UE bearers, where the UL UP TNL Information to be Setup List IE may contain up to 2 TNL associations for each bearer. The IEs may also contain, among others: a) the Duplication Activation IE indicating the type of duplication, e.g., CA or DC, and whether the duplication is to be activated or not, as well as the initial state of CA based UL PDCP duplication; b) the DC Based Duplication Configured IE, which may indicate whether DC based PDCP duplication is configured or not; and c) DC Based Duplication Activation IE, which may indicate the initial state of DC based UL PDCP duplication.

A first difference in this case, as compared to rel-15 CA/DC duplication, may be understood to be that in the DL, although two tunnels may be setup, in examples of embodiments herein, the access IAB node may not have to send the data from both tunnels, corresponding to the same PDCP packet, to the wireless device 1830, as the aim of the duplication may be understood to be for some intermediate BH RLC channel(s), but not over the air interface between the wireless device 1830 and the access IAB node.

Accordingly, in some embodiments, wherein at least one of the sending node 1801 and the receiving node 1802 may be the wireless device 1830, the one or more GTP tunnels may exclude a link between the wireless device 1830 and a node providing access to the communications network 1800 to the wireless device 1830.

A second difference in this case, as compared to rel-15 CA/DC duplication, may be understood to be that in the UL, in DC and/or CA duplication in rel-15, in the UL, it is the UE that may duplicate the packets and forward them via the corresponding RLC channel, either on a different carrier for the case of CA, or a different cell group in the case of DC. In examples of embodiments herein, the duplication may be done instead at the GTP layer by the access IAB node, and one copy sent over each channel.

In some embodiments, the first indication may indicate one of: a) whether duplication based on GTP is configured or not, and b) an initial state of duplication based on GTP.

In some embodiments, the first indication may be sent in at least one of: a) a UE context setup request message for each bearer set up, and b) a UE context modification request message for an additional bearer set up.

In some embodiments wherein the first indication may be sent in at least one of: the UE context setup request message for each bearer set up, and the UE context modification request message for the additional bearer set up, the first indication may be one of: i) a GTP Based Duplication Configured Information Element (IE), and ii) a GTP Based Duplication Activation IE.

A similar approach to the rel-15 duplication may be used to specify whether the duplication is to be done at GTP level by introducing the GTP Based Duplication Configured and GTP Based Duplication Activation IEs, as shown below, in the UE CONTEXT SETUP REQUEST for each bearer being set up. The same may be done in the UE CONTEXT MODIFICATION REQUEST message for additional bearers being set up or the modification of existing bearers. An example implementation in the UE CONTEXT SETUP REQUEST F1AP message is shown below.

Example 1

9.2.2.1 Ue Context Setup Request

This message may be sent by the gNB-CU to request the setup of a UE context.

Direction: gNB-CU→gNB-DU.

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | O | | 9.3.1.5 | | YES | ignore |
| SpCell ID | M | | NR CGI 9.3.1.12 | Special Cell as defined in TS 38.321 [16]. For handover case, this IE shall be considered as target cell. | YES | reject |
| ServCellIndex | M | | INTEGER (0 . . . 31) | | YES | reject |
| SpCell UL Configured | O | | Cell UL Configured 9.3.1.33 | | YES | ignore |
| Candidate SpCell List | | 0 . . . 1 | | | YES | ignore |
| >Candidate SpCell Item IEs | | 1 . . . <maxnoof-Candidate-SpCells> | | | EACH | ignore |
| >>Candidate SpCell ID | M | | NR CGI 9.3.1.12 | Special Cell as defined in TS 38.321 [16] | — | |
| CU to DU RRC Information | M | | 9.3.1.25 | | YES | reject |
| DRX Cycle | O | | DRX Cycle 9.3.1.24 | | YES | ignore |
| Resource Coordination Transfer Container | O | | OCTET STRING | Includes the MeNB Resource Coordination Information IE as defined in subclause 9.2.116 of TS 36.423 [9]. | YES | ignore |

TABLE 1-continued

| IE/Group Name | Presence | Range | IE type and reference | Semantics description | Criticality | Assigned Criticality |
|---|---|---|---|---|---|---|
| SCell To Be Setup List | | 0 . . . 1 | | | YES | ignore |
| >SCell to Be Setup Item IEs | | 1 . . . <maxnoof-SCells> | | | EACH | ignore |
| >>SCell ID | M | | NR CGI 9.3.1.12 | SCell Identifier in gNB | — | |
| >>SCellIndex | M | | INTEGER (1 . . . 31) | | — | |
| >>SCell UL Configured | O | | Cell UL Configured 9.3.1.33 | | — | |
| >>servingCellMO | O | | INTEGER (1-64) | | YES | ignore |
| SRB to Be Setup List | | 0 . . . 1 | | | YES | reject |
| >SRB to Be Setup Item IEs | | 1 . . . <maxnoof-SRBs> | | | EACH | reject |
| >>SRB ID | M | | 9.3.1.7 | | — | |
| >> Duplication Indication | O | | ENUMERATED (true, . . . , false) | If included, it should be set to true. | YES | ignore |
| DRB to Be Setup List | | 0 . . . 1 | | | YES | reject |
| >DRB to Be Setup Item IEs | | 1 . . . <maxnoof-DRBs> | | | EACH | reject |
| >>DRB ID | M | | 9.3.1.8 | | — | |
| >>CHOICE QoS Information | M | | | | | |
| >>>E-UTRAN QoS | M | | 9.3.1.19 | Shall be used for EN-DC case to convey E-RAB Level QoS Parameters | — | |
| >>>DRB Information | | 1 | | Shall be used for NG-RAN cases | YES | ignore |
| >>>>DRB QoS | M | | 9.3.1.45 | | — | |
| >>>>S-NSSAI | M | | 9.3.1.38 | | — | |
| >>>>Notification Control | O | | 9.3.1.56 | | — | |
| >>>>Flows Mapped to DRB Item | | 1 . . . <maxnoof-QoSFlows> | | | — | |
| >>>>>QoS Flow Identifier | M | | 9.3.1.63 | | — | |
| >>>>>QoS Flow Level QoS Parameters | M | | 9.3.1.45 | | — | |
| >>>>>QoS Flow Mapping Indication | O | | 9.3.1.72 | | YES | ignore |
| >>UL UP TNL Information to be setup List | | 1 | | | — | |
| >>>UL UP TNL Information to Be Setup Item IEs | | 1 . . . <maxnoof-ULUPTNL Information> | | | — | |
| >>>>UL UPTNL Information | M | | UP Transport Layer Information 9.3.2.1 | gNB-CU endpoint of the F1 transport bearer. For delivery of UL PDUs. | — | |
| >>>>UL BH Information | O | | 9.3.1.y | | — | |
| >> RLC Mode | M | | 9.3.1.27 | | — | |
| >> UL | O | | UL | Information | — | |

TABLE 1-continued

| IE/Group Name | Presence | Range | IE type and reference | Semantics description | Criticality | Assigned Criticality |
|---|---|---|---|---|---|---|
| Configuration | | | Configuraiton 9.3.1.31 | about UL usage in gNB-DU. | | |
| >>Duplication Activation | O | | 9.3.1.36 | Information on the initial state of CA based UL PDCP duplication | — | |
| >> DC Based Duplication Configured | O | | ENUMERATED (true, . . . , false) | Indication on whether DC based PDCP duplication is configured or not. If included, it should be set to true. | YES | reject |
| >>DC Based Duplication Activation | O | | Duplication Activation 9.3.1.36 | Information on the initial state of DC basedUL PDCP duplication | YES | reject |
| >> GTP Based Duplication Configured | O | | ENUMERATED (true, . . . , false) | Indication on whether GTP based packet duplication is configured or not. If included, it should beset to true. | | |
| >>GTP Based Duplication Activation | O | | ENUMERATED (Active, Inactive, . . . ) | Information on the initial state of GTP based duplication. If the value is set to 'Active' the BAP Routing ID values in the UL BH Information IE pertaining to the two GTP-U tunnels of this DRB may be required to be different. This IE is present if the GTP Based Duplication Configured IE is present as well. | | |
| >>DL PDCP SN length | M | | ENUMERATED (12 bits, 18 bits, . . . ) | | YES | ignore |
| >>UL PDCP SN length | O | | ENUMERATED (12 bits, 18 bits, . . . ) | | YES | ignore |
| Inactivity Monitoring Request | O | | ENUMERATED (true, . . . ) | | YES | reject |
| RAT-Frequency Priority Information | O | | 9.3.1.34 | | YES | reject |
| RRC-Container | O | | 9.3.1.6 | Includes the DL-DCCH-Message IE as defined in subclause 6.2 of TS 38.331 [8], encapsulated in a PDCP PDU. | YES | ignore |

TABLE 1-continued

| IE/Group Name | Presence | Range | IE type and reference | Semantics description | Criticality | Assigned Criticality |
|---|---|---|---|---|---|---|
| Masked IMEISV | O | | 9.3.1.55 | | YES | ignore |
| Serving PLMN | O | | PLMN ID 9.3.1.14 | Indicates the PLMN serving the UE. | YES | ignore |
| gNB-DU UE Aggregate Maximum Bit Rate Uplink | C-ifDRBSetup | | Bit Rate 9.3.1.22 | The gNB-DU UE Aggregate Maximum Bit Rate Uplink is to be enforced by the gNB-DU. | YES | ignore |
| RRC Delivery Status Request | O | | ENUMERATED (true, . . . ) | Indicates whether RRC DELIVERY REPORT procedure is requested for the RRC message. | YES | ignore |
| Resource Coordination Transfer Information | O | | 9.3.1.73 | | YES | ignore |
| servingCellMO | O | | INTEGER (1 . . . 64) | | YES | ignore |

The existing IE that may be used for configuring the BAP routing ID, next-hop BH RLC CH ID and next-hop BAP address for UL traffic at access IAB node is shown below. The yellow text below shows an example realization where a condition may be added to ensure that the duplicates are sent over different UL paths.

9.3.1.y UL BH INFORMATION

This IE may include the UL BH information.

TABLE 2

| IE/Group Name | Presence | Range | IE type and reference | Semantics description |
|---|---|---|---|---|
| BAP Routing ID | M | | 9.3.1.u | If the value of GTP Based Duplication Activation IE for the DRB of this GTP-U tunnel is set to 'Active', the BAP Routing ID value in this IE may be required to be different from the corresponding value for the other GTP-U tunnel of this DRB. |
| Next-Hop BAP address | M | | 9.3.1.v | This IE identifies the next-hop node on the backhaul path towards IAB-donor-DU. |
| BH RLC CH ID | M | | 9.3.1.x | This IE identifies the BH RLC channel in the link between the gNB-DU and the node identified by the Next-Hop BAP Address. |

It may be noted that the above are just example realizations only. Several other alternatives may exist, for example:

According to a first alternative, the maxnoofULUPTNLInformation may be expanded to a higher value, in rel-15, it may be set to 2 for the case of CA/DC duplication, and an additional UL UP TNL Information to Be Setup Item IE, and IEs under it, may be added for each GTP tunnel to be duplicated. For example, if both GTP and CA and/or DC duplication is to be used for a given bearer, then four tunnels may be setup for that particular bearer.

According to a second alternative, some of the GTP duplication information may be communicated in a non-UE associated signalling, that is, a signalling applied to all UEs, e.g. GNB-CU configuration update. For example, the details of the duplication, such as channel IDs, routing IDs, etc, may be communicated in UE-associated signalling as above, but if duplication is bearer agnostic, that is, applicable to all bearers terminated at that IAB node, a simple flag may be used in the non-UE associated message to enable and/or disable the duplication for all bearers. If duplication is bearer specific, the list of affected bearers and whether duplication may be enabled and/or disabled may be included in the non-UE associated signalling.

E1AP Aspects:

In the case of CU-CP split architecture, it may be necessary for the donor CU-CP to configure the CU-UP with DL GTP-based duplication. The configuration may be carried in the E1AP messages, where two non-limiting examples are BEARER CONTEXT SETUP REQUEST and BEARER CONTEXT MODIFICATION REQUEST messages. That is, in some particular embodiments, the first indication may be an E1AP message indicating a configuration from the first node 1811 as CU-CP and the second node 1812 as CU-UP.

In some embodiments, the first indication may be sent in at least one of: c) a Bearer context setup request message for each bearer set up, and d) a Bearer context modification request message for an additional bearer set up.

In particular, some of the following E1AP (TS 38.463) IEs carried in the above two messages may need to be modified to include the GTP-based duplication configuration: i) DRB To Setup List E-UTRAN, ii) PDU Session Resource To Setup List, iii) DRB To Setup Modification List E-UTRAN, iv) DRB To Modify List E-UTRAN, v) PDU Session Resource To Setup Modification List, and vi) PDU Session Resource To Modify List. According to the foregoing, in some embodiments wherein the first indication may be sent in at least one of: the Bearer context setup request message for each bearer set up, and the Bearer context modification request message for the additional bearer set up, the first indication may be an IE of: a DRB To Setup List E-UTRAN, a PDU Session Resource To Setup List, a DRB To Setup Modification List E-UTRAN, a DRB To Modify List E-UTRAN PDU Session Resource To Setup Modification List, and a PDU Session Resource To Modify List.

Example 2

A non-limiting example of implementation into the existing PDU Session Resource To Setup List IE is shown below in yellow text:

9.3.3.2 PDU Session Resource To Setup List

This IE may contain PDU session resource related information used at Bearer Context Setup Request.

TABLE 3

| IE/Group Name | Presence | Range | IE type and reference | Semantics description | Criticality | Assigned Criticality |
|---|---|---|---|---|---|---|
| PDU Session Resource To Setup Item | | 1 ... <maxno-ofPDUSession-Resource> | | | — | — |
| >PDU Session ID | M | | 9.3.1.21 | | — | — |
| >PDU Session Type | M | | 9.3.1.22 | | — | — |
| >S-NSSAI | M | | 9.3.1.9 | | — | — |
| > Security Indication | M | | 9.3.1.23 | | — | — |
| >PDU Session Resource DL Aggregate Maximum Bit Rate | O | | Bit Rate 9.3.1.20 | This IE shall be present when at least one Non-GBR QoS Flows is being setup. | — | — |
| >NG UL UP Transport Layer Information | M | | UP Transport Layer Information 9.3.2.1 | | — | — |
| >PDU Session Data Forwarding Information Request | O | | Data Forwarding Information Request 9.3.2.5 | | — | — |
| >PDU Session Inactivity Timer | O | | Inactivity Timer 9.3.1.54 | Included if the Activity Notification Level is set to PDU Session. | — | — |
| >Existing Allocated NG DL UP Transport Layer Information | O | | UP Transport Layer Information 9.3.2.1 | | — | — |
| > Network Instance | O | | 9.3.1.62 | This IE is ignored if the Common Network Instance IE is included. | YES | ignore |
| >Common Network Instance | O | | 9.3.1.66 | | YES | ignore |
| >DRB To Setup List | | 1 | | | — | — |
| >>DRB To Setup Item | | 1 ... <maxno-ofDRBs> | | | | |

TABLE 3-continued

| IE/Group Name | Presence | Range | IE type and reference | Semantics description | Criticality | Assigned Criticality |
|---|---|---|---|---|---|---|
| >>>DRB ID | M | | 9.3.1.16 | | — | — |
| >>>SDAP Configuration | M | | 9.3.1.39 | | — | — |
| >>>PDCP Configuration | M | | 9.3.1.38 | | — | — |
| >> GTP Based Duplication Configured | O | | ENUMERATED (true, . . . , false) | Indication on whether GTP based packet duplication is configured or not If included, it should be set to true. | | |
| >>GTP Based Duplication Activation | O | | ENUMERATED (Active, Inactive, . . . ) | Information on the initial state of GTP. based duplication. If the value is set to 'Active', the BAP Routing ID values in the UL BH Information IE pertaining to the two GTP-U tunnels of this DRB may be required to be different. This IE is present if the GTP Based Duplication Configured IE is present as well. | | |
| >>>Cell Group Information | M | | 9.3.1.11 | | — | — |
| >>>QoS Flows Information To Be Setup | M | | QoS Flow QoS Parameters List 9.3.1.25 | | — | — |
| >>>DRB Data forwarding information Request | O | | Data Forwarding Information Request 9.3.2.5 | Requesting forwarding info from the target gNB-CU-UP. | — | — |
| >>>DRB Inactivity Timer | O | | Inactivity Timer 9.3.1.54 | Included if the Activity Notification Level is set to DRB. | — | — |
| >>>PDCP SN Status Information | O | | 9.3.1.58 | Contains the PDCP SN Status at setup after Resume. | — | — |
| >>>DRB QoS | O | | 9.3.1.26 | Indicates the DRB QoS when more than one QoS Flow is mapped to the DRB. | YES | ignore |

TABLE 4

| Range bound | Explanation |
| --- | --- |
| maxnoofDRBs | Maximum no. of DRBs for a UE. Value is 32. |
| maxnoofPDUSessionResource | Maximum no. of PDU Sessions for a UE. Value is 256. |

According to the foregoing, the first indication may be sent in at least one of: a) a UE context setup request message for each bearer set up, b) a UE context modification request message for an additional bearer set up, c) a Bearer context setup request message for each bearer set up, and d) a Bearer context modification request message for an additional bearer setup.

In some embodiments, the sending in this Action 1901 may further comprise sending a second indication. The second indication may indicate at least one of: i) whether duplication based on GTP is configured or not, and ii) the initial state of duplication based on GTP. For example, in Action 1901 the first node 1811 may send, to the second node 1812, the first indication indicating whether duplication based on GTP is configured or not, e.g., in a UE context setup request message for each bearer set up as a GTP Based Duplication Configured IE, and the second indication indicating the initial state of duplication based on GTP, in e.g., the UE context modification request message for the additional bearer set up in a GTP Based Duplication Activation IE.

In some embodiments, the sending in this Action 1901 may further comprise sending a third indication. The third indication may indicate that each of one or more duplicates of the one or more packets is to be sent over at least one of: a) different channels over the one or more GTP tunnels, and b) different GTP tunnels, wherein more than one GTP tunnel is set up.

In some embodiments, the third indication may indicate at least one of: a routing identifier, e.g., a Backhaul Adaptation Protocol routing identifier, a flow identifier and a Differentiated Services Code Point, DSCP.

If GTP based duplication is configured and activated, the first node 1811, e.g., an IAB node, may duplicate and send, as will be described in Action 1903, the original packet over one path and the copy via the other path. The second node 1812, e.g., an access IAB node, may, e.g., via the third indication, be configured to apply different destination BAP routing address for the duplicate as compared to the original, so that the duplicate and the original may not end up traversing the same path all the way to the donor DU to ensure the benefit of route diversity. For the DL, the CU-UP may be the one that may be sending the duplicates, so it may be in a sense similar to the case of CA level duplication. It may be noted that embodiments herein may be understood to apply for access IAB nodes connected to the donor CU via the same donor DU or two different donor DUs.

In preparation for the GTP duplication, the first node 1811, e.g., a Donor-CU that may have an associated F1 connection gNB-DU UE F1AP ID, may set up two GTP-U tunnels with a Tunnel Endpoint Identifier (TEID)=X1 and TEID=X2, where both GTP-U tunnels may have the same GTP-U endpoint IP address. To achieve the intended benefits of duplication, that is, high reliability, low latency, etc . . . , it may be understood to be important to ensure the packets of these two GTP-tunnels are routed through different paths and/or route in an IAB network. For this, the first node 1811, e.g., the Donor-CU may, by sending the third indication, configure the BAP of the second node 1812, e.g., a Donor-DU, in such a way that when the second node 1812, e.g., the Donor-DU, receives a packet with TEID=X1, or FlowLabel=FL1 or Differentiated Services Code Point (DSCP)=DS1 for the case where GTP-U TEID cannot be accessed and instead an IP Flow label or DS field is used for indicating the GTP-U TEID values, it may assign and/or add a BAP Routing ID=R1 in the BAP header that may be added to the received packet. While for packet with a TEl or FlowLabel=FL2 or DSCP=DS2, the second node 1812, e.g., the Donor-DU may assign and/or add BAP Routing ID=R2 in the BAP header of the packet. Both BAP Routing IDs, that is, R1 and R2, may belong to the same receiving node 1802, e.g., the endpoint IAB-node, for the GTP-U tunnels and may be assigned by the first node 1811, e.g., the Donor-CU, to enable routing packets through different paths to IAB nodes. Thus, the packets carrying BAP Routing ID=R1 in their BAP header may be routed on path A, while packets with BAP Routing ID=R2 in their BAP header may be routed on path B toward the receiving node 1802, e.g., the destination IAB-node. Similarly, for the upstream case, the first node 1811, e.g., the Donor-CU, may, by sending the third indication, configure the second node 1812, e.g., the access IAB-node, to assign and/or use different BAP Routing IDs in the BAP header for packets of the two GTP-U tunnels, to ensure that they are not routed via the same path all the way to the receiving node 1802, e.g., the donor DU.

2) GTP Based Duplication Using a Single GTP Tunnel

Instead of using multiple GTP tunnels as in the case of CA duplication, another approach may be to use a single GTP tunnel.

3) Duplication of F1-AP Messages

For the duplication of F1-AP messages in the DL, the first node 1811, e.g., as CU-CP, may, in order to perform the duplication, for example, associate the original and copy with different packet third indications, e.g., IP flow labels or DSCP markings, and also configure, in this Action 1901, the second node 1812 as donor DU, to map the different marked packets to the different paths towards the receiving node 1802, e.g., the destination IAB node, similar to what was discussed for the data packets above. Alternatively, the second node 1812 as donor-DU may do the duplication, similar to the case for data packet duplication discussed above, where the first node 1811, e.g., as CU-CP, may configure, in this Action 1901, the second node 1812 as donor DU, that it may need to duplicate the packet and send it via the other path towards the receiving node 1802, e.g., the destination IAB node. It may be noted that the main difference between the F1-AP duplication and data packet duplication may be understood to be that instead of GTP, the SCTP may be used to perform the duplicate detection, as there may be understood to be no GTP employed for sending the F1-AP data.

The first node 1811 may, as first indication, use some field in the SCTP header in the F1AP/SCTP/IP packet to communicate that a F1AP packet may need to be copied. The BAP may need to look into the SCTP header and if the copy flag is set, it may need to copy the F1AP packet and give the packets two different BAP routing IDs which may have been preconfigured by the donor CU as third indication in Action 1901, to be used in the event of the need to duplicate control messages. If the F1AP is encrypted with IPsec, the SCTP header may need to be copied to the IP-flow label. At the IAB node where the F1AP may be terminated the latest arrived F1AP packet with the same Transmission Sequence Number (TSN) may be discarded. One advantage of this mechanism may be understood to be that the first node 1811, e.g., as CU, may mark specific F1AP messages to be duplicated. One advantage of duplicating F1AP over a redundant path may be understood to be that for some scenarios when there may be a RLF on one of the paths, the other path may still have a connection for the control channel which may be used to make a topology adaptation to go smoother.

In some embodiments, wherein at least one of the sending node 1801 and the receiving node 1802 may be the wireless device 1830, duplication of the one or more messages over the SCTP layer may exclude a link between the wireless device 1830 and a node providing access to the communications network 1800 to the wireless device 1830.

By sending the first indication in this Action 1901, the first node 1811 may enable to increase the reliability of delivery of the one or more packets and/or the one or more messages in the communications network 1800. This is because if one of the GTP links experiences a link problem or congestion and/or delays, the one or more packets and/or the one or more messages may be transported over the other GTP link. This may be understood to also decrease the latency. Since the GTP layer may be present at the CU and at the access node, as another advantage, the first node 1811 may enable that the duplication be performed anywhere along the connection, preferably at the point where a path may split, which may be understood to avoid unnecessary duplication, e.g., along the same path.

As a further advantage, by enabling duplication at the intermediate nodes or at the access IAB node, embodiments herein may be understood to also enable that UEs that may not be capable of packet duplication, in the UL or/and DL, may still benefit from it.

Action 1902

In this Action 1902, the first node 1811 may determine whether or not to remove one or more duplicates of the one or more packets and/or the one or more messages prior to transmitting the one or more packets over the GTP layer, e.g., over the one or more GTP tunnels, and/or the one or more messages over the SCTP layer.

Determining may be understood as calculating, or deriving.

Since the F1-U may include the PDCP sequence number on the GTP header, in the case of GTP-based duplication with multiple GTP tunnels, the first node 1811, e.g., the DU of the access IAB node, may do duplicate detection, that is, check if a DL packet with the same PDCP SN has not already been sent successfully to the wireless device 1830, and drop duplicate packets, thereby saving precious air interface resources towards the wireless device 1830. If duplicate detection at GTP level is not employed, the PDCP of the wireless device 1830 may perform that, but at the cost of wasting air interface resources.

By determining whether or not to remove one or more duplicates of the one or more packets and/or the one or more messages prior to transmitting them in this Action 1902, the first node 1811 may enable to avoid unnecessary duplication anywhere along the connection. The unnecessary duplication may be, for instance, once the paths have merged and there may be no benefit in sending duplicated packets. Therefore, it may be advantageous to remove the duplicates at the merger. Hence, resources in the communications network 1800 may be saved, and the latency may be reduced.

Action 1903

In this Action 1903, the first node 1811 may transmit, according to the first indication, and over the GTP layer, the one or more GTP tunnels, or the SCTP layer, e.g., between the first node 1811 and the one or more next hop, at least one of the one or more packets, the one or more messages and the one or more duplicates.

The transmitting in this Action 1903 may be implemented, for example, via the first link 1841.

The first node 1811 may transmit at least one of the one or more packets, the one or more messages and the one or more duplicates in accordance with the different types of GTP based duplication described in Action 1901. Some aspects of these types are discussed next.

1) GTP Based Duplication Using Multiple GTP Tunnels

If GTP based duplication is configured and activated, the first node 1811, e.g., an IAB node, may duplicate and send the original packet over one path and the copy via the other path.

2) GTP Based Duplication Using a Single GTP Tunnel

As mentioned earlier, instead of using multiple GTP tunnels as in the case of CA duplication, another approach may be to use a single GTP tunnel. For the DL, the first node 1811, e.g., the CU-UP, may send the same packet twice over the same GTP tunnel, but may associate one of the packets with different flow label address or DSCP, so that they may not be routed via the same path all the way to the access IAB node. During reception at the access IAB node, the access IAB node may perform duplicate detection as in the case of the multiple GTP case, but it may be simpler to perform the duplicate detection here as the address space, e.g., PDCP SN, to be checked may be understood to be within one GTP tunnel.

For the UL, the first node 1811, e.g., as access IAB node, may perform the duplication as similar to the case of multiple GTP tunnels. However, instead of transporting the two packets via different tunnels, the packets may be injected within the same tunnel. As in the case of the multiple GTP case, the first node 1811, e.g., as access IAB node may put different BAP routing IDs to the two packets, ensuring route diversity.

3) Duplication of F1-AP Messages

For the duplication of F1-AP messages in the DL, the first node 1811, e.g., as CU-CP, may, in this Action 1903, do the duplication, and for example, associate the original and copy with different packet third indications, e.g., IP flow labels or DSCP markings, and also configure, in Action 1901, the second node 1812 as donor DU, to map the different marked packets to the different paths towards the receiving node 1802, e.g., the destination IAB node, similar to what was discussed for the data packets above. Alternatively, the second node 1812 as donor-DU may do the duplication, similar to the case for data packet duplication discussed above, where the first node 1811, e.g., as CU-CP, may have configured, in Action 1901, the second node 1812 as donor DU that it may need to duplicate the packet and send it via the other path towards the receiving node 1802, e.g., the destination IAB node.

In particular examples, the first node 1811 may be a Central Unit (CU). In general, GTP-based duplication may be executed at the end nodes, e.g., a Donor-CU or an access IAB node.

By transmitting at least one of the one or more packets, the one or more messages and the one or more duplicates over the GTP layer, the one or more GTP tunnels, or the SCTP layer, according to the first indication, in this Action 1903, the first node 1811 may enable to increase the reliability of delivery of the one or more packets and/or the one or more messages in the communications network 1800. This is because if one of the GTP links experiences a link problem or congestion and/or delays, the one or more packets and/or the one or more messages may be transported over the other GTP link. This may be understood to also decrease the latency. Since the GTP layer may be present at the CU and at the access node, as another advantage, the first node 1811 may enable that the duplication be performed anywhere along the connection, preferably at the point where a path may split, which may be understood to avoid unnecessary duplication, e.g., along the same path.

As a further advantage, by enabling duplication at the intermediate nodes or at the access IAB node, embodiments herein may be understood to also enable that UEs that may not be capable of packet duplication, in the UL or/and DL, may still benefit from it.

Embodiments of a method, performed by the second node 1812, will now be described with reference to the flowchart depicted in FIG. 20. The method may be understood to be for handling the transmission of the one or more packets and/or the one or more messages from the sending node 1801 to the receiving node 1802. The second node 1812 operates in the communications network 1800. The communications network 1800 comprises at least one intermediate node 1803 between the sending node 1801 and the receiving node 1802.

The communications network 1800 may be a multi-hop deployment. In some embodiments, the communications network 1800 may be an IAB network.

The method may comprise one or more of the following actions.

In some embodiments all the actions may be performed. In other embodiments, one or more actions may be performed. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 20. In FIG. 20, actions which may be optional in some examples are depicted with dashed boxes. In some examples, Action 2001 may be performed. In other examples, any of Action 2002, Action 2003 and/or Action 2004 may be also performed.

The detailed description of some of the following corresponds to the same references provided above, in relation to the actions described for the first node 1811 and will thus not be repeated here to simplify the description, however, it applies equally. For example, in some embodiments, the first node 1811 may be one of: the sending node 1801, the node providing access to the communications network 1800 to one of the sending node 1801 and the receiving node 1802, the donor distributed unit DU, the donor CU, and the at least one intermediate node 1803 between the sending node 1801 and the receiving node 1802.

Action 2001

In this Action 2001, the second node 1812 receives the first indication from the first node 1811 comprised in the communications network 1800, e.g., a next hop node in the communications network 1800, e.g., towards the sending node 1801. The first indication explicitly indicates whether or not at least one of: i) the one or more packets are, or are to be, duplicated over the GTP layer, e.g., one or more GTP tunnels between the first node 1811 and the second node 1812, e.g., one or more next hop nodes 1804, 1805 towards the receiving node 1802; ii) duplication of the one or more packets over the GTP layer, e.g., the one or more GTP tunnels between the first node 1811 and the second node 1812, e.g., the one or more next hop nodes 1804, 1805 towards the receiving node 1802, is enabled, supported and/or active, iii) one or more messages are, or are to be, duplicated over the SCTP layer between the first node 1811 and the second node 1812, e.g., the one or more next hop nodes 1804, 1805, and iv) duplication of the one or more messages over the SCTP layer between the first node 1811 and the second node 1812, e.g., the one or more next hop nodes 1804, 1805 is enabled, supported and/or active.

The receiving in this Action 2001 may be implemented, for example, via the first link 1841.

In some embodiments, at least one of the sending node 1801 and the receiving node 1802 may be the wireless device 1830. In some embodiments, the one or more GTP tunnels may exclude the link between the wireless device 1830 and the node providing access to the communications network 1800 to the wireless device 1830.

In some embodiments, the first indication may indicate one of: a) whether duplication based on GTP is configured or not, and b) the initial state of duplication based on GTP.

The first indication may be received in at least one of: a) the UE context setup request message for each bearer set up, b) the UE context modification request message for the additional bearer set up, c) the Bearer context setup request message for each bearer set up, and d) the Bearer context modification request message for the additional bearer set up.

In some embodiments, wherein the first indication may be received in at least one of: the UE context setup request message for each bearer set up, and the UE context modification request message for the additional bearer set up, the first indication may be one of: a) the GTP Based Duplication Configured IE and b) the GTP Based Duplication Activation IE.

In some embodiments wherein the first indication may be received in at least one of: the Bearer context setup request message for each bearer set up, and the Bearer context modification request message for the additional bearer set up, the first indication may be an IE of: the DRB To Setup List E-UTRAN, the PDU Session Resource To Setup List, the DRB To Setup Modification List E-UTRAN, the DRB To Modify List E-UTRAN PDU Session Resource To Setup Modification List, and the PDU Session Resource To Modify List.

In some embodiments, the receiving in this Action 2001 may further comprise receiving the second indication. The second indication may indicate at least one of: i) whether duplication based on GTP is configured or not, and ii) the initial state of duplication based on GTP.

In some embodiments, the receiving in this Action 2001 may further comprise receiving the third indication. The third indication may indicate that each of one or more duplicates of the one or more packets is to be sent over at least one of: a) different channels over the one or more GTP tunnels, and b) different GTP tunnels, wherein more than one GTP tunnel is set up.

In some embodiments, the third indication may indicate at least one of: the routing identifier, e.g., the Backhaul Adaptation Protocol routing identifier, the flow identifier and the DSCP.

Action 2002

In this Action 2002, the second node 1812 may receive, according to the received first indication, and over the GTP layer, the one or more GTP tunnels or the SCTP layer between the first node 1811 and the second node 1812, e.g., the one or more next hop nodes 1804, 1805, at least one of the one or more packets, the one or more messages and the one or more duplicates.

The receiving in this Action 2002 may be implemented, for example, via the first link 1841.

Action 2003

In this Action 2003, the second node 1812 may determine whether or not to remove one or more duplicates of the one or more packets and/or the one or more messages prior to transmitting, in the next Action 2004, at least one of the one or more packets, the one or more messages, and the one or more duplicates over the one or more GTP tunnels between the second node 1812 and the third node 1813, e.g., the one or more next hop nodes 1804, 1805.

Determining may be understood as calculating, or deriving.

Action 2004

In this Action 2004, the second node 1812 transmits, according to the received first indication, over the GTP layer, over the one or more GTP tunnels, and/or over the SCTP layer between the second node 1812 and the third node 1813, e.g., the one or more next hop nodes 1804, 1805, at least one of the one or more packets, the one or more messages, and the one or more duplicates.

The transmitting in this Action 1903 may be implemented, for example, via the first link 1841.

As a non-limiting example, the second node 1812 may be a donor DU, which may have received a configuration from the donor CU for duplication of F1-AP messages via the first indication. The donor DU may then, according to the received configuration transmit in this Action 2004, in the UL, one or more duplicates of F1-AP messages back to the donor CU.

The transmitting, e.g., forwarding, in this Action 2004 may be performed, for example, via the second link 1842.

The proposed mechanisms in embodiments herein may be implemented in the cloud environment.

Certain embodiments disclosed herein may provide one or more of the following technical advantage(s), which may be summarized as follows.

As a first advantage, by supporting duplication over BH RLC channels embodiments herein may be understood to enable to increase the reliability of the packet delivery, since if one of the BH links experiences a link problem or congestion/delays, the packet may be transported over the other BH link. This may be understood to also decrease the latency.

As another advantage, embodiments herein may be understood to enable that the duplication be performed anywhere along the connection, preferably at the point where a path may split, which may be understood to avoid unnecessary duplication, e.g., along the same path.

As a further advantage, by enabling to duplication at the intermediate nodes or at the access IAB node, embodiments herein may be understood to also enable that UEs that may not be capable of packet duplication, in the UL or/and DL, to benefit from it.

Figure 21:
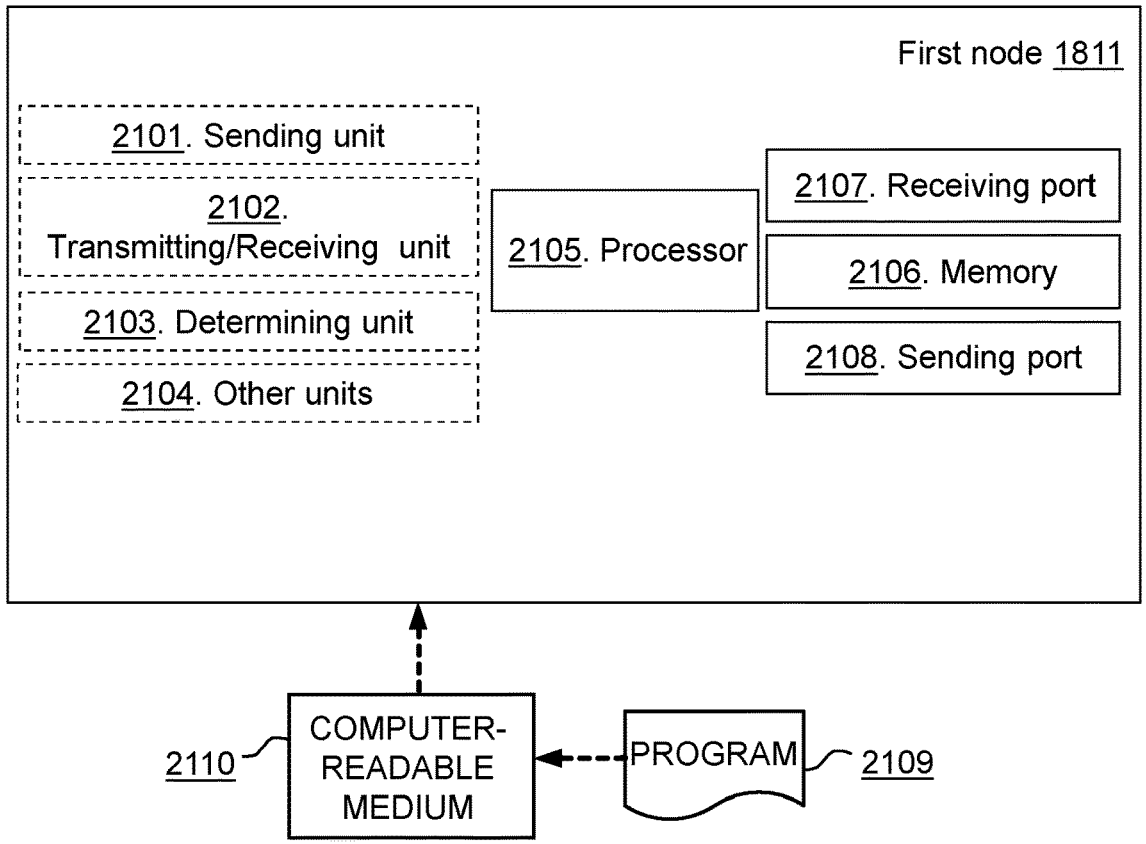
FIG. 21 is a schematic block diagram illustrating two non-limiting examples, a) and b), of a first node, according to embodiments herein.
Figure 21:
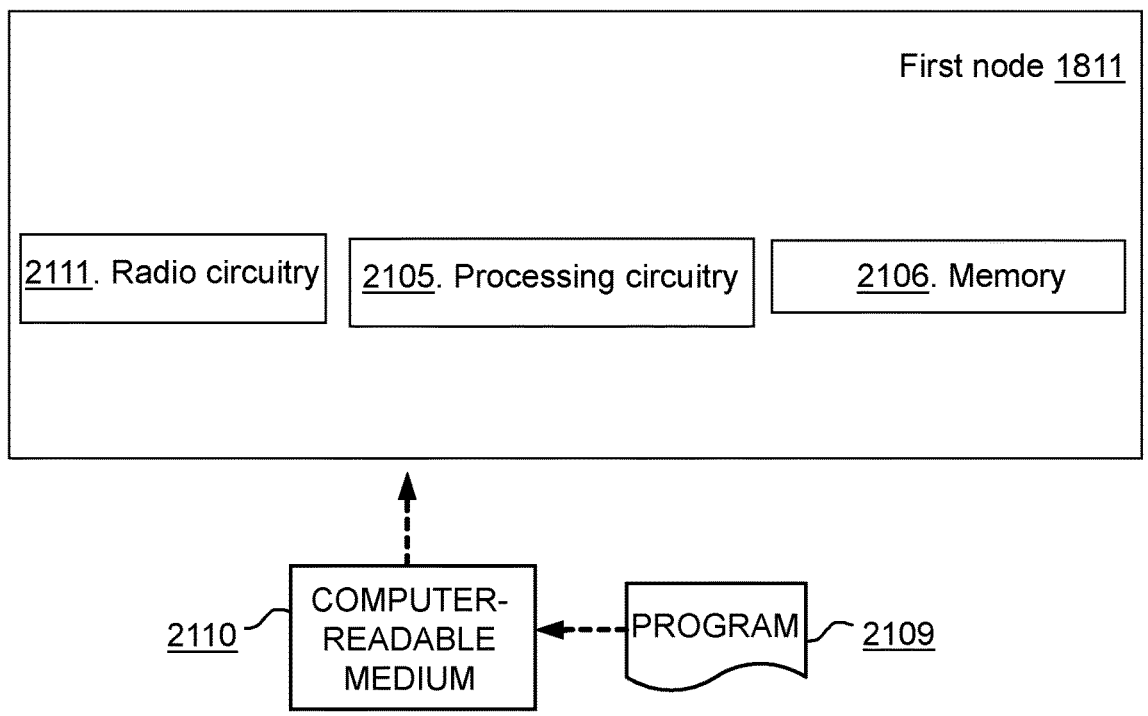

FIG. 21 depicts two different examples in panels a) and b), respectively, of the arrangement that the first node 1811 may comprise. In some embodiments, the first node 1811 may comprise the following arrangement depicted in FIG. 21a. The first node 1811 may be understood to be for handling transmission of one or more packets and/or one or more messages from the sending node 1801 to the receiving node 1802. The first node 1811 may be configured to operate in the communications network 1800. The communications network 1800 may be configured to comprise at least one intermediate node 1803 between the sending node 1801 and the receiving node 1802.

In some embodiments, the communications network 1800 may be configured to be an IAB network.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 1811 and will thus not be repeated here. For example, the first node 1811 may be configured to be one of: the sending node 1801, the node configured to be providing access to the communications network 1800 to one of the sending node 1801 and the receiving node 1802, the donor DU, and the at least one intermediate node 1803 between the sending node 1801 and the receiving node 1802.

In FIG. 21, optional units are indicated with dashed boxes.

The first node 1811 is configured to perform the sending of Action 1901, e.g. by means of a sending unit 2101 within the first node 1811, configured to send the first indication to the second node 1812 configured to be comprised in the communications network 1800. The first indication is configured to explicitly indicate whether or not at least one of: i) the one or more packets are, or are to be, duplicated over the GTP layer, ii) duplication of the one or more packets over the GTP layer, is enabled, supported and/or active, iii) the one or more messages are, or are to be, duplicated over the SCTP layer configured to be between the first node 1811 and one or more next hop nodes 1804, 1805, and iv) duplication of the one or more messages over the SCTP layer between the first node 1811 and the one or more next hop nodes 1804, 1805 is enabled, supported and/or active.

In some embodiments, wherein at least one of the sending node 1801 and the receiving node 1802 may be configured to be the wireless device 1830, the one or more GTP tunnels may be configured to exclude the link between the wireless device 1830 and the node configured to be providing access to the communications network 1800 to the wireless device 1830.

The first node 1811 may be configured to perform the transmitting of Action 1903, e.g. by means of a transmitting/receiving unit 2102 within the first node 1811, configured to transmit, according to the first indication, and over the GTP layer, the one or more GTP tunnels, or the SCTP layer, at least one of the one or more packets, the one or more messages and the one or more duplicates. The transmitting/receiving unit 2102 may be a processor 2105 of the first node 1811, or an application running on such processor.

In some embodiments, the first indication may be configured to indicate one of: a) whether duplication based on GTP is configured or not, and b) the initial state of duplication based on GTP.

In some embodiments, the sending of the first indication may be further configured to comprise sending the second indication. The second indication may be configured to indicate at least one of: i) whether duplication based on GTP is configured or not, and ii) the initial state of duplication based on GTP.

The first indication may be configured to be sent in at least one of: a) the UE context setup request message for each bearer set up, b) the UE context modification request message for the additional bearer set up, c) the Bearer context setup request message for each bearer set up, and d) the Bearer context modification request message for the additional bearer set up.

In some embodiments wherein the first indication may be configured to be sent in at least one of: the UE context setup request message for each bearer set up, and the UE context modification request message for the additional bearer set up, the first indication may be configured to be one of: i) the GTP Based Duplication Configured IE, and ii) the GTP Based Duplication Activation IE.

In some embodiments wherein the first indication may be configured to be sent in at least one of: the Bearer context setup request message for each bearer set up, and the Bearer context modification request message for the additional bearer set up, the first indication may be configured to be an IE of: a) the DRB To Setup List E-UTRAN, b) the PDU Session Resource To Setup List, c) the DRB To Setup Modification List E-UTRAN, d) the DRB To Modify List E-UTRAN PDU Session Resource To Setup Modification List, and e) the PDU Session Resource To Modify List.

In some embodiments wherein the sending of the first indication may be further configured to comprise sending the third indication, the third indication may be configured to indicate that each of one or more duplicates of the one or more packets is to be sent over at least one of: i) different channels over the one or more GTP tunnels, and ii) different GTP tunnels, wherein more than one GTP tunnel is set up.

In some embodiments, the third indication may be configured to indicate at least one of: the routing identifier, the flow identifier, and the DSCP.

The first node 1811 may be configured to perform the determining of Action 1902, e.g. by means of a determining unit 2103 within the first node 1811, configured to determine whether or not to remove one or more duplicates of the one or more packets and/or the one or more messages prior to transmitting the one or more packets over the GTP layer, and/or the one or more messages over the SCTP layer.

Other units 2104 may be comprised in the first node 1811.

The embodiments herein in the first node 1811 may be implemented through one or more processors, such as a processor 2105 in the first node 1811 depicted in FIG. 21a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 1811. One such carrier may be in the form of a CD ROM disc. It is however feasible with other data carriers such as a memory stick. The computer program code may furthermore be provided as pure program code on a server and downloaded to the first node 1811.

The first node 1811 may further comprise a memory 2106 comprising one or more memory units. The memory 2106 is arranged to be used to store obtained information, store data, configurations, schedulings, and applications etc. to perform the methods herein when being executed in the first node 1811.

In some embodiments, the first node 1811 may receive information from, e.g., any of the second node 1812, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, and/or the wireless device 1830, the host computer 2410, or any of the other nodes, through a receiving port 2107. In some embodiments, the receiving port 2107 may be, for example, connected to one or more antennas in first node 1811. In other embodiments, the first node 1811 may receive information from another structure in the communications network 1800 through the receiving port 2107. Since the receiving port 2107 may be in communication with the processor 2105, the receiving port 2107 may then send the received information to the processor 2105. The receiving port 2107 may also be configured to receive other information.

The processor 2105 in the first node 1811 may be further configured to transmit or send information to e.g., any of the second node 1812, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, and/or the wireless device 1830, the host computer 2410, or any of the other nodes, or another structure in the communications network 1800, through a sending port 2108, which may be in communication with the processor 2105, and the memory 2106.

Those skilled in the art will also appreciate that the units 2101-2104 described above may refer to a combination of analog and digital circuits, and/or one or more processors configured with software and/or firmware, e.g., stored in memory, that, when executed by the one or more processors such as the processor 2105, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 2101-2104 described above may be a processor 2105 of the first node 1811, or may be implemented as one or more applications running on one or more processors such as the processor 2105.

Thus, the methods according to the embodiments described herein for the first node 1811 may be respectively implemented by means of a computer program 2109 product, comprising instructions, i.e., software code portions, which, when executed on at least one processor 2105, cause the at least one processor 2105 to carry out the actions described herein, as performed by the first node 1811. The computer program 2109 product may be stored on a computer-readable storage medium 2110. The computer-readable storage medium 2110, having stored thereon the computer program 2109, may comprise instructions which, when executed on at least one processor 2105, cause the at least one processor 2105 to carry out the actions described herein, as performed by the first node 1811. In some embodiments, the computer-readable storage medium 2110 may be a non-transitory computer-readable storage medium, such as a CD ROM disc, or a memory stick. In other embodiments, the computer program 2109 product may be stored on a carrier containing the computer program 2109 just described, wherein the carrier is one of an electronic signal, optical signal, radio signal, or the computer-readable storage medium 2110, as described above.

The first node 1811 may comprise a communication interface configured to facilitate communications between the first node 1811 and other nodes or devices, e.g., any of the second node 1812, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, and/or the wireless device 1830, the host computer 2410, or any of the other nodes. The interface may, for example, include a transceiver configured to transmit and receive radio signals over an air interface in accordance with a suitable standard.

In other embodiments, the first node 1811 may comprise the following arrangement depicted in FIG. 21b. The first node 1811 may comprise a processing circuitry 2105, e.g., one or more processors such as the processor 2105, in the first node 1811 and the memory 2106. The first node 1811 may also comprise a radio circuitry 2111, which may comprise e.g., the receiving port 2107 and the sending port 2108. The processing circuitry 2105 may be configured to, or operable to, perform the method actions according to FIG. 19 and/or FIGS. 24-28, in a similar manner as that described in relation to FIG. 21a. The radio circuitry 2111 may be configured to set up and maintain at least a wireless connection with any of the second node 1812, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, and/or the wireless device 1830, the host computer 2410, or any of the other nodes. Circuitry may be understood herein as a hardware component.

Hence, embodiments herein also relate to the first node 1811 operative to operate in the communications network 1800. The first node 1811 may comprise the processing circuitry 2105 and the memory 2106, said memory 2106 containing instructions executable by said processing circuitry 2105, whereby the first node 1811 is further operative to perform the actions described herein in relation to the first node 1811, e.g., in FIG. 19 and/or FIGS. 24-28.

Figure 22:
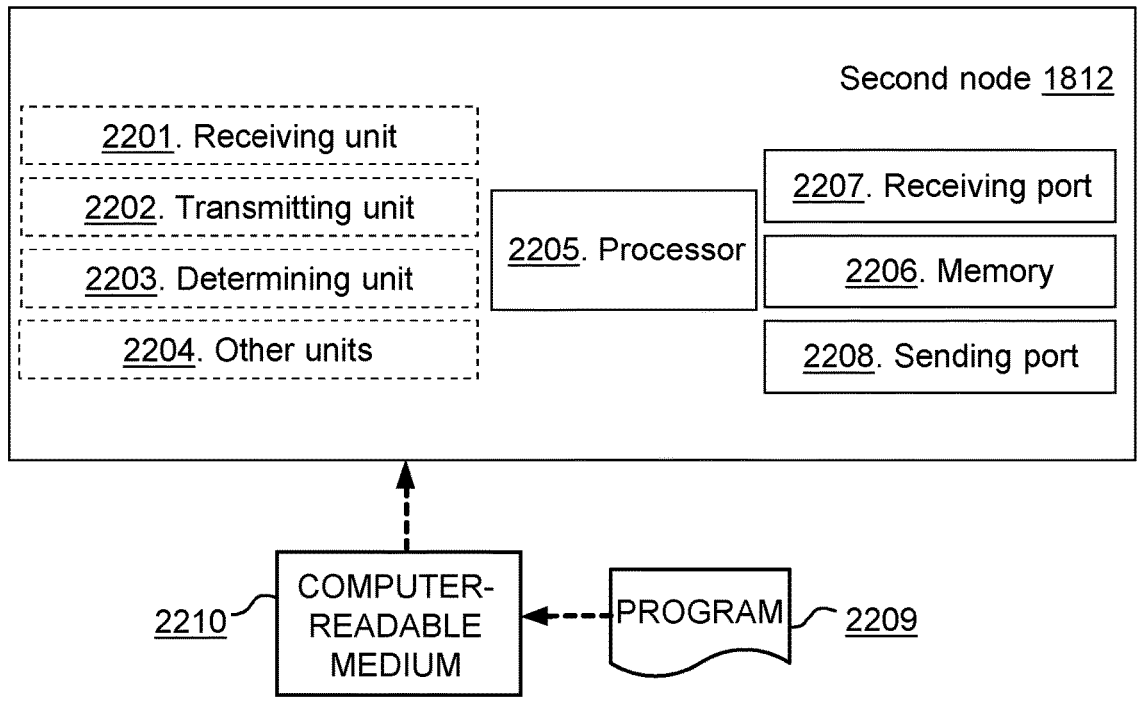
FIG. 22 is a schematic block diagram illustrating two non-limiting examples, a) and b), of a second node, according to embodiments herein.
Figure 22:
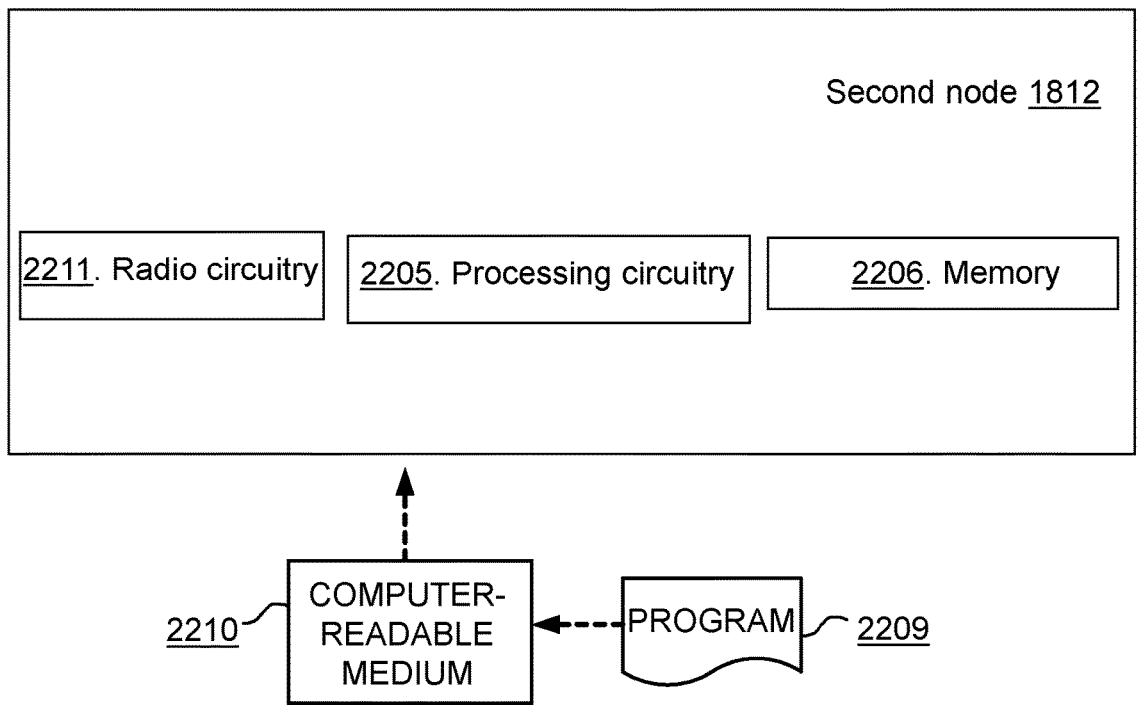

FIG. 22 depicts two different examples in panels a) and b), respectively, of the arrangement that the second node 1812 may comprise. In some embodiments, the second node 1812 may comprise the following arrangement depicted in FIG. 22a. The second node 1812 may be understood to be for handling transmission of one or more packets and/or one or more messages from the sending node 1801 to the receiving node 1802. The second node 1812 may be configured to operate in the communications network 1800. The communications network 1800 may be configured to comprise at least one intermediate node 1803 between the sending node 1801 and the receiving node 1802.

In some embodiments, the communications network 1800 may be configured to be an IAB network.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 1811 and the second node 1812 and will thus not be repeated here. For example, in some embodiments, the first node 1811 may be configured to be one of: the sending node 1801, the node configured to be providing access to the communications network 1800 to one of the sending node 1801 and the receiving node 1802, the donor DU, and the at least one intermediate node 1803 between the sending node 1801 and the receiving node 1802. In some embodiments, the first node 1811 may be configured to be a CU.

In FIG. 22, optional units are indicated with dashed boxes.

The second node 1812 may be configured to perform this receiving 2001 action, e.g. by means of a receiving unit 2201 within the second node 1812, configured to receive the first indication from the first node 1811 configured to be comprised in the communications network 1800. The first indication may be configured to explicitly indicate whether or not at least one of: i) the one or more packets are, or are to be, duplicated over a GTP layer, ii) duplication of the one or more packets over the GTP layer, is enabled, supported and/or active, iii) one or more messages are, or are to be, duplicated over the SCTP layer configured to be between the first node 1811 and the second node 1812, and iv) duplication of the one or more messages over the SCTP layer configured to be between the first node 1811 and the second node 1812, is enabled, supported and/or active.

In some embodiments, wherein at least one of the sending node 1801 and the receiving node 1802 may be configured to be the wireless device 1830, the one or more GTP tunnels may be configured to exclude the link between the wireless device 1830 and the node configured to be providing access to the communications network 1800 to the wireless device 1830.

The second node 1812 may be configured to perform this receiving action 2002, e.g., by means of the receiving unit 2201, configured to receive, according to the first indication configured to be received, and over the GTP layer, the one or more GTP tunnels or the SCTP layer between the first node 1811 and the second node 1812, at least one of the one or more packets, the one or more messages and the one or more duplicates.

The second node 1812 may be configured to perform this transmitting 2004 action, e.g., by means of a transmitting unit 2202 within the second node 1812, configured to perform this action, configured to transmit, according to the received first indication, and over the GTP layer, over the one or more GTP tunnels, and/or over the SCTP layer configured to be between the second node 1812 and a third node 1813, at least one of the one or more packets, the one or more messages, and the one or more duplicates.

In some embodiments, the first indication may be configured to indicate one of: a) whether duplication based on GTP is configured or not, and b) the initial state of duplication based on GTP.

In some embodiments, the receiving of the first indication may be further configured to comprise receiving the second indication. The second indication may be configured to indicate at least one of: i) whether duplication based on GTP is configured or not, and ii) the initial state of duplication based on GTP.

The first indication may be configured to be received in at least one of: a) the UE context setup request message for each bearer set up, b) the UE context modification request message for the additional bearer set up, c) the Bearer context setup request message for each bearer set up, and d) the Bearer context modification request message for the additional bearer set up.

In some embodiments wherein the first indication may be configured to be received in at least one of: the UE context setup request message for each bearer set up, and the UE context modification request message for the additional bearer set up, the first indication may be configured to be one of: i) the GTP Based Duplication Configured IE, and ii) the GTP Based Duplication Activation IE.

In some embodiments wherein the first indication may be configured to be received in at least one of: the Bearer context setup request message for each bearer set up, and the Bearer context modification request message for the additional bearer set up, the first indication may be configured to be an IE of: a) the DRB To Setup List E-UTRAN, b) the PDU Session Resource To Setup List, c) the DRB To Setup Modification List E-UTRAN, d) the DRB To Modify List E-UTRAN PDU Session Resource To Setup Modification List, and e) the PDU Session Resource To Modify List.

In some embodiments wherein the receiving of the first indication may be further configured to comprise receiving the third indication, the third indication may be configured to indicate that each of one or more duplicates of the one or more packets is to be sent over at least one of: i) different channels over the one or more GTP tunnels, and ii) different GTP tunnels, wherein more than one GTP tunnel is set up.

In some embodiments, the third indication may be configured to indicate at least one of: the routing identifier, the flow identifier, and the DSCP.

The second node 1812 may be configured to perform the determining of Action 2003 action, e.g., by means of a determining unit 2203, configured to determine whether or not to remove one or more duplicates of the one or more packets and/or the one or more messages prior to the transmitting at least one of the one or more packets, the one or more messages, and the one or more duplicates.

Other units 2204 may be comprised in the second node 1812.

The embodiments herein in the second node 1812 may be implemented through one or more processors, such as a processor 2205 in the second node 1812 depicted in FIG. 22a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second node 1812. One such carrier may be in the form of a CD ROM disc. It is however feasible with other data carriers such as a memory stick. The computer program code may furthermore be provided as pure program code on a server and downloaded to the second node 1812.

The second node 1812 may further comprise a memory 2206 comprising one or more memory units. The memory 2206 is arranged to be used to store obtained information, store data, configurations, schedulings, and applications etc. to perform the methods herein when being executed in the second node 1812.

In some embodiments, the second node 1812 may receive information from, e.g., any of the first node 1811, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, and/or the wireless device 1830, the host computer 2410, or any of the other nodes, through a receiving port 2207. In some embodiments, the receiving port 2207 may be, for example, connected to one or more antennas in the second node 1812. In other embodiments, the second node 1812 may receive information from another structure in the communications network 1800 through the receiving port 2207. Since the receiving port 2207 may be in communication with the processor 2205, the receiving port 2207 may then send the received information to the processor 2205. The receiving port 2207 may also be configured to receive other information.

The processor 2205 in the second node 1812 may be further configured to transmit or send information to e.g., any of the first node 1811, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, and/or the wireless device 1830, the host computer 2410, or any of the other nodes, or another structure in the communications network 1800, through a sending port 2208, which may be in communication with the processor 2205, and the memory 2206.

Those skilled in the art will also appreciate that the units 2201-2204 described above may refer to a combination of analog and digital circuits, and/or one or more processors configured with software and/or firmware, e.g., stored in memory, that, when executed by the one or more processors such as the processor 2205, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 2201-2204 described above implemented as a processor, such as the processor 2205, or as one or more applications running on one or more processors such as the processor 2205.

Thus, the methods according to the embodiments described herein for the second node 1812 may be respectively implemented by means of a computer program 2209 product, comprising instructions, i.e., software code portions, which, when executed on at least one processor 2205, cause the at least one processor 2205 to carry out the actions described herein, as performed by the second node 1812. The computer program 2209 product may be stored on a computer-readable storage medium 2210. The computer-readable storage medium 2210, having stored thereon the computer program 2209, may comprise instructions which, when executed on at least one processor 2205, cause the at least one processor 2205 to carry out the actions described herein, as performed by the second node 1812. In some embodiments, the computer-readable storage medium 2210 may be a non-transitory computer-readable storage medium, such as a CD ROM disc, or a memory stick. In other embodiments, the computer program 2209 product may be stored on a carrier containing the computer program 2209 just described, wherein the carrier is one of an electronic signal, optical signal, radio signal, or the computer-readable storage medium 2210, as described above.

The second node 1812 may comprise a communication interface configured to facilitate communications between the second node 1812 and other nodes or devices, e.g., any of the first node 1811, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, and/or the wireless device 1830, the host computer 2410, or any of the other nodes, or another structure. The interface may, for example, include a transceiver configured to transmit and receive radio signals over an air interface in accordance with a suitable standard.

In other embodiments, the second node 1812 may comprise the following arrangement depicted in FIG. 22b. The second node 1812 may comprise a processing circuitry 2205, e.g., one or more processors such as the processor 2205, in the second node 1812 and the memory 2206. The second node 1812 may also comprise a radio circuitry 2211, which may comprise e.g., the receiving port 2207 and the sending port 2208. The processing circuitry 2205 may be configured to, or operable to, perform the method actions according to FIG. 20 and/or FIGS. 24-28, in a similar manner as that described in relation to FIG. 22a. The radio circuitry 2211 may be configured to set up and maintain at least a wireless connection with any of the first node 1811, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, and/or the wireless device 1830, the host computer 2410, or any of the other nodes. Circuitry may be understood herein as a hardware component.

Hence, embodiments herein also relate to the second node 1812 operative to operate in the communications network 1800. The second node 1812 may comprise the processing circuitry 2205 and the memory 2206, said memory 2206 containing instructions executable by said processing circuitry 2205, whereby the second node 1812 is further operative to perform the actions described herein in relation to the second node 1812, e.g., in FIG. 20 and/or FIGS. 24-28.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Examples Related to, Embodiments Herein

Figure 19:
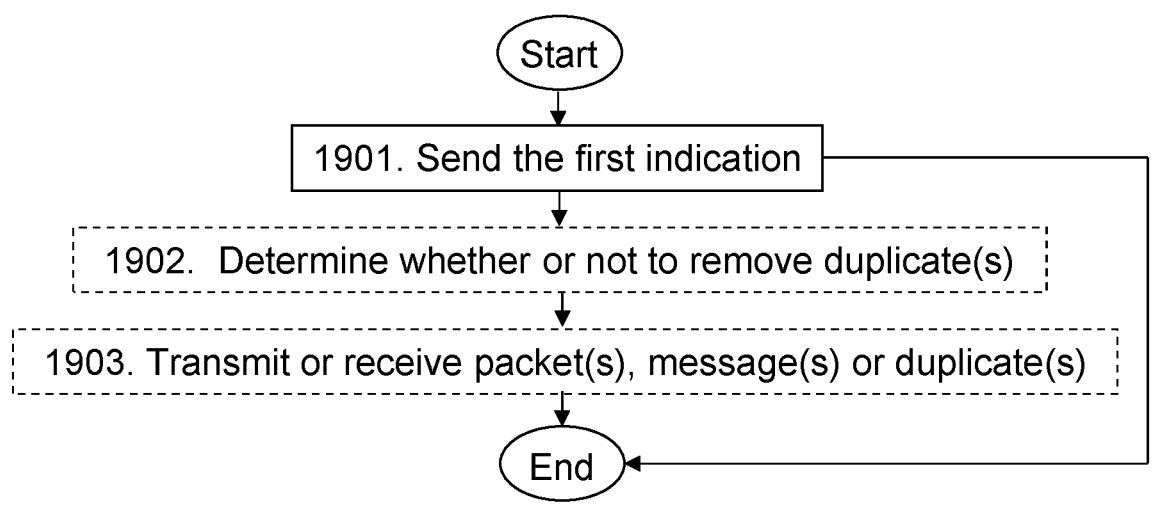
FIG. 19 depicts a flowchart of a method in a first node, according to embodiments herein.
Figure 23:
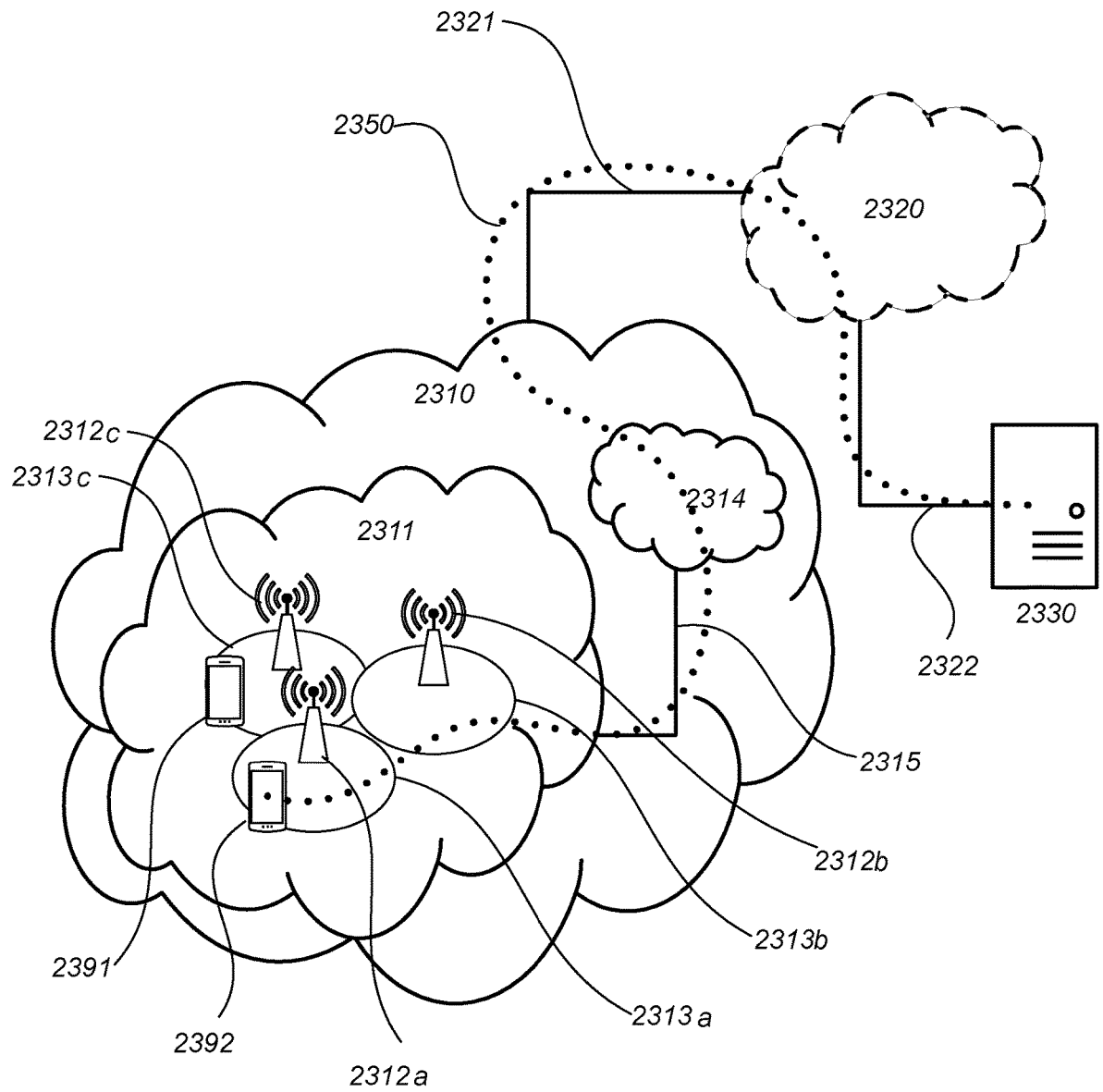
FIG. 23 is a schematic block diagram illustrating a telecommunication network connected via an intermediate network to a host computer, according to embodiments herein.

The first node 1811 embodiments relate to FIG. 19, FIG. 21 and FIGS. 23-QQ9.

A method, performed by a node, such as the first node 1811 is described herein. The method may be understood to be for handling transmission of one or more packets, and/or one or more messages, e.g., between from a sending node 1801 to a receiving node 1802. The first node 1811 may operate in the communications network 1800. The communications network 1800 may comprise at least one intermediate node 1803 between the sending node 1801 and the receiving node 1802. The communications network 1800 may be a multi-hop deployment. In some embodiments, the communications network 1800 may be an Integrated Access Backhaul (IAB) network.

The method may comprise one or more of the following actions.

In some embodiments all the actions may be performed. In other embodiments, one or more actions may be performed. One or more embodiments may be combined, where applicable. All possible combinations are not described to simplify the description. Some actions may be performed in a different order than that shown in FIG. 19. In FIG. 19, actions which may be optional in some examples are depicted with dashed boxes. In some examples, Action 1901 may be performed. In other examples, any of Action 1902 and/or Action 1903 may be performed.

Sending 1901 an indication, e.g., a first indication. The first node 1811 may be configured to perform this sending 1901 action, e.g. by means of a sending unit 2101 within the first node 1811, configured to perform this action.

The first node 1811 may send the first indication to the second node 1812 comprised in the communications network 1800, e.g., one or more next hop nodes 1804, 1805 in the communications network 1800. The one or more next hop nodes 1804, 1805 may be towards the receiving node 1802.

The first indication may indicate, e.g., explicitly, whether or not at least one of:
 i. the one or more packets are, or are to be, duplicated over a General Packet Radio Service Tunneling Protocol (GTP) layer, e.g., one or more GTP tunnels, e.g., between the first node 1811 and the one or more next hop nodes 1804, 1805,
 ii. duplication of the one or more packets over the GTP layer, e.g., the one or more GTP tunnels, e.g., between the first node 1811 and the one or more next hop nodes 1804, 1805 is enabled, supported and/or active,
 iii. one or more messages are, or are to be, duplicated over a Stream Control Transmission Protocol (SCTP), layer, e.g., between the first node 1811 and the one or more next hop nodes 1804, 1805,
 iv. duplication of the one or more messages over the SCTP layer between the first node 1811 and the one or more next hop nodes 1804, 1805 is enabled, supported and/or active.

In some embodiments, at least one of the sending node 1801 and the receiving node 1802 may be a wireless device 130.

In some embodiments, the one or more GTP tunnels may exclude a link between the wireless device 130 and a node providing access to the communications network 1800 to the wireless device 130.

In some embodiments, the method may comprise one or more of the following actions:
 Transmitting and/or receiving 1903 at least one of the one or more packets, the one or more messages, and the one or more duplicates. The first node 1811 may be configured to perform this transmitting and/or receiving 1903 action, e.g. by means of a transmitting/receiving unit 2102 within the first node 1811, configured to perform this action. The transmitting/receiving unit 2102 may be a processor 2105 of the first node 1811, or an application running on such processor.

The transmitting and/or receiving in this Action 1903 may be according to the first indication.

The transmitting and/or receiving in this Action 1903 may be over the GTP layer, over the one or more GTP tunnels, and/or over the SCTP layer, between the first node 1811 and the one or more next hop nodes 1804, 1805.

In some embodiments, the first indication may indicate one of:
whether duplication based on GTP is configured or not, and
an initial state of duplication based on GTP.

In some embodiments, the sending 1901 may further comprise sending a second indication. The second indication i may indicate at least one of:
whether duplication based on GTP is configured or not, and
an initial state of duplication based on GTP In some embodiments, the first node 1811 may be one of. the sending node 1801, a node providing access to the communications network 1800 to one of the sending node 1801 and the receiving node 1801, a donor data unit DU, and the at least one intermediate node 1803 between the sending node 1801 and the receiving node 1802.

The first indication may be sent in at least one of:
a UE context setup request message for each bearer set up,
a UE context modification request message for an additional bearer set up,
a Bearer context setup request message for each bearer set up, and
a Bearer context modification request message for an additional bearer set up.

In some embodiments wherein the first indication may be sent in at least one of: a UE context setup request message for each bearer set up, and a UE context modification request message for an additional bearer set up, the first indication may be one of:
a GTP Based Duplication Configured Information Element (IE) and
a GTP Based Duplication Activation IE.

In some embodiments wherein the first indication may be sent in at least one of: a Bearer context setup request message for each bearer set up, and a Bearer context modification request message for an additional bearer set up, the first indication may be an IE of:
a DRB To Setup List E-UTRAN,
a PDU Session Resource To Setup List,
a DRB To Setup Modification List E-UTRAN,
a DRB To Modify List E-UTRAN PDU Session Resource To Setup Modification List, and
a PDU Session Resource To Modify List.

In some embodiments, the sending 1901 may further comprise sending a third indication.

The third indication may indicate that each of one or more duplicates of the one or more packets is to be sent over at least one of:
different channels over the one or more GTP tunnels, and
different GTP tunnels, wherein more than one GTP tunnel is set up.

In some embodiments, the third indication may indicate at least one of:
a routing identifier, e.g., a Backhaul Adaptation Protocol routing identifier, and
a flow identifier.

Determining 1902 whether or not to remove one or more duplicates of the one or more packets and/or the one or more messages prior to transmitting the one or more packets and/or the one or more messages over the one or more GTP tunnels and/or the SCTP layer. The first node 1811 may be configured to perform this determining 1902 action, e.g. by means of a determining unit 2103 within the first node 1811, configured to perform this action.

Determining may be understood as calculating, or deriving.

Other units 2104 may be comprised in the first node 1811.

The first node 1811 may also be configured to communicate user data with a host application unit in a host computer 2410, e.g., via another link such as 2450.

In FIG. 21, optional units are indicated with dashed boxes.

The first node 1811 may comprise an interface unit to facilitate communications between the first node 1811 and other nodes or devices, e.g., any of the second node 1812, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, the wireless device 130, the host computer 2410, and/or any of the other nodes. In some particular examples, the interface may, for example, include a transceiver configured to transmit and receive radio signals over an air interface in accordance with a suitable standard.

Figure 24:
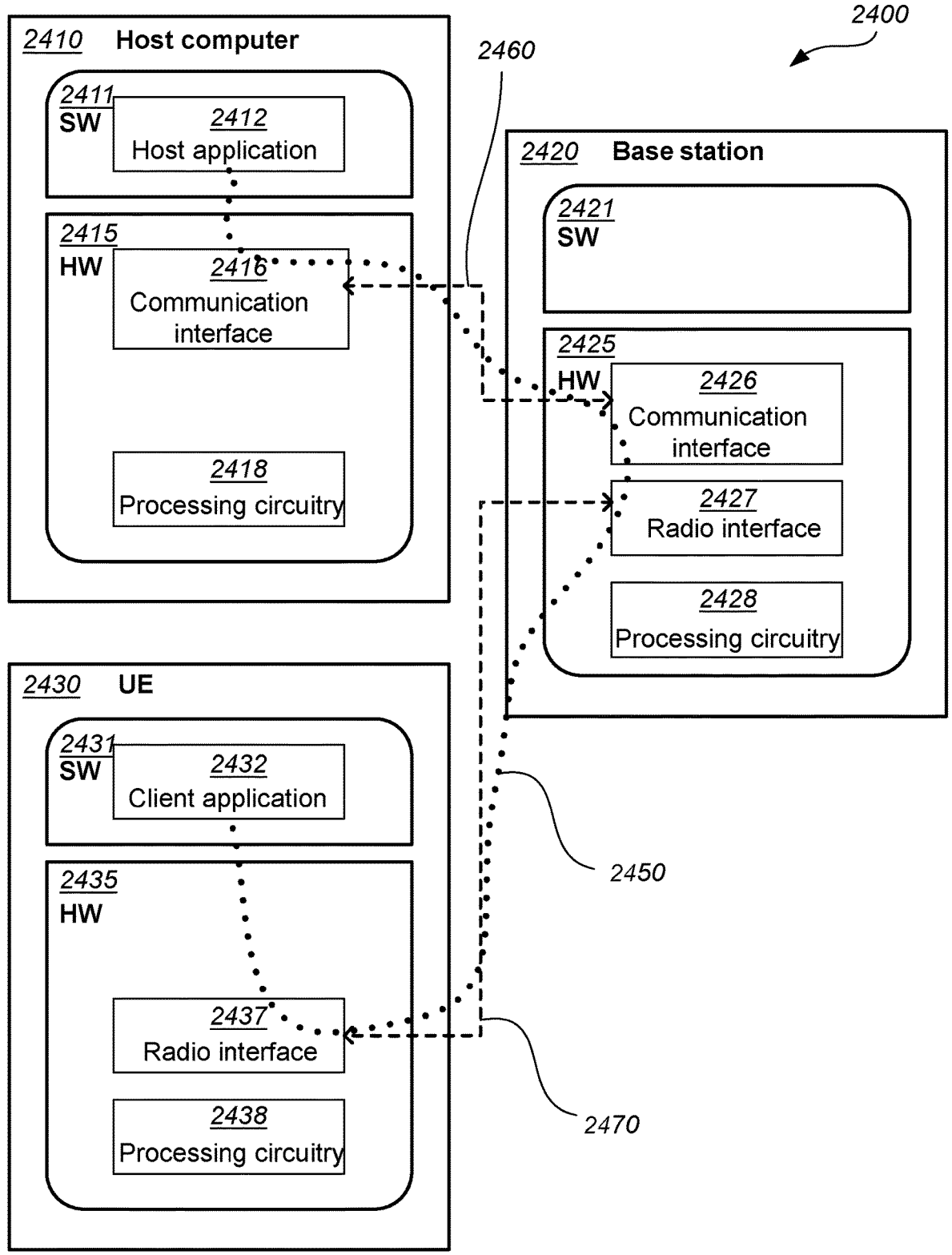
FIG. 24 is a generalized block diagram of a host computer communicating via a base station with a user equipment over a partially wireless connection, according to embodiments herein.

The first node 1811 may comprise an arrangement as shown in FIG. 21 or in FIG. 24.

Figure 20:
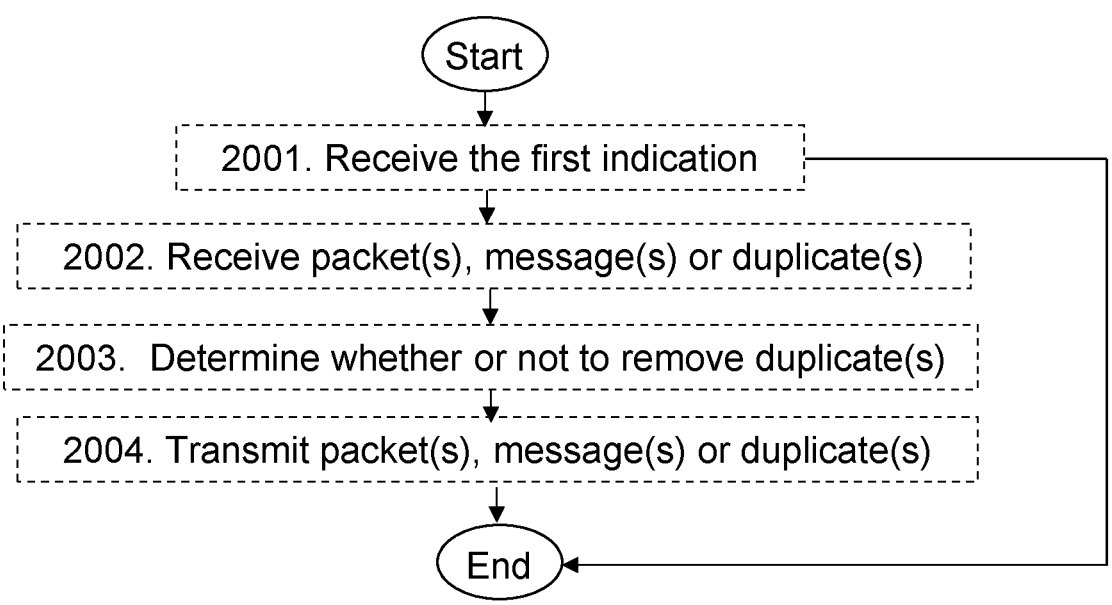
FIG. 20 depicts a flowchart of a method in a second node, according to embodiments herein.

The second node 1812 embodiments relate to FIG. 20, FIG. 22 and FIGS. 23-QQ9.

A method performed by another node, such as the second node 1812 is described herein. The method may be understood to be for handling transmission of one or more packets, and/or one or more messages, e.g., between from a sending node 1801 to a receiving node 1802. The second node 1812 may operate in the communications network 1800. The communications network 1800 may comprise at least one intermediate node 1803 between the sending node 1801 and the receiving node 1802. The communications network 1800 may be a multi-hop deployment. In some embodiments, the communications network 1800 may be an Integrated Access Backhaul (IAB) network.

The method may comprise one or more of the following actions.

In some embodiments all the actions may be performed. In other embodiments, one or more actions may be performed. One or more embodiments may be combined, where applicable. All possible combinations are not described to simplify the description. Some actions may be performed in a different order than that shown in FIG. 20. In FIG. 20, actions which may be optional in some examples are depicted with dashed boxes. In some examples, Action 2001 may be performed. In other examples, any of Action 2002, Action 2003 and/or Action 2004 may be performed.

Receiving 2001 the indication, e.g., the first indication.
The second node 1812 may be configured to perform this receiving 2001 action, e.g. by means of a receiving unit 2201 within the second node 1812, configured to perform this action.

The first indication may be received from the first node 1811 comprised in the communications network 1800, e.g., a next hop node in the communications network 1800, e.g., towards the sending node 1801.

The first indication may indicate, e.g., explicitly, whether or not at least one of:
i. the one or more packets are, or are to be, duplicated over a General Packet Radio Service Tunneling Protocol (GTP) layer, e.g., one or more GTP tunnels, e.g., between the first node 1811 and the second node 1812, e.g., one or more next hop nodes 1804, 1805 towards the receiving node 1802,
ii. duplication of the one or more packets over the GTP layer, e.g., the one or more GTP tunnels, e.g., between the first node 1811 and the second node 1812, e.g., one or more next hop nodes 1804, 1805 towards the receiving node 1802 is enabled, supported and/or active,
iii. one or more messages are, or are to be, duplicated over a SCTP, layer, e.g., between the first node 1811 and the second node 1812, e.g., the one or more next hop nodes 1804, 1805,
iv. duplication of the one or more messages over the SCTP layer, e.g., between the first node 1811 and the second node 1812, e.g., the one or more next hop nodes 1804, 1805 is enabled, supported and/or active.

In some embodiments, at least one of the sending node 1801 and the receiving node 1802 may be a wireless device 130.

In some embodiments, the one or more GTP tunnels may exclude a link between the wireless device 130 and a node providing access to the communications network 1800 to the wireless device 130.

In some embodiments, the method may comprise one or more of the following actions:

Receiving 2002 at least one of the one or more packets, the one or more messages, and the one or more duplicates. The second node 1812 may be configured to perform this receiving action 2002, e.g., by means of the receiving unit 2201, configured to perform this action.

The receiving in this Action 2002 may be according to the received first indication.

The receiving in this Action 2002 may be over the GTP layer, over the one or more GTP tunnels, and/or over the SCTP layer, e.g., between the first node 1811 and the second node 1812, e.g., the one or more next hop nodes 1804, 1805.

Transmitting 2004 the at least one of the one or more packets, the one or more messages, and the one or more duplicates. The second node 1812 may be configured to perform this transmitting 2004 action, e.g., by means of a transmitting unit 2202 within the second node 1812, configured to perform this action, configured to perform this action.

The transmitting in this Action 2004 may be according to the first indication, e.g., the received first indication.

The transmitting in this Action 2004 may be over the GTP layer, over the one or more GTP tunnels, and/or over the SCTP layer, e.g., the second node 1812 and a third node 1813, e.g., the one or more next hop nodes 1804, 1805.

In some embodiments, the first indication may indicate one of:
whether duplication based on GTP is configured or not, and
an initial state of duplication based on GTP.

In some embodiments, the receiving 2001 may further comprise receiving a second indication. The second indication may indicate at least one of:
whether duplication based on GTP is configured or not, and
an initial state of duplication based on GTP In some embodiments, the first node 1811 may be one of. the sending node 1801, a node providing access to the communications network 1800 to one of the sending node 1801 and the receiving node 1801, a donor data unit DU, and the at least one intermediate node 1803 between the sending node 1801 and the receiving node 1802.

The first indication may be received in at least one of:
a UE context setup request message for each bearer set up,
a UE context modification request message for an additional bearer set up,
a Bearer context setup request message for each bearer set up, and
a Bearer context modification request message for an additional bearer set up.

In some embodiments wherein the first indication may be received in at least one of: a UE context setup request message for each bearer set up, and a UE context modification request message for an additional bearer set up, the first indication may be one of:
a GTP Based Duplication Configured Information Element (IE) and
a GTP Based Duplication Activation IE.

In some embodiments wherein the first indication may be sent in at least one of: a Bearer context setup request message for each bearer set up, and a Bearer context modification request message for an additional bearer set up, the first indication may be an IE of:
a DRB To Setup List E-UTRAN,
a PDU Session Resource To Setup List,
a DRB To Setup Modification List E-UTRAN,
a DRB To Modify List E-UTRAN PDU Session Resource To Setup Modification List, and
a PDU Session Resource To Modify List.

In some embodiments, the receiving 2901 may further comprise receiving a third indication.

The third indication may indicate that each of one or more duplicates of the one or more packets is to be sent over at least one of:
different channels over the one or more GTP tunnels, and
different GTP tunnels, wherein more than one GTP tunnel is set up.

In some embodiments, the third indication may indicate at least one of:
a routing identifier, e.g., a Backhaul Adaptation Protocol routing identifier, and
a flow identifier.
Determining 2003 whether or not to remove one or more duplicates of the one or more packets, and/or the of the one or more messages prior to the transmitting 2004. The second node 1812 may be configured to perform this obtaining 804 action, e.g., by means of the obtaining unit 1301, configured to perform this action.

Determining may be understood as calculating, or deriving.

Other units 2204 may be comprised in the second node 1812.

The second node 1812 may also be configured to communicate user data with a host application unit in a host computer 2410, e.g., via another link such as 2450.

In FIG. 22, optional units are indicated with dashed boxes.

The second node 1812 may comprise an interface unit to facilitate communications between the second node 1812 and other nodes or devices, e.g., any of the first node 1811, the third node 1813, the fourth node 1814, the fifth node 1815, the sixth node 1816, the seventh node 1817, the eighth node 1818, the ninth node 1819 and the tenth node 1820, the sending node 1801, the receiving node 1802, the at least one intermediate node 1803, the one or more next hop nodes 1804, 1805, and/or the wireless device 130, the host computer 2410, or any of the other nodes. In some particular examples, the interface may, for example, include a transceiver configured to transmit and receive radio signals over an air interface in accordance with a suitable standard.

The second node 1812 may comprise an arrangement as shown in FIG. 22 or in FIG. 24.

Further Extensions And Variations

FIG. 23: Telecommunication Network Connected Via an Intermediate Network to a Host Computer in Accordance with Some Embodiments With reference to FIG. 23, in accordance with an embodiment, a communication system includes telecommunication network 2310 such as the communications network 1800, for example, a 3GPP-type cellular network, which comprises access network 2311, such as a radio access network, and core network 2314. Access network 2311 comprises a plurality of network nodes such as any of the first node 1811, the second node 1812, the third node 1813, the fourth node 1814, the fifth node 1815, the sixth node 1816, the seventh node 1817, the eighth node 1818, the ninth node 1819 and the tenth node 1820. For example, base stations 2312a, 2312b, 2312c, such as NBs, eNBs, gNBs or other types of wireless access points, each defining a corresponding coverage area 2313a, 2313b, 2313c. Each base station 2312a, 2312b, 2312c is connectable to core network 2314 over a wired or wireless connection 2315. In FIG. 23, a first UE 2391 located in coverage area 2313c is configured to wirelessly connect to, or be paged by, the corresponding base station 2312c. A second UE 2392 in coverage area 2313a is wirelessly connectable to the corresponding base station 2312a. While a plurality of UEs 2391, 2392 are illustrated in this example, the disclosed embodiments are equally applicable to a situation where a sole UE is in the coverage area or where a sole UE is connecting to the corresponding base station 2312. Any of the UEs 2391, 2392 may be as examples of the wireless device 1830.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

In relation to FIGS. 24, 25, 26, 27, and 28, which are described next, it may be understood that a UE may be considered to, be an examples of the wireless device 1830. It may be also understood that the base station is an example of any of the first node 1811, the second node 1812, the third node 1813, the fourth node 1814, the fifth node 1815, the sixth node 1816, the seventh node 1817, the eighth node 1818 and the ninth node 1819.

FIG. 24: Host Computer Communicating Via a Base Station with a User Equipment Over a Partially Wireless Connection in Accordance with Some Embodiments Example implementations, in accordance with an embodiment, of the UE, as an example of the wireless device 1830, any of the first node 1811, the second node 1812, the third node 1813, the fourth node 1814, the fifth node 1815, the sixth node 1816, the seventh node 1817, the eighth node 1818, the ninth node 1819 and the tenth node 1820, e.g., a base station and host computer discussed in the preceding paragraphs will now be described with reference to FIG. 24. In communication system 2400, such as the communications network 1800, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes any of the first node 1811, the second node 1812, the third node 1813, the fourth node 1814, the fifth node 1815, the sixth node 1816, the seventh node 1817, the eighth node 1818, the ninth node 1819 and the tenth node 1820, exemplified in FIG. 24 as a base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with the wireless device 1830, exemplified in FIG. 24 as a UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312*a*, 2312*b*, 2312*c* and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signalling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

The first node 1811 embodiments relate to FIG. 19, FIG. 21 and FIGS. 23-28.

The first node 1811 may also be configured to communicate user data with a host application unit in a host computer 2410, e.g., via another link such as 2450.

The first node 1811 may comprise an interface unit to facilitate communications between the first node 1811 and other nodes or devices, e.g., any of the second node 1812, the third node 1813, the fourth node 1814, the fifth node 1815, the sixth node 1816, the seventh node 1817, the eighth node 1818, the ninth node 1819 and the tenth node 1810, the sending node 1801, the receiving node 1802, the at least one intermediate node 1803, the one or more next hop, the wireless device 1830, the host computer 2410, and/or any of the other nodes. In some particular examples, the interface may, for example, include a transceiver configured to transmit and receive radio signals over an air interface in accordance with a suitable standard.

The first node 1811 may comprise an arrangement as shown in FIG. 21 or in FIG. 24.

The second node 1812 embodiments relate to FIG. 20, FIG. 22 and FIGS. 23-28.

The second node 1812 may also be configured to communicate user data with a host application unit in a host computer 2410, e.g., via another link such as 2450.

The second node 1812 may comprise an interface unit to facilitate communications between the second node 1812 and other nodes or devices, e.g., any of the first node 1811, the third node 1813, the fourth node 1814, the fifth node 1815, the sixth node 1816, the seventh node 1817, the eighth node 1818, the ninth node 1819 and the tenth node 1810, the sending node 1801, the receiving node 1802, the at least one intermediate node 1803, the one or more next hop, and/or the wireless device 1830, the host computer 2410, or any of the other nodes. In some particular examples, the interface may, for example, include a transceiver configured to transmit and receive radio signals over an air interface in accordance with a suitable standard.

The second node 1812 may comprise an arrangement as shown in FIG. 22 or in FIG. 24.

Figure 25:
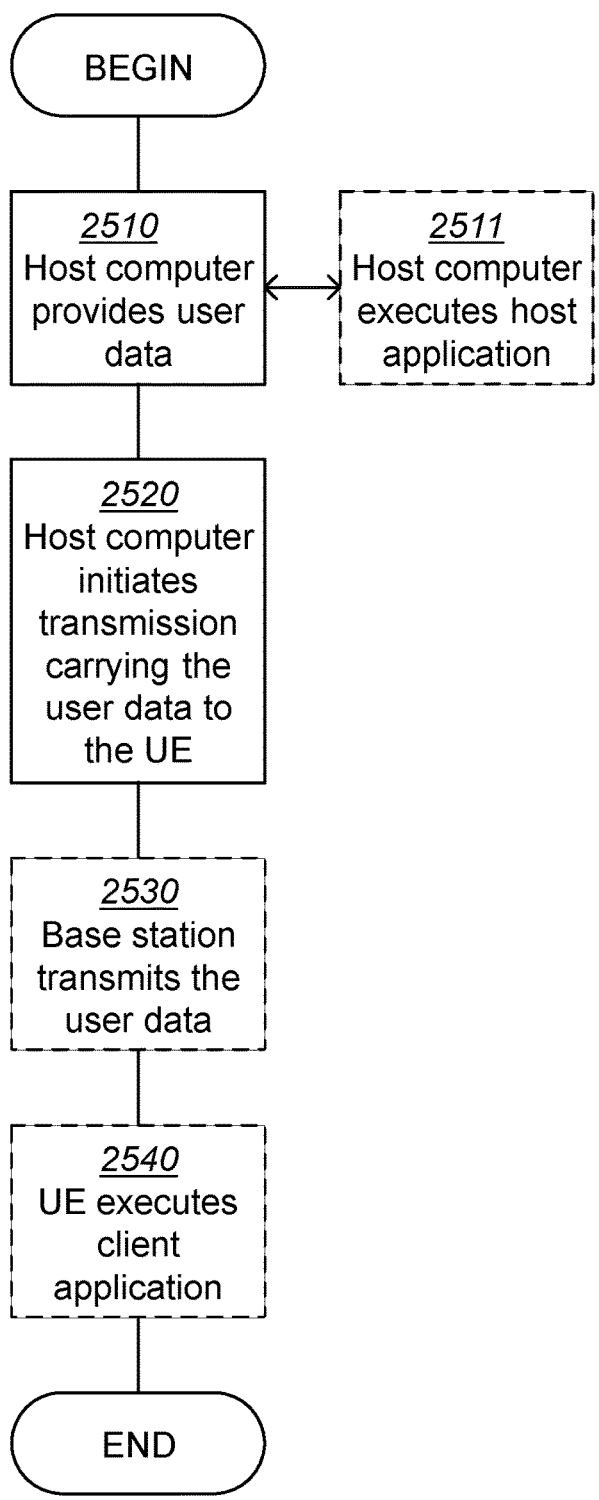
FIG. 25 is a flowchart depicting embodiments of a method in a communications system including a host computer, a base station and a user equipment, according to embodiments herein.

FIG. 25: Methods Implemented in a Communication System Including a Host Computer, a Base Station and a User Equipment in Accordance with Some Embodiments FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional) of step 2510, the host computer provides the user data by executing a host application.

In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

Figure 26:
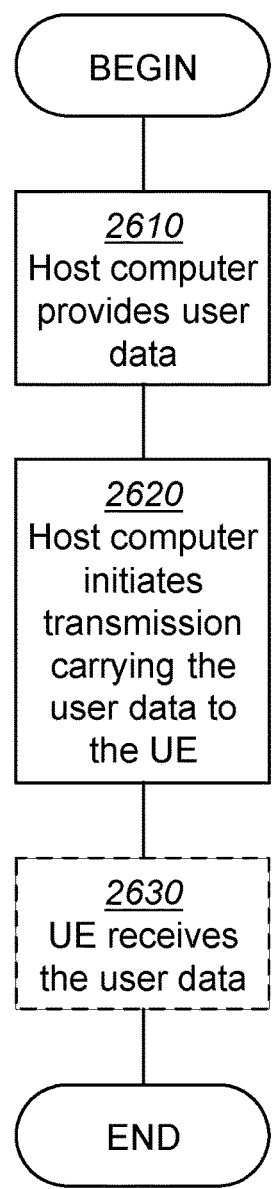
FIG. 26 is a flowchart depicting embodiments of a method in a communications system including a host computer, a base station and a user equipment, according to embodiments herein.

FIG. 26: Methods Implemented in a Communication System Including a Host Computer, a Base Station and a User Equipment in Accordance with Some Embodiments FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figure 27:
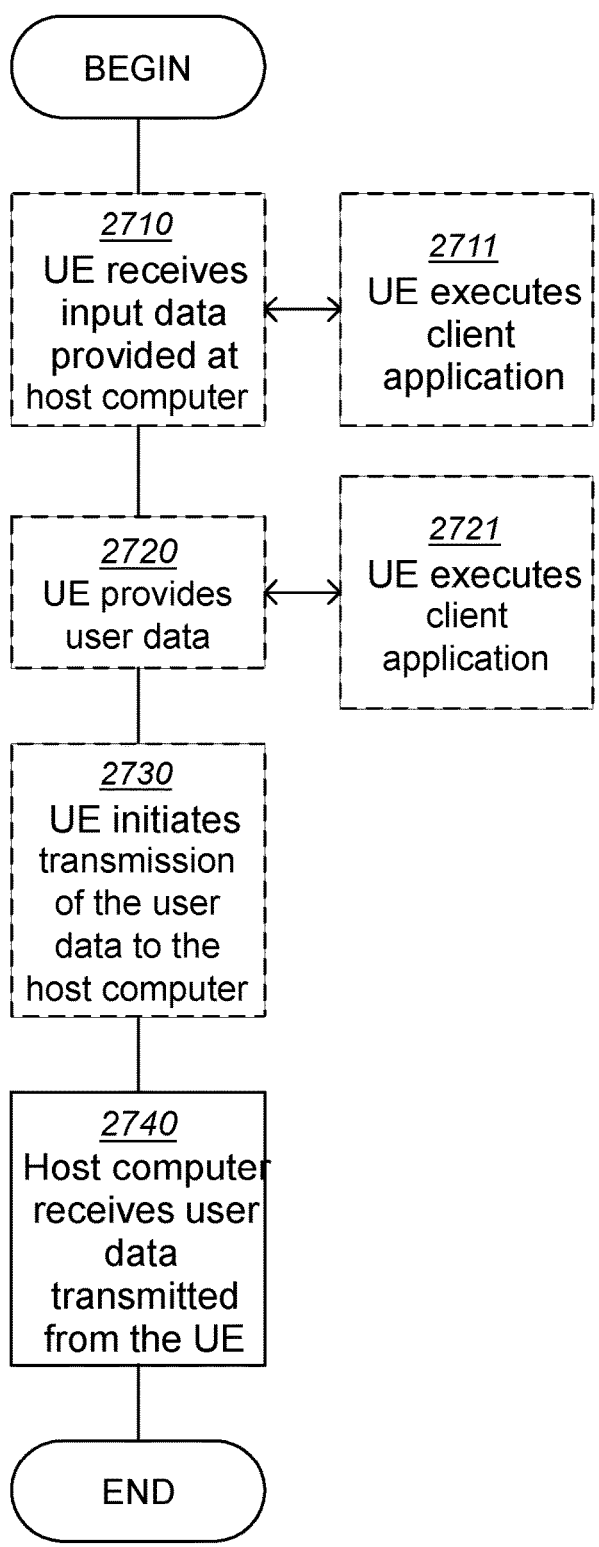
FIG. 27 is a flowchart depicting embodiments of a method in a communications system including a host computer, a base station and a user equipment, according to embodiments herein.

FIG. 27: Methods Implemented in a Communication System Including a Host Computer, a Base Station and a User Equipment in Accordance with Some Embodiments FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

Figure 28:
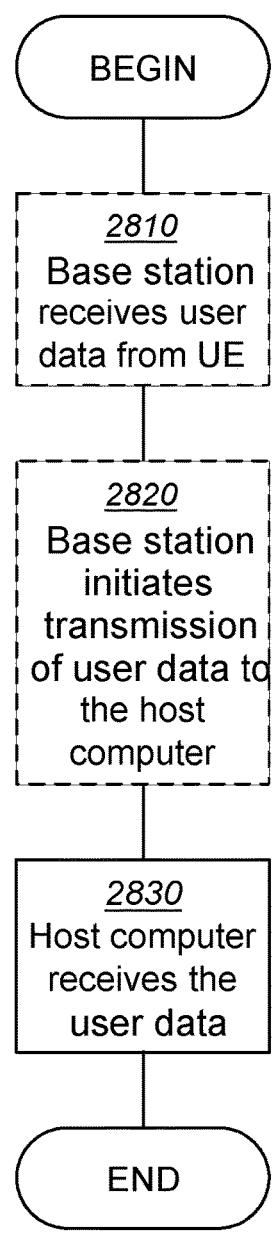
FIG. 28 is a flowchart depicting embodiments of a method in a communications system including a host computer, a base station and a user equipment, according to embodiments herein.

FIG. 28: Methods Implemented in a Communication System Including a Host Computer, a Base Station and a User Equipment in Accordance with Some Embodiments FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by any of the first node 1811 and/or the second node 1812.
5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by any of the first node 1811 and/or the second node 1812.

6. The communication system of embodiment 5, further including the base station.

7. The communication system of embodiment 6, further including the UE, wherein the UE is configured to communicate with the base station.

8. The communication system of embodiment 7, wherein:
the processing circuitry of the host computer is configured to execute a host application, thereby providing the user data; and
the UE comprises processing circuitry configured to execute a client application associated with the host application.

11. A method implemented in a base station, comprising one or more of the actions described herein as performed by any of the first node 1811 and/or the second node 1812.

15. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs one or more of the actions described herein as performed by any of the first node 1811 and/or the second node 1812.

16. The method of embodiment 15, further comprising:
at the base station, transmitting the user data.

17. The method of embodiment 16, wherein the user data is provided at the host computer by executing a host application, the method further comprising:
at the UE, executing a client application associated with the host application.

21. A user equipment (UE) configured to communicate with a base station, the UE comprising a radio interface and processing circuitry configured to perform one or more of the actions described herein as performed by the wireless device 1830.

25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to perform one or more of the actions described herein as performed by the wireless device 1830.

26. The communication system of embodiment 25, further including the UE.

27. The communication system of embodiment 26, wherein the cellular network further includes a base station configured to communicate with the UE.

28. The communication system of embodiment 26 or 27, wherein:
the processing circuitry of the host computer is configured to execute a host application, thereby providing the user data; and
the UE's processing circuitry is configured to execute a client application associated with the host application.

31. A method implemented in a user equipment (UE), comprising one or more of the actions described herein as performed by the wireless device 1830.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the wireless device 1830.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the wireless device 1830.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the wireless device 1830.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the wireless device 1830.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the wireless device 1830.

56. The method of embodiment 55, further comprising:
   at the UE, providing the user data to the base station.
57. The method of embodiment 56, further comprising:
   at the UE, executing a client application, thereby providing the user data to be transmitted; and
   at the host computer, executing a host application associated with the client application.
58. The method of embodiment 56, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
61. A base station configured to communicate with a user equipment (UE), the base station comprising a radio interface and processing circuitry configured to perform one or more of the actions described herein as performed by any of the first node 1811 and/or the second node 1812.
65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by any of the first node 1811 and/or the second node 1812.
66. The communication system of embodiment 65, further including the base station.
67. The communication system of embodiment 66, further including the UE, wherein the UE is configured to communicate with the base station.
68. The communication system of embodiment 67, wherein:
   the processing circuitry of the host computer is configured to execute a host application;
   the UE is configured to execute a client application associated with the host application, thereby providing the user data to be received by the host computer.
71. A method implemented in a base station, comprising one or more of the actions described herein as performed by any of the first node 1811 and/or the second node 1812.
75. A method implemented in a communication system including a host computer, a base station and a user equipment (UE), the method comprising:
   at the host computer, receiving, from the base station, user data originating from a transmission which the base station has received from the UE, wherein the UE performs one or more of the actions described herein as performed by the wireless device 1830.
76. The method of embodiment 75, further comprising:
   at the base station, receiving the user data from the UE.
77. The method of embodiment 76, further comprising:
   at the base station, initiating a transmission of the received user data to the host computer.

REFERENCES

1. TS 38.340
2. TS 38.300
3. TS 37.340
4. TS 38.473

The invention claimed is:

1. A method performed by a first node, the method being for handling transmission of one or more messages from a sending node to a receiving node, the first node operating in a communications network, the communications network comprising at least one intermediate node between the sending node and the receiving node, the method comprising:
   sending, by the first node, a first indication to a second node comprised in the communications network, the first indication explicitly indicating whether or not at least one of:
      the one or more messages are duplicated or are to be duplicated at a Stream Control Transmission Protocol, SCTP, layer between the first node and one or more next hop nodes; and
      duplication of the one or more messages at the SCTP layer between the first node and the one or more next hop nodes is at least one of enabled, supported, and active.

2. The method according to claim 1, wherein at least one of the sending node and the receiving node is a wireless device, and wherein one or more General Packet Radio Service Tunneling Protocol, GTP, tunnels exclude a link between the wireless device and a node providing access to the communications network to the wireless device.

3. The method according to claim 1, further comprising:
   transmitting, by the first node, according to the first indication, and over a General Packet Radio Service Tunneling Protocol, GTP, layer, one or more GTP tunnels, or the SCTP layer, at least one of the one or more messages and the one or more duplicates.

4. The method according to claim 1, wherein the first indication indicates one of:
   whether duplication based on General Packet Radio Service Tunneling Protocol, GTP, is configured or not; and
   an initial state of duplication based on GTP.

5. The method according to claim 1, wherein the sending further comprises sending a second indication, the second indication indicating at least one of:
   whether duplication based on General Packet Radio Service Tunneling Protocol, GTP, is configured or not; and
   an initial state of duplication based on GTP.

6. The method according to claim 1, wherein the first node is one of the sending node, a node providing access to the communications network to one of the sending node and the receiving node, a donor distributed unit (DU), and the at least one intermediate node between the sending node and the receiving node.

7. The method according to claim 1, wherein the first indication explicitly indicates whether one or both of:
   the one or more messages are duplicated or are to be duplicated at the SCTP layer between the first node and the one or more next hop nodes; and
   duplication of the one or more messages at the SCTP layer between the first node and the one or more next hop nodes is at least one of enabled, supported, and active;
   and
   the first indication is sent in at least one of:
      a UE context setup request message for each bearer set up;
      a UE context modification request message for an additional bearer set up;
      a Bearer context setup request message for each bearer set up; and
      a Bearer context modification request message for an additional bearer set up.

8. The method according to claim 7, wherein the first indication is sent in at least one of: the UE context setup request message for each bearer set up, and the UE context modification request message for the additional bearer set up, and wherein the first indication is one of:
   a General Packet Radio Service Tunneling Protocol, GTP, Based Duplication Configured Information Element, IE; and
   a GTP Based Duplication Activation IE.

9. The method according to claim 7, wherein the first indication is sent in at least one of: the Bearer context setup request message for each bearer set up, and the Bearer context modification request message for the additional bearer set up, and wherein the first indication is an IE of:
   a DRB To Setup List E-UTRAN;
   a PDU Session Resource To Setup List;
   a DRB To Setup Modification List E-UTRAN;
   a DRB To Modify List E-UTRAN PDU Session Resource To Setup Modification List; and
   a PDU Session Resource To Modify List.

10. The method according to claim 1, wherein the sending, by the first node, further comprises sending a third indication, the third indication indicating that each of one or more duplicates of the one or more packets is to be sent over at least one of:
   different channels over one or more General Packet Radio Service Tunneling Protocol, GTP, tunnels; and
   different GTP tunnels, wherein more than one GTP tunnel is set up.

11. The method according to claim 10, wherein the third indication indicates at least one of:
   a routing identifier;
   a flow identifier; and
   a Differentiated Services Code Point, DSCP.

12. The method according to claim 1, further comprising one or more of:
   determining whether or not to remove, by the first node, one or more duplicates of the one or more messages prior to transmitting the one or more messages over the SCTP layer.

13. The method according to claim 1, wherein the communications network is an Integrated Access and Backhaul, IAB, network.

14. A method performed by a second node, the method being for handling transmission of one or more messages from a sending node to a receiving node, the second node operating in a communications network, the communications network comprising at least one intermediate node between the sending node and the receiving node, the method comprising:
   receiving, by the second node, a first indication from a first node comprised in the communications network, the first indication explicitly indicating whether or not at least one of:
      the one or more messages are duplicated or are to be duplicated at a Stream Control Transmission Protocol, SCTP, layer between the first node and the second node; and
      duplication of the one or more messages at the SCTP layer between the first node and the second node, is at least one of enabled, supported, and active.

15. A first node, for handling transmission of one or more messages from a sending node to a receiving node, the first node being configured to operate in a communications network, the communications network being configured to comprise at least one intermediate node between the sending node and the receiving node, the first node being further configured to:
   send, by the first node, a first indication to a second node configured to be comprised in the communications network, the first indication being configured to explicitly indicate whether or not at least one of:
      the one or more messages are duplicated or are to be duplicated at a Stream Control Transmission Protocol, SCTP, layer configured to be between the first node and one or more next hop nodes; and
      duplication of the one or more messages at the SCTP layer between the first node and the one or more next hop nodes is at least one of enabled, supported, and active.

16. A second node, for handling transmission of one or more messages from a sending node to a receiving node, the second node being configured to operate in a communications network, the communications network being configured to comprise at least one intermediate node between the sending node and the receiving node, the second node being further configured to:
   receive, by the second node, a first indication from a first node configured to be comprised in the communications network, the first indication being configured to explicitly indicate whether or not at least one of:
      the one or more messages are duplicated or are to be duplicated at a Stream Control Transmission Protocol, SCTP, layer configured to be between the first node and the second node; and
      duplication of the one or more messages at the SCTP layer configured to be between the first node and the second node, is at least one of enabled, supported, and active.

* * * * *